United States Patent [19]

Hammond et al.

[11] Patent Number: 4,831,315
[45] Date of Patent: May 16, 1989

[54] TRANSDUCER POSITIONING APPARATUS WITH MULTIPLE MODES OF MOTION

[75] Inventors: Francis P. Hammond, Cheshire, England; Martyn A. Lewis, Pacific Palisades, Calif.

[73] Assignees: Data Recording Instrument Company Limited, England; Cambrian Consultants, Inc., Calabasas, Calif.

[21] Appl. No.: 28,700

[22] Filed: Mar. 20, 1987

[30] Foreign Application Priority Data

Apr. 4, 1986 [GB] United Kingdom ............... 8608219

[51] Int. Cl.$^4$ ............................................. G11B 21/02
[52] U.S. Cl. .................................... 318/567; 318/572; 360/75
[58] Field of Search ............... 318/567, 569, 573, 572; 360/75, 76, 77, 78

[56] References Cited

U.S. PATENT DOCUMENTS

| | | | |
|---|---|---|---|
| Re. 32,075 | 9/1981 | Harrison et al. ........................ | 360/77 |
| 4,031,443 | 6/1977 | Droux et al. .......................... | 318/561 |
| 4,078,192 | 3/1978 | Fultz ................................... | 318/314 X |
| 4,115,823 | 9/1978 | Commander et al. .................. | 360/77 |
| 4,137,491 | 1/1979 | Bartley et al. ........................ | 318/685 |
| 4,379,256 | 4/1983 | Maury ................................ | 318/561 |
| 4,383,209 | 5/1983 | Lewis ................................. | 318/696 |
| 4,396,959 | 8/1983 | Harrison et al. ...................... | 360/77 |
| 4,404,509 | 9/1983 | Hartwig ............................. | 318/685 |
| 4,419,701 | 12/1983 | Harrison et al. ..................... | 360/77 X |
| 4,430,698 | 2/1984 | Harris ................................ | 318/609 X |
| 4,439,800 | 3/1984 | Powell ............................... | 360/78 |
| 4,459,525 | 7/1984 | Hasegawa ........................... | 318/561 |
| 4,469,993 | 9/1984 | Swanson et al. ..................... | 318/561 |
| 4,473,786 | 9/1984 | Miyashita et al. ................... | 318/561 |
| 4,480,217 | 10/1984 | Robbins et al. ..................... | 318/618 |
| 4,491,776 | 1/1975 | Veale ................................ | 318/561 |
| 4,516,177 | 9/1981 | Moon ................................ | 360/77 |
| 4,558,265 | 12/1985 | Hayashida et al. .................. | 318/561 |
| 4,618,808 | 10/1986 | Ish-Shalom et al. ................. | 318/696 |
| 4,660,106 | 4/1987 | Harrison et al. .................... | 360/75 X |
| 4,697,125 | 9/1987 | Goff et al. ......................... | 318/567 X |

*Primary Examiner*—Bentsu Ro
*Attorney, Agent, or Firm*—Schlerlacher, Mok & Roth

[57] ABSTRACT

A method and apparatus are disclosed for providing continuous position information in a position servo system having position information signals 162, 164 coming from encoder 160 and which provide indirect position information over selected ranges, and a reference position information signal 153 coming from transducer 140 and which provides reference position information at discrete intervals. In the preferred embodiment, the distances between selected positions of two position information signals are combined, and in response to position offset information obtained from the reference position signal 153, thereafter used in selecting which of the position information signals 162, 164 will be used for determining position information. The position determination techniques are further employed in positioning the transducer apparatus 140 relative to a rotating storage medium 142 through the use of an externally commutated positioning apparatus, such as motor 100, under control of a processing element 30. A control method is combined with the positioning method and apparatus which includes an initial determination of salient parameters associated with the apparatus (such as the commutation points of the motor 100 with respect to its end stops, and the amplitude of the two signals 162, 164). Positioning of the transducing apparatus 140 is achieved through a plurality of control modes which are responsive to the determined parameters. In addition, the accuracy with which the position of the transducing apparatus 140 is determined varies among the modes with the remaining distance yet to traverse to a desired destination position.

25 Claims, 12 Drawing Sheets

TRANSDUCER POSITIONING APPARATUS WITH MULTIPLE MODES OF MOTION

BACKGROUND

—A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.—

This invention relates to electronic positioning devices, and more particularly to an apparatus and method which provides for improved accuracy in the operation of position servo systems.

A position servo functions to position a device, hereafter referred to as a payload, to a selected location, hereafter referred to as a destination location, by moving the payload by a motion device, hereafter referred to as a prime mover. An associated control device operates to compare a current location of the payload with the destination location, and produce a control signal in accordance with a difference therebetween. The control signal is coupled to the prime mover to effect movement of the payload to the desired position.

As the control device orchestrates the overall operation of a position servo system, the accuracy with which the payload may be positioned is limited by the accuracy with which the control signal is produced. This in turn is limited by the accuracy with which position information can be determined. Position information is necessarily determined with respect to a selected reference point and typically relates to a difference between the desired location and a current location.

Position information is generally available to the control device on a continuous basis. It is to be understood in this regard that by use of the term continuous herein, it is understood that in analog systems, position information is available on a continuous basis. In a similar manner, in digital or other sampled systems where position information is available on a continual basis, i.e., at regular intervals, with interruptions between the intervals, the frequency at which position information is available is sufficiently high so that the effect is the same as if the position information were available on a continuous basis. Such position information is typically produced in an indirect manner, i.e., other than by position information from reference positions. By way of illustration, position information may be produced by coupling a position responsive transducer to the prime mover. The payload is then positioned at the reference position, and the signal from the position responsive transducer noted. As the payload is thereafter moved about positions removed from the reference position, the signal from the position responsive transducer is continuously monitored. Position information for the payload is thereby indirectly determined, and is available on a continuous basis, with reference position information available only at discrete position and/or only at discrete time intervals.

When position information is indirectly determined, it is necessary to periodically check the accuracy of such information. This is typically accomplished by moving the payload to a reference position and comparing the indirectly produced position information with the reference position information. The difference between the two represents the amount by which the indirectly produced position information is in error. As the payload is thereafter moved about positions removed from the reference position, the indirectly produced position information may be corrected by the amount of the error determined. Consequently compensation may be made for errors detected.

While the foregoing provides a method to monitor the accuracy of indirectly produced position information, there have been problems in the past with such an approach. In particular, there is generally a limit with respect to the amount by which indirectly produced position information may be in error and still be reliably corrected. Broadly speaking, if the error exceeds a maximum amount, it is not possible to reliably correct for the error.

While position servo systems are employed in a wide variety of applications, the foregoing discussed principles and shortcomings will be illustrated with respect to a hard disk storage system.

Broadly speaking, a hard disk storage system includes one or a plurality of disks which are rotated about an axis, which disks provide for the storage of information thereon in concentric rings or bands about varying radii across the surface thereof. Information is placed on and extracted from the surface of such disks by one or a plurality of magnetic transducers which are moved across the surface of the disk in response to control information. With respect to the foregoing terminology, the magnetic transducer would correspond to the payload, and the positioning apparatus which operates to move the payload across the surface of the disk would correspond to the prime mover. The destination loaction would correspond to selected tracks on the surface of the disks, and is provided to the system by external apparatus associated therewith. The location of the tracks across the surface of the hard disk respresent reference positions, with indirect position information being continuously produced for the magnetic transducers during movement between the tracks. Indirect position information of the magnetic transducer with respect to the surface of the hard disk may be provided in a number of different ways. In one approach, a disk surface and associated magnetic transducer are dedicated to position determination tasks. In particular, information is placed on concentric bands or tracks on the dedicated surface in such a fashion that continuous position information may be indirectly determined by the associated magnetic transducer. Signal multiplexing techniques may be further employed to facilitate the placement of several signals on a single track, thereby providing for improved accuracy in position determination.

In an alternate approach a position responsive transducer is employed. While a position responsive transducer may be implemented in any of a wide variety of ways, optical gratings, a light source and a light sensor are frequently employed. In such a system, one optical grating is affixed to a stationary member of the system, and a second coupled to the prime mover in such a fashion that motion of the prime mover produces relative motion between the two gratings. Light passing between the two gratings is monitored by the light sensor, and used to produce either a single or a plurality of signals useful for the indirect determination of position information of the payload, i.e., the magnetic transducer. Such optical gratings may operate in either a rectilinear or rotary fashion. In practice, a selected value of the signal from the light sensor corresponds to correct positioning of the magnetic transducer over a track. By comparing the signal from the light sensor with the corresponding selected value for the signal when the magnetic transducer is correctly positioned over a track, the accuracy of the position responsive transducer signal may be verified. In response to a difference between the signal from the light sensor and the corresponding selected value when the payload is correctly positioned at a reference position, a correction factor may be determined. Thereafter, position information for the transducer may be corrected in accordance with the amount of error so determined. In practice, however, the signal from the position responsive transducer is frequently linear only within a selected range. If the amount of detected error is within such range, the foregoing described correction technique may be employed. If, however, the error exceeds the linear range of the signal from the position responsive transducer, the required amount of correction may not be reliably determined.

By way of illustration, the signal produced by a position responsive transducer may be sinusoidal in nature, with zero crossings thereon corresponding to locations of tracks on the surface of the disc. Consequently, as the magnetic transducer is moved across the surface of the disk, the value of the sine wave will be zero when the magnetic transducer is directly positioned over each track. A number of practical considerations, however, operate to limit the reliability of this approach. In particular, as a result of environmental effects, including temperature, the disk will undergo thermal expansion and contraction, resulting in the relative displacement of the tracks with respect to position information from the position responsive transducer. As a consequence thereof, zero values of the sine wave will no longer correctly correspond to track locations on the surface of the disk. In particular, a non-zero value of the sine wave will correspond to correct track locations. In such a situation, the amount by which the signal from the position responsive transducer differs from the expected zero value of the sine wave represents a necessary correction factor. The correction factor is typically combined with position information from the position responsive transducer to determine correct position information. It is observed, however, that such a technique is limited in its application to situations wherein an approximate linear relationship exists between the signal produced by the position responsive transducer and the amount of the error. In the case of a sine wave, this is generally less than 45 degrees. When the amount of the error exceeds 45 degrees, the non-linearity present in the sine wave operates to prevent an accurate determination of the amount of error. The accuracy with which position of the magnetic transducer may be determined consequently quickly decreases.

There is consequently a need to provide for an improved technique for accurately determining position information over a wide range of environmental variations, and particularly with respect to hard disk drives.

SUMMARY

In accordance with the present invention, a method and apparatus are disclosed which provide for the reliable correction of indirectly produced position information. In particular, the limit which has previously existed with respect to the amount by which indirectly produced position information may be in error yet still be reliably corrected has been effectively removed.

Apparatus for production of indirect position information produces a first and second periodic position information signals having a spatial phase difference. Information from the first signal is monitored and compared against reference position information to determine the presence of error. If error is detected, it is compared against a preselected maximum amount of error. If the amount of the error is within established limits, the error is corrected in accordance with the amount of the error. If, however, the amount of the error exceeds an established limit, information from the second signal is used, with position information obtained therefrom adjusted according to the nature of the position information provided by the first and second signal.

In an alternate embodiment, position information from first and second position information signals is additively combined to determine an empirically derived distance between reference points. Thereafter, sensed indirect position information is compared against sensed actual position information to determine any presence of error in the sensed indirect position determination. In response to the determination of an error in the sensed indirect position information, the amount of the error is compared against the empirically derived distance between reference points. If the amount of the determined error exceeds a preselected amount, the next positioning is performed using the position offset relative to the second signal. If the amount of the determined error does not exceed the preselected amount, the next positioning is then performed using the position offset relative to the first signal.

The foregoing described method and apparatus for the correction of error in position information is yet further combined with an externally commutated D.C. motor to effect the accurate and efficient positioning of a magnetic transducer with respect to the surface of a rotating disk storage medium by use of an externally commutated D.C. motor, with the control thereof being accomplished through the use of digital techniques. Broadly state, the control techniques employed provides not only for the commutation of the D.C. motor, but further provides for complete control over the operation of the motor in the positioning of the transducing apparatus through the use of a plurality of operational modes, the selection therebetween being determined by the distance between the present position of the transducer apparatus and the desired position therefor. The operational modes include a Calibration Mode, a High Speed Mode, a Medium Speed Mode, a Transition Mode and a Detent Mode.

Operational parameters associated with the system are determined in the calibration mode. The parameters so determined are used to adjust commands issued to the system in subsequent modes to reflect the values of the parameters measured. Consequently, a significant degree of protection against both short and long term variations in system parameters is provided. The calibration mode provides for the determination of a number of parameters. In particular, the location of commutation positions of the motor are determined. This information is subsequently used to define points at which motor commutation will occur. In addition, as position information of the transducer apparatus assembly is detected through the use of an optical sensor, the parameters associated therewith are measured and stored for later use. In particular, the transducer apparatus assembly is moved a selected amount, and a series of corresponding maximum and minimum values of the signals from optical position transducers coupled thereto is measured to determine corresponding maximum and minimum values. Thereafter, a corresponding operational zero crossing point is determined from the determined maximum and minimum values and used in subsequent position determing operations. In further addition, the location of a preselected track on the storage medium is determined. Subsequent positioning of the transducing apparatus assembly is thereafter done with respect to the location determined for this preselected track.

Subsequent to the receipt of a command to move the transducing apparatus assembly from a present position to a selected position, the difference between the current position of the transducing apparatus assembly and the selected position is determined. If the difference is greater than a first preselected distance, the High Speed Mode of operation is entered, by first entering a Medium Speed Mode, and thereafter entering the High Speed Mode, as more fully discussed hereinafter. In the High Speed Mode, the position of the transducing apparatus is determined with respect to the location of every second track on the rotating disk medium. Relative velocity of the transducing apparatus assembly is thereafter determined from the measured positions and the time between the measurements. Commands to the motor are thereafter produced in response to both the determined velocity and the remaining distance between the current location of the transducer apparatus assembly and the desired location. In the High Speed Mode of operation, the transducer assembly is moved at a substantially constant maximum velocity when the distance between the current position and the desired position of the transducer assembly is greater than a first preselected distance, and according to a table of decreasing velocities thereafter.

As the transducer apparatus approaches the desired position and the corresponding velocity has decreased to a preselected velocity, a Medium Speed Mode of operation is employed wherein position of the transducing apparatus is determined as each track is crossed. As was the case in the High Speped Mode, the velocity of the transducer assembly is adjusted according to a table of velocities as a function of the remaining distance to the destination track in such a fashion as to continue to decrease the velocity of the transducer apparatus. Relative velocity of the transducing apparatus assembly is thereafter determined from the measured position and the time between the measurements. Commands to the motor are thereafter produced in response to both the determined velocity and the remaining distance between the current location of the transducer apparatus assembly and the desired location.

As the transducer apparatus continues to approach the desired position, and the distance between the current position of the transducer apparatus assembly and the desired position becomes less than a second preselected distance, a Transition Mode of operation is entered wherein position information is determined at a higher degree of accuracy than was the case in the High or Medium Speed Modes.

When the distance between the current position of the transduer apparatus assembly and the desired position is less than a third preselected distance, a Detent Mode is entered wherein a Position Integral Differentiation control approach is employed to position the transducing apparatus assembly to the desired location.

In this regard it should be noted that in accordance with the present invention, the accuracy with which position of the transducing apparatus relative to the rotating disk medium is determined is increased as the distance between th current position of the transducing apparatus and the desired position decreases. In particular, in the High Speed Mode, position information is determined with respect to every second track the transducing apparatus crosses in moving toward the desired destination. Thereafter, in the Medium Speed Mode, position information is determined with respect to every track the transducing apparatus crosses. Thereafter, in the Transition Mode, position information is determined with greater accuracy than was the case in the High or Medium Speed Modes, i.e., with respect to individual positions between tracks. Thereafter, in the Detent Mode, position information is monitored with yet further accuracy through the additional use of not only individual positions between tracks, but further with respect to sensed actual position information determined from position information recorded on the disk.

In addition to the foregoing, commutation of the prime mover, i.e., the apparatus moving the transducing apparatus, is further performed at appropriate times as the transducing apparatus is advanced toward the desired destination position. Commutation of the prime mover is, however, suppressed at the destination position.

In addition to the foregoing, pre-recorded position information for each track on the storage medium is further employed in the Detent Mode, as previously referenced. Each track on the storage medium has associated therewith pre-recorded position information from which the position of the transducing apparatus assembly with respect to a selected track may be determined. This pre-recorded track information is sampled on each revolution of the storage medium in the Detent Mode, and position information determined therefrom is employed in positioning of the transducing apparatus assembly with respect to the desired track. In particular, in the Detent Mode, the pre-recorded track information is sampled and compared against indirectly produced position information. If an error is detected in the indirectly produced position information, the amount of the error is next checked against a preselected maximum amount of error. If the error is less than the preselected maximum amount of error, the amount of the detected error is used as a correction factor in subsequently used indirect position information. If, however, the error is greater than the preselected maximum amount of error, indirectly produced position information from the second position information signal is used.

DETAILED DESCRIPTION

In accordance with the present invention, a method and apparatus are disclosed which provide for the improved determination of position information. In position servo systems, reference position information is often available only at discrete intervals of time or at discrete positions. Indirect position information is generally available on a continuous basis, and may be determined from a single position signal. While a single position signal can provide indirect position information, direction of motion cannot always be determined therefrom. Consequently, two position signals are generally present: a first signal to provide position information, and a second position signal to provide direction of motion information and position information in ranges where the first position information signal is not linear.

A position information signal provides position information through a parameter associated therewith, e.g., voltage, current, resistance, etc. Consequently, position information may be obtained through evaluation of the parameter associated with a position information signal.

A wide variety of signals may be used as position information signals, including repetitive and non-repetitive signals of both a linear and non-linear nature, e.g., a linear ramp waveform, triangular waveform, sinusoidal waveform, etc. For the purposes illustrating the present invention, a position information signal having a sinusoidal waveform will be used. It is, however, to be understood that use of a position information signal having a sinusoidal waveform is for illustrative purposes only, and is not to be considered as limiting the principles of the present invention to position information signals having sinusoidal waveforms. To the contrary, the principles of the present invention could likewise be applied to a wide variety of position information signals of other waveform types.

Figure 1A:
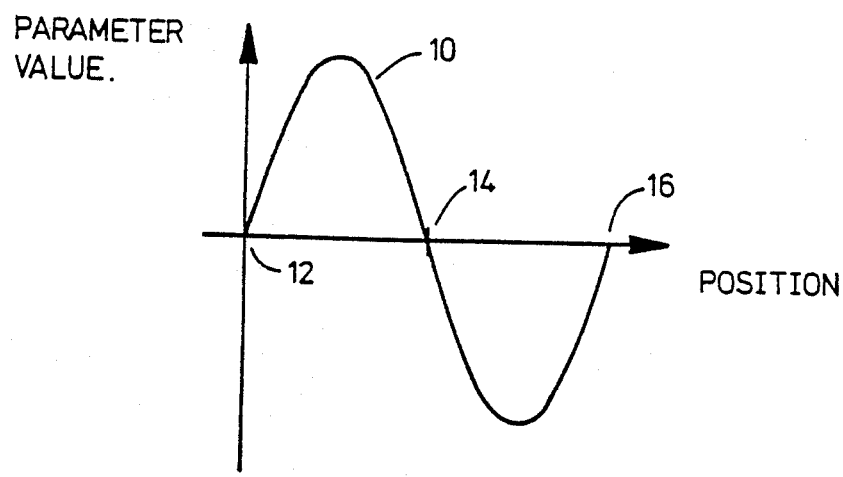
FIG. 1A is an illustration of a position information signal having a sinusoidal waveform.

FIG. 1A illustrates a position information signal 10 having a parameter associated therewith which varies with position in a sinusoidal fashion. Such a waveform could be produced by position transducing apparatus when a prime mover moves a payload across a selected distance. For illustrative purposes, it will be assumed that zero crossings 12, 14 and 16 of said parameter value corresponds to nominal, known reference positions. It will be observed that between said reference positions, evaluation of the value of said parameter would provide continuous position information for a corresponding payload. In addition, the accuracy of the continuous position information obtained from signal 10 may be verified by checking for the presence of reference position information when the position parameter associated with position information signal 10 has a zero value, i.e., at position 12, 14 16.

As is the case with most position information signals, practical considerations often limit the accuracy with which position information of a payload may be determined. By way of illustration with the position information signal of FIG. 1A, it will be observed that an approximately linear relationship exists between position and the value of the paramter associated therewith over a limited range of the position information signal, e.g., within approximately 45 degrees of each zero crossing; outside of said range, the relation between position and the corresponding parameter value becomes somewhat non-linear. Consequently, the accuracy with which position of an associated payload may be determined will decrease when the position information signal is outside of an approximate range of 45 degrees of either side of a zero crossing. This is particularly so at distances approaching 90 degrees from a zero crossing.

Figure 1B:
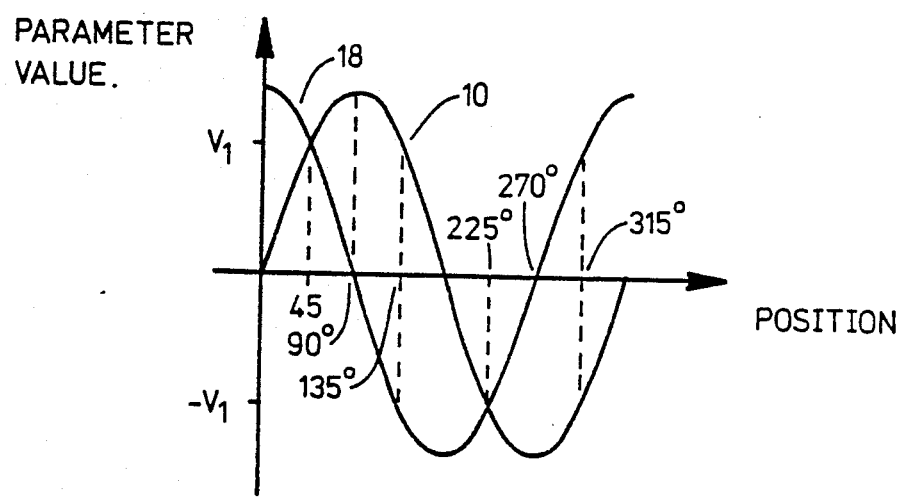
FIG. 1B is an illustration of the position information waveform of FIG. 1A with a second signal from which a direction of motion may be determined.

While e a single position information signal such as is illustrated in FIG. 1A provides position information over a selected range, direction of motion cannot be determined from such a signal alone. Consequently a second signal in typically used in combination with the position information signal to provide direction of motion information. The second signal further provides position information in ranges where the first position information signal is not linear. While such a signal can take a wide variety of forms, a periodic signal identical to the positional information signal displaced in phase therefrom by substantially 90 degrees is frequently used. FIG. 1B illustrates such a signal. Referring to FIG. 1B, signal 10 corresponds to the position information signal previously discussed with respect to FIG. 1A, and signal 18 corresponds to a second signal used in connection with signal 10 to determine direction of motion information. By monitoring both signals 10 and 18, both position as well as direction of motion may be determined in a manner well known to one of ordinary skill in the art.

In accordance with the present invention, broadly stated, when position information may not be reliably determined from a position information signal, e.g., for positions outside of approximately 45 degrees of a zero crossing of position information signal 10, a second information signal is used. Referring once again to FIG. 1B, it will be observed that during the intervals in which signal 10 is not within a linear region of its waveform, i.e., when signal 10 is not within 45 degrees of a zero crossing thereof, direction of motion signal 18 is within a linear region of its waveform, i.e., signal 18 is within 45 degrees of a zero crossings associated therewith. Consequently, in accordance with the present invention, position information for a payload may be continuously determined by monitoring either signal 10 or 18, i.e., using position information from the signal which is currently within an approximate linear range of its waveform.

The foregoing broadly stated principles operate in the following manner. For the purpose of the present illustration, it will be assumed that the absolute value of the parameter associated with position for signal 10 has a value of V1 in response to said signal being 45 degrees displaced from a zero crossing associated therewith. In a similar manner, the absolute value of the parameter associated with position for signal 18 likewise has a value of V1 in response to said signal being 45 degrees displaced from a zero crossing associated therewith. Referring to FIG. 1B, when the absolute value of signal 10 is less than or equal to value V1, the values thereof are used to determine position information. However, when the absolute value of signal 10 exceeds the value V1, signal 18 is thereafter used for position information, i.e., values from signal 18 are used to determine position information for the payload. When the absolute value of signal 18 exceeds the value of V1, then position information is again determined from signal 10. Stated differently, when the position of the payload corresponds to position values of signal 10 between 0 and 45 degrees, signal 10 is used to determine position information for the associated payload. However, when the position of the payload corresponds to values of signal 10 between 45 degrees and 135 degrees, signal 18 is used to determine position information for the associated payload. When the position of the payload corresponds to values of signal 10 between 135 degrees and 225 degrees, signal 10 is used to determine position information for the associated payload. When the position of the payload corresponds to values of signal 10 between 225 degrees and 315 degrees, signal 18 is used to determine position information for the associated payload. When the position of the payload corresponds to values of signal 10 between 315 degrees and 360 degrees, signal 10 is used to determine position information for the associated payload.

While the foregoing broadly describes a method of continuously determining position information for a payload by monitoring one of two signals, practical considerations have lead to the monitoring of values associated with the signal which is presently not being used for position information. Corresponding values for corresponding positions on the signal currently not being used to provide position information are averaged, and the average value so determined is thereafter used when it is necessary to switch between position information signals. By way of illustration, assuming position information signal 10 is currently being used for position information, corresponding values for corresponding positions of signal 18 are monitored and averaged. Thereafter, when it becomes desirable to switch to signal 18 for position information, the average of past values for a corresponding position is used, rather than a current value of signal 18, thereby ensuring a degree of protection against variations in phase and amplitude relationships between the two different position information signals, i.e., signals 10 and 18.

In further addition to the foregoing, hysteresis is employed in switching between position information signals, e.g., the particular point at which a change from signal 10 to signal 18 is performed differs from the point at which a change from signal 18 back to 10 is performed. By way of illustration, position information will be subsequently taken from signal 18 when the value of the position parameter associated with position information signal 10 exceeds a first value, and thereafter, position information will be subsequently taken from signal 10 when the value of the position parameter associated with position information signal 18 exceeds a second value.

While the foregoing broadly describes one method of obtaining continuously accurate position information, in the preferred embodiment, an alternate technique is employed. Broadly stated, when position information of an associated payload is desired, values from both position information signal 10 and direction of motion signal 18 are sampled. The value obtained from position information signal 10 is used to determine a distance from the corresponding zero crossing thereof. In a similar manner, the value from position direction signal 18 is used to determine a distance from the corresponding zero crossing of position direction signal 18. The two distances so obtained are then added to obtain an empirically derived distance between the zero crossing of position information signal 10 and direction of motion signal 18. Thereafter, the empirically derived distance is divided by two, to determine an empirically derived half-distance between the zero crossings of signals 10 and 18. The distance value obtained from position information signal 10 is then compared with the half-distance value. If the distance value obtained from position information signal 10 is less than the half-distance value, position information is thereafter determined from position information signal 10. However, if the distance value obtained from position information signal 10 is greater than the half-distance value, position information is thereafter determined from direction of motion signal 18. By employing such a method, accurate position information may be continuously obtained without discontinuity regardless of a position of the corresponding payload.

As was previously discussed, the accuracy of position information provided by a position information signal may be verified when the payload is positioned over reference positions. In the current illustration, reference positions are expected to occur when position information signal 10 has a zero value. Consequently, the validity of position information provided from position information signal 10 may be verified by checking the value of position information signal 10 when the associated payload is known to be positioned over a reference position. If the value of position information signal 10 is zero at said time, then the accuracy of position information signal 10 has been established. However, if position information signal 10 is not zero when the payload is positioned over a reference position, then an error is known to exist.

While an error in position determination is not desirable, the presence of such does not preclude obtaining useful position information from position information signal 10. Broadly stated, by monitoring the value of position information signal 10 upon the passage of the payload over a reference position, an offset value can be obtained and thereafter used in the interpretation of subsequent values of position information signal 10. In particular, upon the detection of the passage of the payload over a reference position, the corresponding value of signal 10 may be measured. The measured value is then used to determine an offset distance, i.e., the offset distance represents the amount by which a position indicated by a value of position information signal 10 is in error. The amount of position error so determined may thereafter be used in the interpretation of subsequent values of position information signals 10 or 18, as more fully discussed hereinafter. By way of illustration of the foregoing, assume that coincident with the passage of a payload over a reference position, position information signal 10 has a non-zero value. The non-zero value is thereafter used to determine a corresponding distance. As the corresponding distance determined from the non-zero value represents an error in position information, subsequent distances determined from values of position information signal 10 or 18 may be offset by the corresponding distance so determined to determine corrected position information.

While the present invention has many applications, it will generally be described with reference to a rotating disk storage device employing commutation of a prime mover. It will be apparent to those skilled in the art that the present teachings may advantageously be employed in other applications where the reliable correction of indirectly produced information is desired. Consequently, the following description of the present invention is not to be interpreted as limiting the present invention to a rotating disk storage system, or to servo systems employing commutation of a prime mover.

Figure 2:
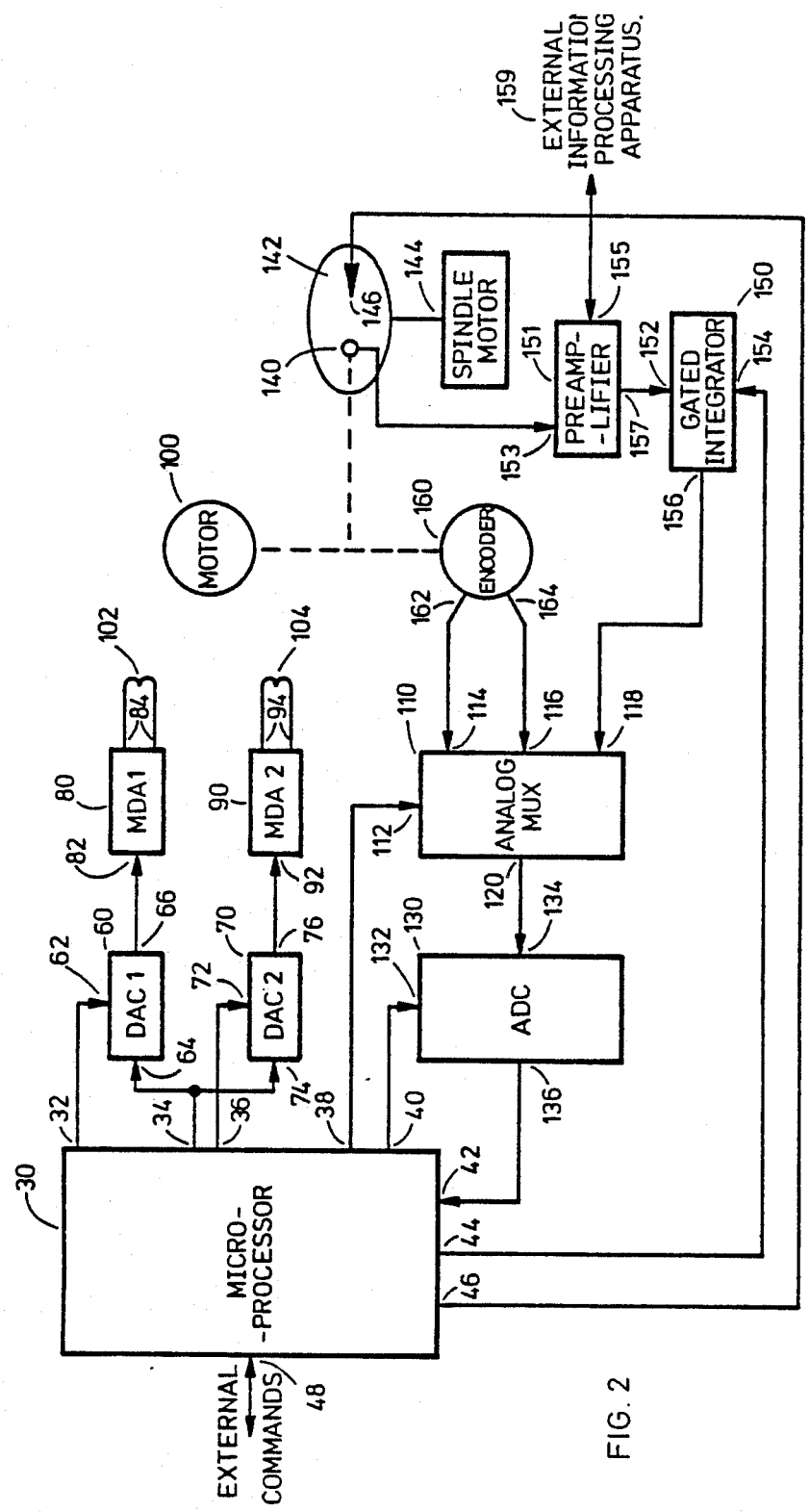
FIG. 2 is a broad functional block diagram of a hard disk storage system in accordance with the present invention.

FIG. 2 is a functional block diagram of apparatus in accordance with the present invention. Referring to FIG. 2, Microprocessor 30 functions as a central control element to orchestrate the operations of the transducer positioning apparatus, as will be more fully described hereinafter. Microprocessor 30 communicates with devices external thereto by information passing through a number of functional terminals associated therewith. Microprocessor 30 selects Digital-to-Analog Converter 60 for receipt of digital information placed on data bus terminal 34 by placing an appropriate signal on terminal 32. In a similar fashion, Microprocessor 30 selects Digital-to-Analog Converter 70 for receipt of digital information placed on data bus terminal 34 by placing an appropriate signal on terminal 36. Microprocessor 30 controls the operation of Analog Multiplexer 110 by control signals placed on terminal 38. Microprocessor 30 controls the operation of Analog-to-Digital Converter 130 by control signals placed on terminal 40. Microprocessor 30 receives information from Analog-to-Digital Converter 130 on terminal 42. Microprocessor 30 places control information for Gated Integrator 150 on terminal 44. Microprocessor 30 receives periodic angular position information defining a selected angular position of a disk 142 on terminal 46. Microprocessor 30 receives information from and communicates to other external devices by information coupled to terminal 48. It is understood that the foregoing discussion of particular terminals through which Microprocessor 30 communicates with other devices was in terms of functionality of the operations being performed; the exact nature and manner in which a particular type of microprocessor device would in fact accomplish the aforedescribed communication would be determined by the particular type of device selected, the details as to device interfacing being apparent to one of ordinary skill in the art. In the preferred embodiment, Microprocessor 30 was implemented by a model 6301 microprocessor manufactured by Hitachi Corporation of Tokyo, Japan.

Digital-to-Analog Converter 60 has associated therewith a select terminal 62, an input terminal 64 and an output terminal 66. Digital-to-Analog Converter 60, responsive to a select signal present on select terminal 62, and a digital word on terminal 64, functions to couple an analog value to terminal 66 having a magnitude proportional to the digital word coupled to terminal 64.

Digital-to-Analog Converter 70 has associated therewith a select terminal 72, an input terminal 74 and an output terminal 76, and functions in an identical manner as Digital-to-Analog Converter 60. While any of a wide variety of digital-to-analog converter devices may be used, a model AD7528 Dual Analog-to-Digital Converter manufactured by Analog Devices of Norwood, Mass. was used in the preferred embodiment to implement the functions of Digital-to-Analog Converters 60 and 70.

Motor 100 is a two pole, 2 phase D.C. motor having motor windings 102 and 104 associated therewith. In this regard it is to be understood that while a two pole, 2 phase externally commutated brushless D.C. motor was used in the preferred embodiment, and is broadly illustrated in FIG. 2, other types of externally commutated positioning apparatus may likewise be employed, including externally commutated voice coil motors. In a similar fashion, while the externally commutated positioning apparatus was of a two pole design in the preferred embodiment, any number of poles could likewise be employed in accordance with the teachings of the present invention. Such other types of externally commutated positioning apparatus having a plurality of poles would be apparent to one of ordinary skill in the art and are to be considered to be within the teachings of the present invention.

Motor Drive Amplifier 80 has associated therewith input terminal 82 and output terminal 84, and functions responsive to an analog signal coupled to input terminal 82 to produce a corresponding analog output signal on output terminals 84 suitable for driving a winding of motor 100.

Motor Drive Amplifier 90 has associated therewith input terminal 92 and output terminals 94, and functions in an identical manner as Motor Drive Amplifier 80. While the functions of Motor Drive Amplifiers 80 and 90 may be implemented by any of a wide variety of devices, model L272 Dual Power Operational Amplifiers manufactured by SGS Semiconductor Corporation of Phoenix, Ariz. were employed in the preferred embodiment.

Analog Multiplexer 110 has associated therewith select terminal 112, analog input terminals 114, 116 and 118, and analog output terminal 120. Analog Multiplexer 110 responsive to a select signal coupled to select terminal 112 operates to couple an analog signal present on one of analog input terminals 114, 116 or 118 to analog output terminal 120. The particular analog input terminal which is coupled to analog output terminal 120 is determined by the signal coupled to select terminal 112. While the functions of Analog Multiplexer 110 may be implemented by any of a wide variety of analog multiplexer devices, a model 4051 Analog Multiplexer manufactured by National Semiconductor of Santa Clara, Calif. was used in the preferred embodiment.

Analog-to-Digital Converter 130 has associated therewith select terminal 132, analog input terminal 134 and digital output terminal 136, and functions responsive to a select signal coupled to select terminal 132 to convert the magnitude of the analog signal which is present on analog input terminal 134 to a corresponding digital value on digital output terminal 136. While the functions of Analog-to-Digital Converter 130 may be implemented by any of a wide variety of analog-to-digital devices, a model ADC0820 Analog-to-Digital Converter manufactured by National Semiconductor of Santa Clara, Calif. was used in the preferred embodiment of the present invention.

Disk 142 serves as a storage medium for information, and is rotated by Spindle motor 144. Transducer apparatus 140 functions to transfer information onto as well as retrieve information from the surface of disk 142. Transducer apparatus 140 is mechanically coupled to the rotor of Motor 100 in such a fashion that Transducer apparatus 140 may be moved relative to selected positions on the surface of disk 142 responsive to the rotation of the rotor of Motor 100. In this regard, it is understood that the movement of Transducer assembly 140 across the surface of Disk 142 may be according to either the linear-linear, rotary-rotary or rotary-linear positioning schemes, using either a direct or indirect coupling arrangements. In the preferred embodiment, Transducer assembly 140 was indirectly coupled to the rotor of Motor 100 by a standard band and pulley coupling apparatus, well known to one of ordinary skill in the art.

Preamplifier 151 has associated therewith terminals 153, 155 and 157, and operates in conjunction with Transducer apparatus 140 in the electrical coupling of information between Transducer apparatus 140, External Information Processing Apparatus 159 and Gated Integrator 150. In particular, Preamplifier 151 functions to transfer information between Transducer apparatus 140 and External Information Processing Apparatus 151, and from Transducer assembly 140 to Gated Integrator 150, as more fully described hereinafter. While any of a wide variety of preamplifier devices well known to one of ordinary skill in the art may be used, a model 501 Preamplifier manufactured by Silicon Systems, Inc of Tustin, CA., was used in the preferred embodiment.

Disk 142 has associated therewith Index Sensor 146 which functions to produce a signal once per revolution of Disk 142 responsive to the passage of a selected angular position thereby.

Gated Integrator 150 has associated therewith input terminal 152, control terminal 154 and output terminal 156, and operates responsive to a signal coupled to control terminal 154 to rectify and thereafter electrically integrate a signal coupled to input terminal 152, producing the corresponding output signal on output terminal 156, as will be more fully discussed hereinafter.

Encoder 160 is mechanically coupled to Motor 100, and consequently functions to provide information with respect to the position of transducer assembly 140 with respect to the surface of disk 142. In particular, responsive to the rotation of the shaft of Motor 100, Encoder 160 produces two periodic signals, one on terminal 162 and the other on terminal 164. The periodic signals are typically sine and cosine, or triangular waveforms displaced with respect to each other by ninety degrees. The signals produced by Encoder 160 are used to determine the relative position of Transducer apparatus 140 with respect to disk 142. In the preferred embodiment, each zero crossing of a selected signal from Encoder 140 defines the approximate location of a track on disk 142. As each of the signals produced by Encoder 160 typically has a relative linear and non-linear portion, both signals are typically employed for the accurate determination of position information. In particular, when a non-linear portion of one signal is encountered, the alternate signal is typically in the relatively linear portion, and is used for the determination of position information, as more fully discussed hereinafter. Consequently, by switching between the two signals as necessary, continuously accurate position information of Transducer assembly 140 with respect to the surface of Disk 142 may be determined. Encoder 160 may be any of a wide variety of encoding devices. The number of cycles of the periodic signals produced per revolution by Encoder 160 in response to rotation of the shaft of Motor 100 is referred to as the pitch. Typical pitches may be 1000 cycles per 360 degree rotation of the shaft of Motor 100. In the preferred embodiment, Encoder 160 has a pitch of 600, and is manufactured by Computer Optical Products of Chatsworth, Calif.

The foregoing described apparatus is configured in the following manner. Terminal 32, 34, 36, 38, 40, 42 and 44 of Microprocessor 30 is coupled to terminal 62 of Digital-to-Analog Converter 60, terminals 64 and 74 of Digital-to-Analog Converters 60 and 70 respectively, terminal 72 of Digital-to-Analog Converter 70, terminal 112 of Analog Multiplexer 110, terminal 132 of Analog-to-Digital Converter 130, terminal 136 of Analog-to-digital Converter 136, and terminal 154 of Full Wave Rectifier and Gated Integrator 150, respectively. The signal from Index Sensor 146 is coupled to terminal 46 of Microprocessor 30. Microprocessor 30 communicates with respect to external positioning commands through terminal 48. Terminal 66 of Digital-to-Analog Converters 60 is coupled to terminal 82 of Motor Drive Amplifier 80. Terminals 84 of Motor Drive Amplifier 80 are coupled to winding 102 of Motor 100. In a similar fashion, terminal 76 of Digital-to-Analog Converter 70 is coupled to terminal 92 of Motor Drive Amplifier 90. Terminals 94 of Motor Drive Amplifier 90 are coupled to winding 104 of Motor 100. Terminals 162 and 164 of Encoder 160 are coupled to terminals 114 and 116, respectively, of Analog Multiplexer 110. Transducer apparatus 140 is coupled to terminal 153 of Preamplifier 151. Preamplifier 151 communicates with External Information Processing Apparatus 159 through terminal 155. Terminal 157 of Preamplifier 151 is coupled to terminal 152 of Full Wave Rectifier & Gated Integrator 150. Terminal 156 of Full Wave Rectifier and Gated Integrator 150 is coupled to terminal 118 of Analog Multiplexer 110.

Figure 3:
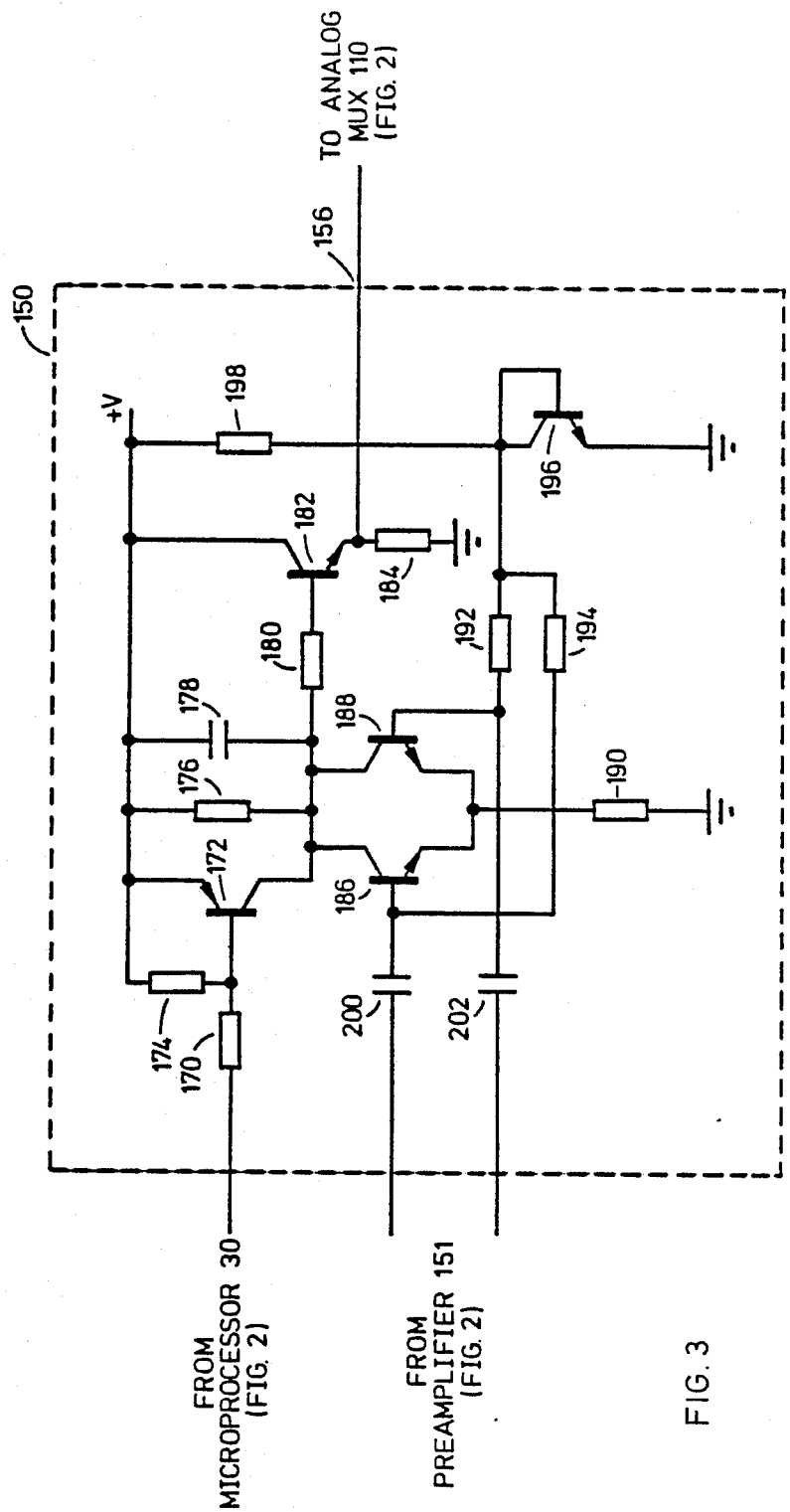
FIG. 3 is a schematic diagram of an implementation of a Gated Integrator employed in the present invention.

FIG. 3 illustrates the apparatus employed in the preferred embodiment to implement Gated Integrator 150. Referring to FIG. 3, resistor 170 couples the signal from terminal 44 of Microprocessor 30 to the base of transistor 172, and corresponds to terminal 154 of Gated Integrator 150 (FIG. 2). Resistor 174 couples the base of transistor 172 to the emitter thereof. Resistor 176 and capacitor 178 are coupled between the emitter and collector of transistor 172. Resistor 180 couples the collector of transistor 172 to the base of transistor 182. The emitter of transistor 172 and the collector of transistor 182 are coupled to a source of positive potential. The emitter of transistor 182 is coupled to a ground reference by resistor 184. The respective collectors of transistors 186 and 188 are both coupled to the collector of transistor 172, and the emitters of both transistors 186 and 188 are likewise coupled together. Resistor 190 couples the emitters of transistors 186 and 188 to a ground reference. The base of transistor 186 is coupled to the collector of transistor 196 through resistor 194, and the base of transistor 188 is coupled to the collector of transistor 196 through resistor 192. The collector of transistor 196 is coupled to a source of positive potential through resistor 198. The base of transistor 196 is coupled to the collector thereof. The emitter of transistor 196 is coupled to ground reference. The signal from transducer assembly 140 is coupled to the base of transistors 186 and 188 by coupling capacitors 200 and 202, and together correspond to terminal 152 of Gated Integrator 150 (FIG. 2). The emitter of transistor 182 is coupled to terminal 118 of Analog Multiplexer 110, and corresponds to terminal 156 of Gated Integrator 140 (FIG. 2).

The apparatus of FIG. 3 operates in the following manner. Responsive to a signal from terminal 44 of Microprocessor 30, transistor 172 operates to discharge capacitor 178. Thereafter, a signal from transducer assembly 140 operates to control the charging of capacitor 178 by the operation of transistors 186 and 188. The potential to which capacitor 178 charges is coupled to terminal 118 of Analog Multiplexer 110 by the emitter follower combination of transistor 182 and resistor 184. Consequently, subsequent to a signal from terminal 44 of Microprocessor 30, Gated Integrator 150 operates to electrically integrate the signal from transducer assembly 140, and couple the value thereof to Analog Multiplexer 110, where it is subsequently coupled to Microprocessor 30 through Analog-to-digital Converter 130, as more fully discussed hereinafter.

Figure 4:
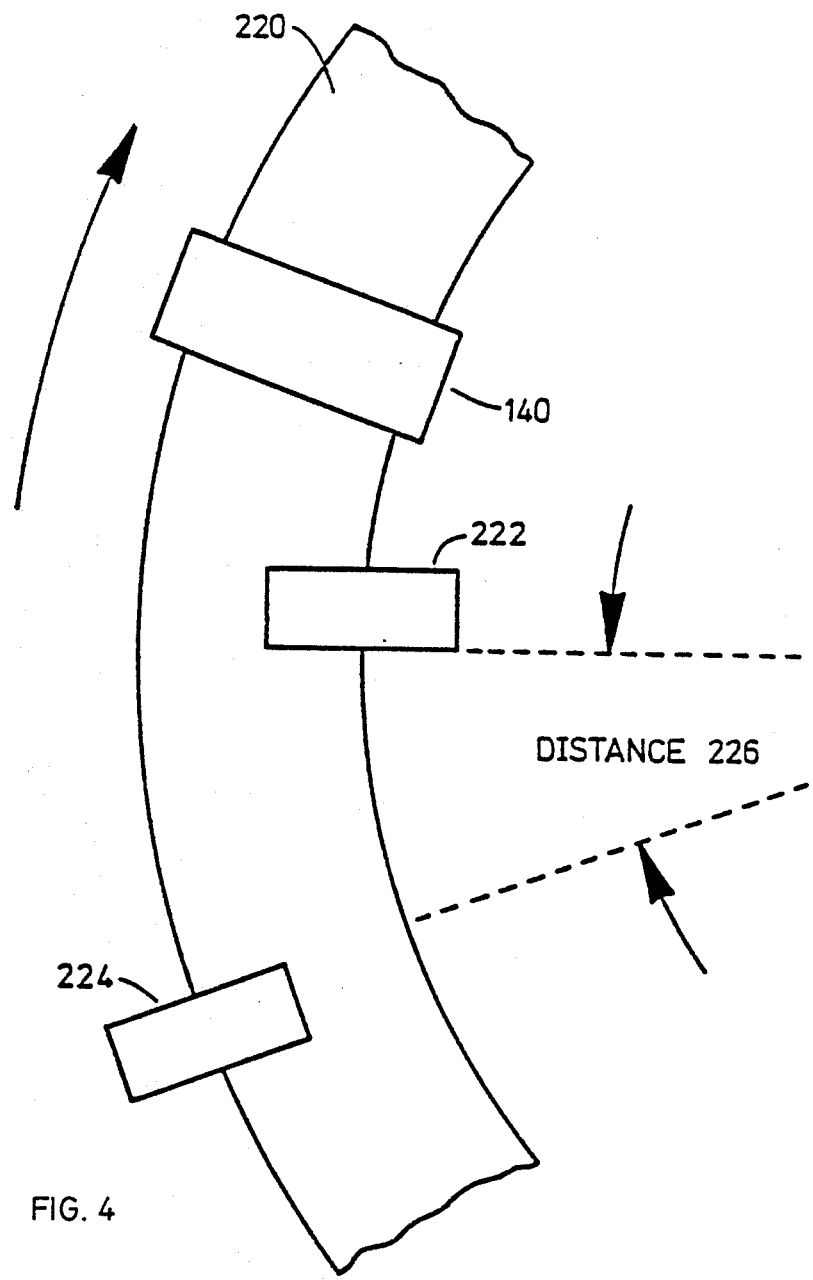
FIG. 4 illustrates positional information of servo bursts used in the present invention.

Information is typically stored across the surface of disk 142 in concentric bands referred to as tracks. Information used to define precise track location is placed on each track, as broadly illustrated in FIG. 4 with respect to a single track 220. Referring now to FIG. 4, a segment of a track 220 on the surface of Disk 142 is illustrated. For the purposes of the present discussion, it is assumed that Transducing apparatus 140 is positioned directly over track 220. Two discrete packets of information, referred to as servo bursts, are recorded on each track on the surface of disk 142, indicated as servo burst 222 and servo burst 224 in FIG. 4. Each of the discrete servo bursts 222 and 224 are positioned adjacent to and on opposite sides of the center of track 220, and displaced from each other by a selected distance 226. As a result of the foregoing, each of servo bursts 222 and 224 will pass under transducer apparatus 140 at different points in time. The maximum amplitude of the resulting signal in transducer 140 in response to the passage of each of servo bursts 222 and 224 is measured by the operated of Gated Integrator 150, compared by Microprocessor 30, and used to correct the positioning of Transducer apparatus 140 with respect to track 220 in the following manner. If Transducer apparatus 140 is properly centered on track 220, the maximum amplitudes produced by servo burst 222 and 224 passing thereunder will be equal. However, if Transducing apparatus 140 is not correctly centered over track 220, there will be a difference in the maximum amplitudes produced by each of servo burst 224 and 226 when read by Transducer apparatus 140. The detection of a difference in amplitudes is thereafter used by Microprocessor 30 to properly position transducer assembly 140 with respect to track 220, as will be more fully discussed hereinafter.

The foregoing operates in the following manner. Referring once again to FIG. 2, Index Sensor 142 operates to produce a signal indicating the passage of a selected angular position on disk 142 thereby. This identified position serves as a reference position not only for the location of tracks on the surface of disk 142, but also for information stored on individual tracks on disk 142. In particular, servo bursts 222 and 224 are recorded on disk 142 in such a fashion to pass under transducer 140 immediately following the passage of the reference position illustrated by the signal produced by Index Sensor 142. In operation, immediately subsequent to the receipt of the signal from Index Sensor 142 by Microprocessor 30 on terminal 46, Microprocessor 30 effects the resetting of capacitor 178 of Gated Integrator 150 (FIG. 3) by the generation of a signal to terminal 44 and coupled to terminal 156 of Gated Integrator. Thereafter, the signals produced in Transducer 140 (FIG. 4) by the passage of servo burst 222 thereunder and the subsequent integration thereof is coupled from Gated Integrator terminal 156 to Analog Multiplexer terminal 118. Microprocessor 30, by placing an appropriate signal on terminal 38 thereof effects the selection of the signal from Gated Integrator 150 for coupling to Analog-to-Digital Converter 130. Thereafter, in response to an appropriate signal from terminal 40 of Microprocessor 30 coupled to terminal 132 of Analog-to-Digital Converter 130, the magnitude of the amplitude of the signal produced by servo burst 222 will be converted to a corresponding digital value, and coupled to terminal 42 of Microprocessor 30. The foregoing process will then be repeated with respect to servo burst 224. Microprocessor 30 will thereafter compare the amplitudes resulting from the passage of servo bursts 222 and 224: equality of the two digital words indicating the correct positioning of transducer 140 (FIG. 3) over track 220, and inequality indicating incorrect positioning. Consequently, the position of transducer assembly 140 with respect to a track on Disk 142 may be precisely determined, and the position thereof subsequently corrected as necessary, as more fully described hereinafter. It will be understood in this regard that while the previously discussed zero crossing on a selected one of the signals produced by Encoder 160 is intended to identify the approximate location of tracks, the effect of a number of practical considerations results in a variation in the actual location of the tracks on the surfaces of Disk 142. In this regard it is recognized by those skilled in the art that thermal effects will result in the change of location of tracks on the surface of Disk 142 in relationship with the magnetic transducer. In particular, as disk 142 undergoes thermal expansion or contraction, the relative positions of tracks on the surface of disk 142 will change with respect to the zero crossings of the signal from Encoder 160. Consequently, actual locations of tracks on the surface of disk 142 will be offset from locations indicated by zero crossings of the selected signal from Encoder 160. Consequently, the position information determined from the aforedescribed servo bursts is used to determine an offset value for use with position information from Encoder 160 in determining the location of tracks on the surface of disk 142.

In accordance with the present invention, broadly stated, upon the occurrence of a signal from Index Sensor 146, as sensed by Microprocessor 30 on terminal 46 (FIG. 2), Microprocessor 30 then determines position information from both position signals from Encoder 160. The particular signal which is currently within a linear region of its waveform is then used to determine position information, i.e., the particular position indicated by a value from a linear region of the selected position signal is thereafter used define locations of tracks on the surface of disk 142 in subsequent positioning of Transducing apparatus 140. Consequently, values from both position signals are read, and a decision is made with respect to which of the two signals is to be used for position information. The signal which is currently producing a value which is within a linear region of its waveform is the position signal which is selected for position information.

In further accordance with the present invention, due to variations in phase and amplitude relationships, the value from the position signal which is not selected upon the aforedescribed reading process which occurs upon the occurrence of each index pulse, is stored. Values of the waveform obtained from previous readings are then combined with the value just obtained to maintain an average value. Consequently, when it becomes necessary to change between position signals, the foregoing described averaging process provides a reliable position value with respect to the new position signal, i.e., a means of protection against variations resulting from phase and amplitude relationships between the two signals provided by Encoder 160.

In further addition to the foregoing, hysteresis is employed in the process of switching between position signals from Encoder 160. Broadly stated, the particular value selected at which switching will occur from the first position signal to the second is different from the value selected at which switching will occur from the second position signal back to the first. In this way, repeated switching back and forth between the two position signals at a signal switch point is avoided.

While the foregoing broadly describes the apparatus and method according to the present invention to maintain continuously accurate position information for Transducing apparatus 140 with respect to tracks on the surface of Disk 142, in the preferred embodiment, the values of both position signals from Encoder 160 are monitored at the conclusion of each re-positioning of Transducing apparatus 140 with respect to a selected location on Disk 142. The values so read are then translated into corresponding position information. The position information determined from each of the position signals indicates the distance from the zero crossing for each of the respective information signals. In accordance with the present invention, these two values are then added together to determine a distance between the zero crossings of the two position signals. The sum of the two values will hereinafter be referred to as a half-track distance. Thereafter, the half-track distance is divided by two to determine what will hereinafter be referred to as a quarter-track distance.

Thereafter, upon the occurrence of a signal from Index Sensor 146, the amplitudes from each of the two aforedescribed servo burst are read. If position adjustment is necessary, Transducing apparatus 140 is moved by a selected distance in the direction indicated to effect the required position adjustment. In the preferred embodiment, the selected distance is four microinches. If position adjustment is necessary, then the previously discussed offset value is likewise adjusted to reflect the amount of position adjustment which was introduced. In response to an adjustment in the offset value, the new offset value is compared with the previously discussed quarter-track distance. If the adjusted value for the offset if less than the quarter-track distance previously discussed, then position information will continue to be determined from the same position signal. However, if the adjusted value for the offset is greater than the quarter-track distance previously discussed, then subsequent position information will be determined from the alternate position signal. Consequently, as a result of the foregoing, continuously accurate position information for Transducing apparatus 140 with respect to the surface of Disk 142 will be available.

Figure 5A:
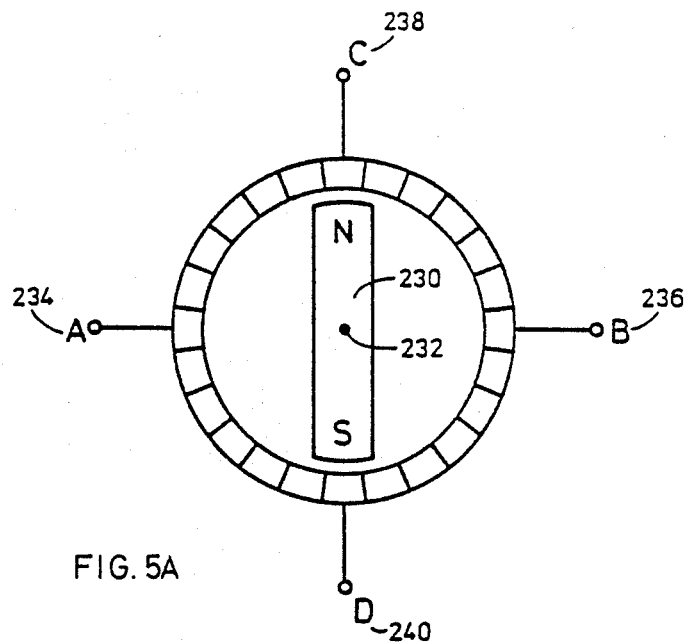
FIGS. 5A, 5B and 5C are broad functional illustrations of externally commutated motors capable of producing rotational and linear displacement of transducing apparatus in accordance with the present invention.

In accordance with the present invention, a two pole, two phase torque motor may be used, as broadly illustrated in FIG. 5A. Referring to FIG. 5A, a bar magnet 230 is positioned in the center of a circularly shaped magnetic permeable material, and pivoted for rotation at its center point 232. Terminals A 234 and B 236 represent terminals for windings about the circularly shaped magnetic permeable material. In particular, a first winding is wound about a first half, and a second winding about a second half of the circularly shaped magnetic permeable material, with the respective ends thereof connected to terminals A 234 and B 236. The windings are wound in such a manner that when a current is passed through the windings from terminal A 234 to terminal B 236, magnet 230 will rotate in a first direction approximately 90 degrees from an initial position approximately midway between the end points, i.e., terminal A 234 and B 236 of the windings. If the current is then reversed, magnet 230 will will then rotate approximately 90 degrees in the opposite direction. In a similar fashion, terminals C 238 and D 240 likewise represent terminals for similar windings about the circular shaped magnetic permeable material, and are displaced from the previously discussed windings by 90 degrees. The windings connected to terminals C 238 and D 240 function in a similar manner: current in a first direction from terminal C 238 to terminal D 240 will result in rotation of magnet 230 approximately 90 degrees in a first direction from an initial position approximately midway between the end points, i.e., terminal C 238 and D 240, of the windings. If the current is then reversed, magnet 230 will then rotate approximately 90 degrees in the opposite direction. The first set of windings about the circularly shaped magnetic permeable material which connect to terminals A 234 and B 235 correspond to a single coil 102 or 104 of FIG. 2, and the second set of windings which connect to terminals C 238 and D 240 correspond to the other single coil, 104 or 102 of FIG. 2.

Figure 5B:
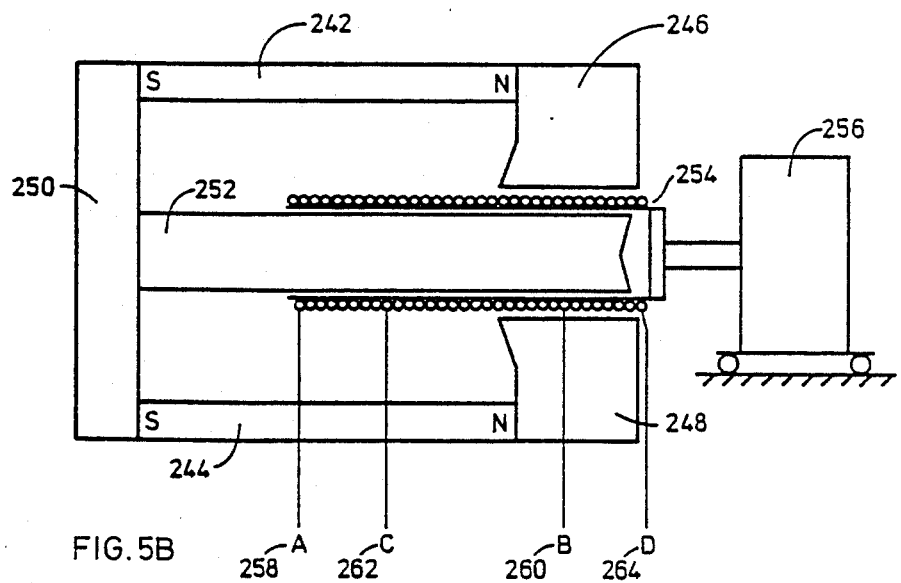

While the foregoing has broadly described one type of motor which may be used to produce rotational movement, it is to be understood that the teachings of the present invention may likewise be applied to other types of commutated motors, including a linear voice coil motor. FIG. 5B broadly illustrates a commutated linear voice coil motor which would be used in accordance with the teachings of the present invention. Referring to FIG. 5B, two magnets 242 and 244 are positioned adjacent to pole pieces 246 and 248, respectively. In this regard, like poles are positioned against the respective pole pieces, i.e., a north pole of magnet 242 is positioned adjacent to pole pieces 246, and a north pole of magnet 244 is positioned adjacent to pole piece 248. The opposite poles of magnets 242 and 244 are each positioned adjacent to a common member 250, which further has placed adjacent to it a member 252. The members 246, 248, 250 and 252 operate to complete the respective magnetic circuits for magnets 242 and 244: the magnetic circuit associated with magnet 242 being comprised of members 246, 252 and 250, and in a similar manner, the magnetic circuit associated with magnet 244 being comprised of members 248, 252 and 250. A further member 254 having windings therearound is arranged for motion over member 252 under the influence of the magnetic fields produced by magnets 242 and 244 and a current flowing in the windings associated therewith, in a manner well known to those skilled in the art. Member 254 is further coupled to a payload 256. In accordance with the teachings of the present invention, multiple windings may be placed around member 254. In particular, a first winding terminating at points A 258 and B 260, is positioned at a selected position along the length of member 254; e.g., adjacent to one end of member 254 and extending approximately $\frac{3}{4}$ of the length thereof. A second winding terminating at points C 262 and D 264 is positioned at a selected position along the length of member 254; e.g., adjacent to the opposite end of member 254, and extending approximately $\frac{3}{4}$ of the length thereof. In a similar manner as previously discussed with respect to the motor of FIG. 5A, the windings associated with member 254 may likewise be commutated in accordance with the teachings of the present invention.

Figure 5C:
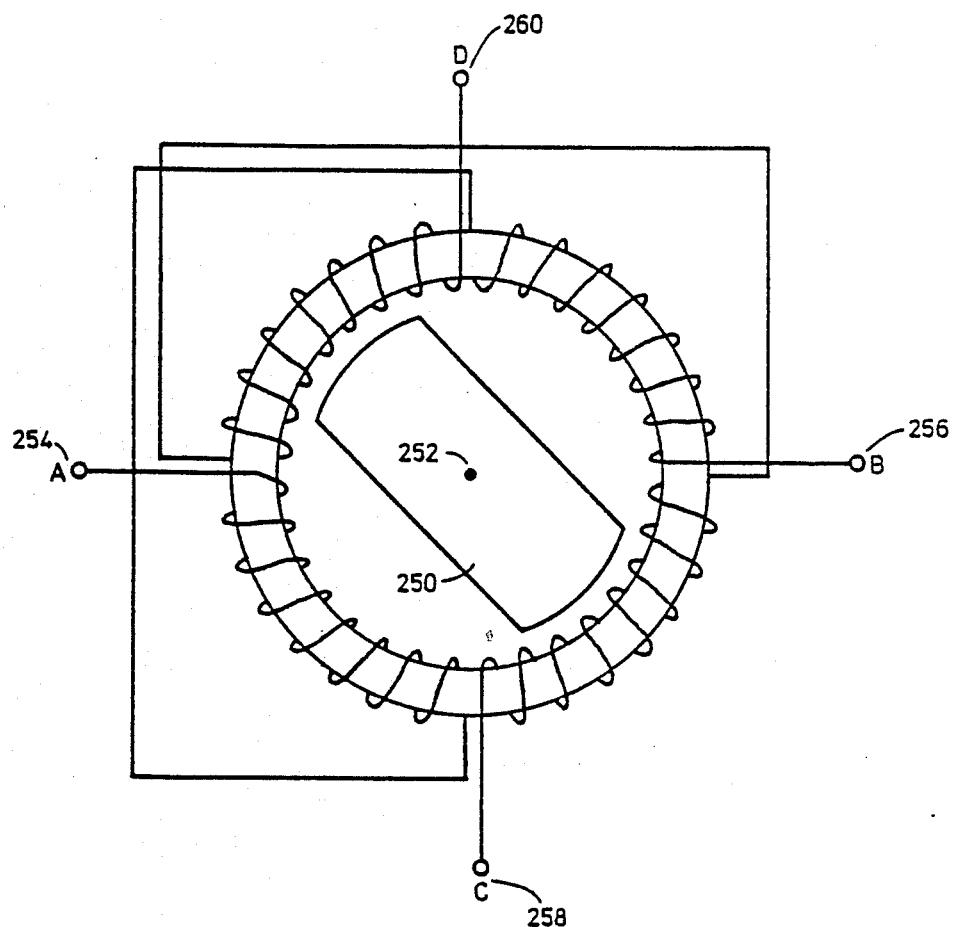

The position motor used in the preferred embodiment of the present invention is broadly illustrated in FIG. 5C. Referring to FIG. 5C, a bar magnet 250 is positioned in the center of a circularly shaped magnetic permeable material, and pivoted for rotation at its center point 252. Terminals A 254, B 256, C 258 and D 260 represent terminals for windings about the circularly shaped magnetic permeable material. Broadly stated, four identical coils are wound occupying the four quadrants of the motor core. Windings from coils occupying opposite quadrants are connected in series to form two effective windings. Terminals A 254 and B 256 comprise the terminals for the first effective winding, and terminals C 258 and D 260 comprise the terminals for the second effective winding. The windings occupying opposite quadrants are connected in a sense such that the magnetic flux produced by one coil will be in opposition to that produced by the other coil of the same winding.

Rotation of bar magnet 250 is effected by the simultaneous excitation of current in the two effective windings. The direction of current in the two effective windings must be changed as bar magnet 250 rotates through successive 90 degree increments. The direction of the current is given in Table 1 below.

TABLE 1

| | |
|---|---|
| Direction of current for first 90 degree rotation of bar magnet 250 | Terminal A 254 to terminal B 256 and Terminal D 260 to terninal C 258 |
| Direction of current for second 90 degree rotation of bar magnet 250 | Terminal A 254 to terminal B 256 and Terminal C 258 to terminal D 260 |
| Direction of current for third 90 degree rotation of bar magnet 250 | Terminal B 256 to terminal A 254 and Terminal C 258 to terminal D 260 |
| Direction of current for fourth 90 degree rotation of bar magnet 2501 | Terminal B 256 to terminal A 254 and Terminal D 260 to terminal C 258 |

Terminals A 254 and B 256 associated with a first effective winding correspond to ether motor winding 102 or 104 (FIG. 2). Terminals C 258 and D 260 would correspond to the remaining motor winding, i.e., motor winding 104 to 102.

The characteristics of the motor used in the preferred embodiment are those of a four step per revolution stepper motor, as will be understood by those skilled in the art. When the coils of the motor are excited with a fixed level of current as described in Table 1, motor torque is developed, which tends to cause rotation of the rotor toward a magnetic null or zero torque position.

With the windings of the motor excited to effect rotation of the rotor through one of the four 90 degree segments, the motor will exhibit approximately a constant torque tending to rotate the rotor toward the magnetic null.

From the foregoing it should be understood that the teachings of the present invention may be applied by one of ordinary skill in the art to a broad range of commutated motors. The foregoing descriptions are intended as illustrative of several types of motors which may be used with the present invention, and are not to be interpreted as limiting the application of the present invention to the particular types of motors discussed.

Broadly stated, the apparatus of FIG. 2 operates to position transducer 140 to a selected position on disk 142 in the following manner. Referring once again to FIG. 2, the apparatus first performs a calibration sequence to determine current values of parameters associated with the system. In particular, the commutation points for Motor 100 are determined, the maximum and minimum values for both periodic signals produced by Encoder 160 are determined, and the location of a selected track on the surface of disk 142 is determined.

The commutation points for Motor 100 are determined in the following manner. In the preferred embodiment, Motor 100 has a total of four magnetic nulls, displaced ninety degrees from each other. In addition, Motor 100 has a total of four commutation points which are likewise displaced ninety degrees from each other. As a commutation point occurs at a point midway between the magnetic nulls, the displacement between a magnetic null and a commutation point is forty five degrees. Mechanical stops placed at both the outer and inner periphery of Disk 142 operate to limit motion of Transducer assembly 140 to selected positions at the outer and inner periphery of Disk 142. In determining the points at which commutation takes place, the shaft of Motor 100 is first positioned at the outer end stop. Initially, Motor 100, Encoder 160 and Transducer apparatus 140 are in an unknown position. It is therefore necessary to cause Motor 100 to move to a known position from which successive programmed motions may be initiated. Motor 100, under control of Microprocessor 30, operates through excitation of windings 102 and 104 of Motor 100 through the associated Motor Drive Amplifiers 80 and 90, and the Digital-to-Analog Converters 60 and 70 to position Transducer assembly 140 against the outer mechanical stop. However, because of the possibility that the unknown initial position of Motor 80 may in fact already be against the inner or outer stop, it is necessary to confirm first that motion has in face been initiated, and subsequently, that motion has ceased to occur when the motor contacts the outer stop. This is accomplished by Microprocessor 30 monitoring the outputs 162 and 164 of Encoder 160 through Analog Multiplexer 110 and Analog-to-Digital Converter 130 on terminal 42 of Microprocessor 30.

After Transducer assembly 140 has been positioned against the outer mechanical stop as above described through the observation of the signals from Encoder 160, Motor 100 will be in a known rotational position. From this known rotational position, programmed sequences of motion can be initiated to achieve desired new positions of Motor 100, Encoder 160 and Transducer 140, as more fully described hereinafter.

The next step in determining the commutation points for Motor 100 is to determine a location for the magnetic null which is closest to the outer end stop. This magnetic null will hereinafter be referred to as the Reference Null. This is accomplished by first setting a counter maintained by Microprocessor 30, hereinafter referred to as the Track Crossing Counter, to zero. From this point on, the Track Crossing Counter will be incremented when Transducer apparatus 140 crosses a track on disk 142 in the inward direction, and decremented when Transducer apparatus 140 crosses a track on disk 142 in the outward direction. Consequently, the Track Crossing Counter will contain a number equal to the distance between the outer end stop and the current position of Transducer apparatus 140.

Thereafter, the shaft of Motor 100 will be rotated in such a fashion to effect movement of Transducer apparatus 140 in an inward direction to the Reference Null. When Transducer apparatus 140 is positioned over the Reference Null, the Track Crossing Counter will contain a numer between 1 and 299 corresponding to the number of tracks between the outer end stop and the Reference Null. It is also observed, that as transducer apparatus 140 is currently positioned at a magnetic null, said position is midway between desired commutation points for Motor 100. Consequently, a counter maintained by Microprocessor 30, hereinafter referred to as the Commutation Counter, will be set to a value which corresponds to one half of the number of tracks which occur between commutation points. In the preferred embodiment, there are a total of 300 tracks between commutation points. Consequently, the Commutation Counter will be set to a value of 150. From this point on, the Commutation Counter is incremented when transducer apparatus 140 crosses a track in the inward direction, and decremented when transducer apparatus crosses a track in the outward direction. In addition, when the contents of Commutation Counter either underflows zero, or overflows a count of 300, commutation of Motor 100 is performed. It is understood in this regard, that determination of the crossing of tracks on disk 142 by Transducer apparatus 140 is made from information from Encoder 160, as more fully discussed hereinafter.

Calibration data on the output signals from terminals 162 and 164 of Encoder 160 is next determined. By successive excitation of the two phases of Motor 100 in a stepping mode, Transducer apparatus 140 is caused to move from the known position at the outer mechanical stop to the inner mechanical stop. While this motion is occurring, Microprocessor 30, operating through Analog Multiplexer 110 and Analog-to-Digital Converter 130 samples the outputs from terminals 162 and 164 of Encoder 160, and records the minimum and maximum values thereof. In the preferred embodiment, continuous motion of Transducer apparatus 140 across Disk 142 will produce a sine signal on terminal 162 and a cosine signal on terminal 164 of Encoder 160. The stored maximum and minimum digital words consequently represent the maximum and minimum values of the corresponding sine and cosine signal outputs from Encoder 160. The difference between the maximum and minimum values for both the sine and cosine signals respectively, define peak-to-peak output values from Encoder 160 for the two respective signals, i.e. sine and cosine, from terminals 162 and 164, and therefore a scale factor which allows Microprocessor 30 to determine an exact angular position of Encoder 160 at any future time.

An average value for each of the sine and cosine signals, obtained by adding the respective maximum and minimum digital words for each of the sine and cosine signals, and dividing by two in Microprocessor 30, defines a mid-point on each of the sine and cosine signals, which is a zero cross-over point for the two respective signals. Each zero cross over point of the sine signal defines a nominal location of a center of a magnetic track on Disk 142.

In order to maintain constant torque as a function of current from Motor 100, it is necessary to switch, or commutate, between the two windings 102 and 104 at a position approximately halfway between the magnetic nulls defined by the two windings, or at 45 degrees between the four magnetic nulls. The purpose of the commutation determination procedure is to identify the location of the four magnetic nulls, angularly, as measured by Encoder 160. With these measurements, the optimum commutation point for Motor 100 is then defined as being half way between the measured magnetic null angular positions.

A counter, hereinafter referred to as a Commutation Counter, is employed in Microprocessor 30 in the commutation process. The Commutation Counter increments or decrements responsive to each crossing of a track by Transducer assembly 140; the Commutation Counter increments on each zero crossing of the sine signal resulting from motion of Transducer apparatus 140 in a first direction of motion with respect to Disk 142, and decrements responsive to each crossing of a track by Transducer assembly 140 in the opposite direction of motion. In response to motion of Transducing apparatus 140 in the first direction, the Commutation Counter is arranged to count up to a preselected maximum value, and thereafter to reset to zero, and repeat the counting process once again. In response to motion of Transducing apparatus 140 in the opposite direction, the Commutation Counter is arranged to count down to zero, and thereafter reset to the preselected maximum value, and again continue the decrementing process. Commutation of the windings of Motor 100 occur each time the count in the Commutation Counter changes from the maximum value to zero, or from zero to the maximum value.

In determining the location of commutation positions, Motor 100 is energized in a stepper mode, and caused to go to the outer mechanical stop. After Motor 100 has come to rest against the outer mechanical stop, Motor 100 is caused to step inward to a location toward the center of the area on which data is to be stored on Disk 142. One of the two effective windings 102 or 104 of Motor 100 is then energized and Motor 100 is allowed to rotate to the corresponding magnetic null position. As has been described above, this magnetic null position is approximately half way between the optimum commutation points between the two effective windings. With Motor 100 in this magnetic null position, a commutation counter in Microprocessor 30 is set to a value equal to one-half of the previous discussed preselected maximum value. In the preferred embodiment, the preselected maximum value is 300, hence the Commutation Counter is set to a value of 150. The Commutation Counter is so arranged that it will overflow at a count of 300, resetting to 0, and underflow at a count of 0, resetting to 300. The input to this Commutation Counter is derived from the zero crossing signals obtained by the sine output of Encoder 160. The counter continually counts track crossings and causes commutation between the two windings to occur whenever either an underflow or overflow occurs in the Commutation Counter.

The final task to be performed in the calibration mode is to position Transducer apparatus 140 exactly over track number 0, i.e., the first track used for the storage of data. In this regard it will be understood that in the preferred embodiment, track 0 corresponds to the first track on which data information will be stored. However, in the preferred embodiment there are a number of additional tracks which are positioned between track 0 and the outer mechanical stop which are not used to for the storage of data information. These tracks are assigned negative track numbers, e.g., tracks −1, −2, etc., with track −1 being adjacent to track 0. As noted above, at the completion of the initialization of the Commutation Counter, Transducer assembly 140 is positioned over the area on Disk 142 used for the storage of data information.

During the manufacturing process, servo burst information previously described with respect to FIG. 4 (servo bursts 222 and 224) is permanently prerecorded on every track of Disk 142, with the exception of the tracks having a negative track number. Thus all tracks beginning with track zero and inward toward the center of Disk 142 have prerecorded both servo bursts 222 and 224 (FIG. 4).

In addition, tracks −1 and −2 have a single servo burst recorded thereon, each of said single servo burst being centered on tracks −1 and −2, respectively. The single servo bursts recorded on tracks −1 and −2 is used in the process of positioning Transducing apparatus 140 over track 0, as more fully described hereinafter.

In the preferred embodiment, there are a number of tracks positioned between track 0 and the outer mechanical stop. The exact number of tracks will vary with tolerances during manufacturing, but is generally between 20 and 40 tracks. While there are consequently an unknown number of tracks between the outer mechanical stop and track 0, the Track Crossing Counter contains a count indicating the number of tracks which Transducing apparatus 140 is currently positioned in from the outer mechanical stop. For the purposes of locating track 0, 30 tracks will be assumed to exist between the outer mechanical stop and track 0, and the track count contained in the Track Crossing Counter will be used in determining the location of track 0.

Figure 6:
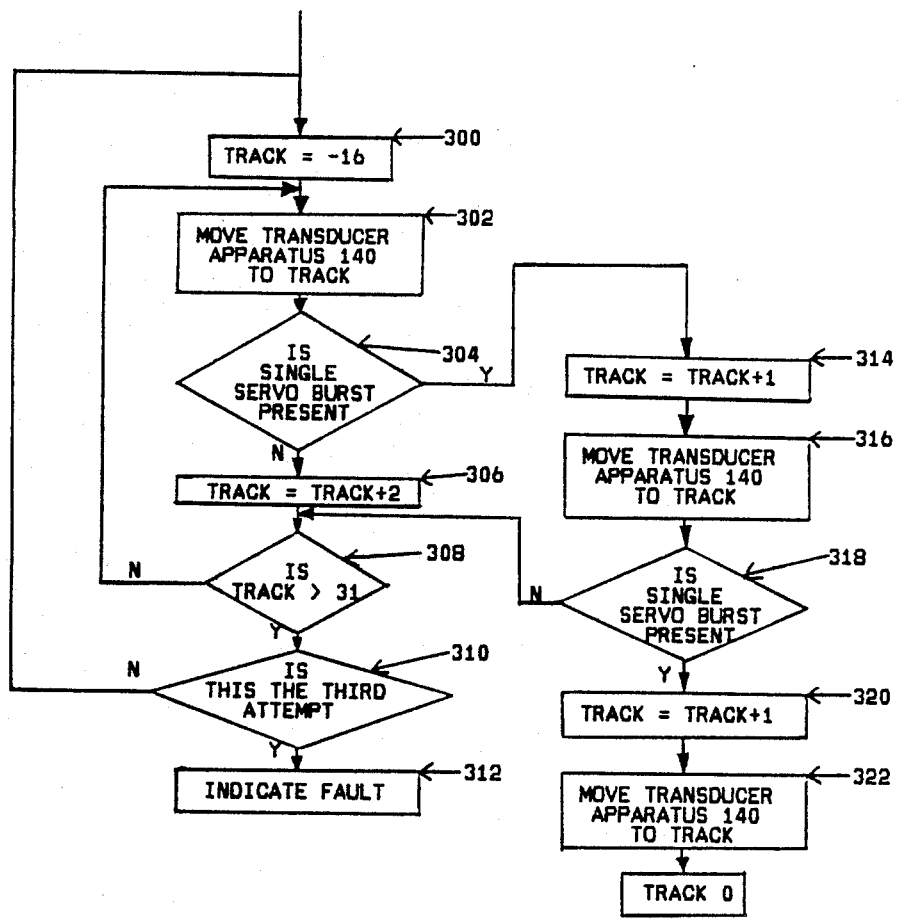
FIG. 6 illustrates functional operations associated with the location of track 0 on the surface of a disk.

FIG. 6 illustrates the process employed in determining the location of track 0 in the preferred embodiment. Referring to FIG. 6, Microprocessor 30 begins by storing the number −16 in a variable hereinafter refered to as Track, as illustrated in block 300. While it is possible that Transducer apparatus 140 is not in fact positioned over track −16, the number −16 serves as a starting assumption. Thereafter, Transducer apparatus 140 is positioned to the track number contained in the variable location Track, using the position information contained in the Track Crossing Counter, as indicated in block 302. Thereafter, Microprocessor 30 determines if a single servo burst exist on the track which Transducing Apparatus 140 is currently positioned over, as indicated in block 304. If a single servo burst is not found on the track, then Microprocessor 10 thereafter increments the value of the variable Track by two, as indicated in block 306. Thereafter, Microprocessor 10 tests to determine if the value of the variable Track is greater than a predetermined value in block 308. The search for track 0 will be carried out over a pre-determined range of tracks which, in the preferred embodiment, is from track −16 to track 30. Consequently in block 308, Microprocessor 30 determines if the value of the variable Track is greater than or equal to 31. If the value of the variable Track is not greater than 31, then Microprocessor 30 next performs the operations previously discussed with respect to block 302 and following. In the preferred embodiment, the number of attempts to locate track 0 is limited to a total of three. Consequently, if the value of the variable Track is greater than 31, then Microprocessor 30 next determines if the current attempt is the third attempt to determine the location of track 0, as illustrated in block 310. If the attempt is the third attempt, the entire process is aborted, and an error condition is reported by Microprocessor 30 over terminal 48 (FIG. 2), as indicated in block 312. If, however, the attempt is not the third attempt, Microprocessor 30 next performs the previously described operation discussed with respect to block 300 and following.

With respect to the determination made by Microprocessor 30 in block 304, if Microprocessor 30 does find the previously described single servo bust, then Microprocessor 30 increments the contents of a the variable Track, as indicated in block 314, and thereafter moves Transducer apparatus 140 to the track number contained in the variable Track, as indicated in block 316. Thereafter, Microprocessor 30 again determines if a single servo burst is present on the track which Transducer apparatus 140 is positioned over in block 318. If a single servo burst is not found in block 31869, Microprocessor 30 thereafter repeats the previously described operations with respect to block 306. If, however, Microprocessor 30 does detect a single servo burst in block 318, the value contained in the variable Track is incremented, as indicated in block 320. Thereafter Transducing apparatus 140 is positioned over the track number contained in the variable Track, as indicated in block 322. At this point, Transducing apparatus 140 is positioned over track 0.

Microprocessor 30 makes use of three counters in the positioning of Transducer apparatus 140 to a desired location on Disk 142: a Track Crossing Counter, a Commutation Counter and a Tracks To Go Counter.

The Track Crossing Counter has been previously discussed with regard to the calibration operations, and is a counter which increments and decrements based on zero crossings of the sine signal from terminal 162 of Encoder 160 (FIG. 2). Every zero crossing of the sine signal from terminal 162 defines an approximate track center location. Track Crossing Counter maintains a continuous record of the location of Transducer apparatus 140 relative to the tracks of Disk 142 by incrementing and decrementing as the tracks are crossed in the calibration mode. The determination to increment or decrement is made based on the direction of motion as the zero crossings of the sine signal occur.

The Tracks To Go Counter is a counter which maintains a record of how far away Transducing assembly 140 is from a desired track. External Commands coupled to terminal 48 of Microprocessor 30 (FIG. 2) causes the Tracks To Go Counter to increment, and track crossings determined from zero crossings of the sine signal from terminal 162 of Encoder 160 are used to decrement the Tracks To Go Counter.

In the calibration procedure previously described, the Tracks Crossing Counter alone is used to maintain a continuous record of the location of Transducer apparatus 140. However, in the various seek modes to be more fully discussed hereinafter, both the Track Crossing Counter and the Tracks To Go Counter are employed. At the start of a seek operation, i.e., moving Transducing apparatus 140 from a current position to a desired position, the Track Crossing Counter is updated to the number of the destination track, while the To Go Counter maintains the actual position relative to the destination, being updated by track crossing signals, i.e., zero crossings of the sine signal from termiinal 162 of Encoder 160.

The Commutation Counter is used to determine when to commutate the windings 102 and 104 associated with Motor 100, through the associated Digital-to-Analog Converters 60 and 70, and Motor Drive Amplifiers 80 and 90. The Commutaton Counter increments and decrements in the same manner as the Tracks To Go Counter. The Commutation Counter, however, is preset during the calibration process and overflows or underflows at a preselected values, with commutation occurring with each over or underflow.

A control servo loop consists of Microprocessor 30, Digital-to-Analog Converters 60 and 70, Motor Drive Amplifiers 80 and 90, the windings 102 and 104 of Motor 100, Encoder 160 and Transducing apparatus 140. The output of Encoder 160 provides the feedback signal through Analog Multiplexer 110 and Analog-to-Digital Converter 120. As has been previously discussed, the two output signals from terminals 162 and 164 of Encoder 160 provide continuous instantaneous position information of Transducer apparatus 140. The velocity with which Transducer assembly 140 is moving relative tothe Disk 142 is determined by measuring the time between successive measurements of displacement signals from Encoder 160. Microprocessor 30 further implements a digital integrator, whose input is calculated position error signal derived from the output of Encoder 160, as more fully discussed hereinafter with respect to the Detent mode of operation.

It will be understood by those skilled in the art that Microprocessor 30 operates as a multiplexed data processor wherein all necessary computations for the control of the disk drive are preformed with and through Microprocessor 30, according to a permanently recorded control program and associated information tables, as more fully discussed hereinafter. As it is inherent in the operation of Miroprocessor 30 that only one calculation may be performed at any single time, control calculations are accomplished by sequentially performing the many calculations required for the complete control process. The speed at which Microprocessor 30 is capable of performing the required calculations is sufficiently high that Microprocessor 30 is able to perform all of the necessary calculations required with respect to the control process by multiplexing, i.e., by successively performing the various calculations in sequence.

As previously discussed, four control modes are employed according to the present invention in the positioning of Transducer apparatus 140 from a current position to a desired position: a High Speed Mode, a Medium Speed Mode, a Transitin Mode and a Detent Mode. As the calculations required in each of the four control modes are different, the the time required for each also differ. Consequently, the manner in which each of the control modes operates are based upon the required calculations times, as will be more fully discussed hereinafter.

The four modes of operation provide for the orderly positioning of Transducing apparatus 140 from a current position to a desired position. Consequently, each of the four modes have unique operational characteristics selected to accomplish the desired positioning task.

Broadly stated, the High Speed Mode of operation relates to the management of the positioning of Transducing apparatus 140 when it is moving at a velocity greater than a preselected velocity. In the preferred embodiment, the first preselected distance is 108 tracks, and the preselected velocity is 7 inches per second. In the High Speed Mode of operation, if the distance from the desired destination is greater than the first preselected distance, the High Speed Mode of operation requires Transducing apparatus 140 to move toward the desired position at a preselected maximum velocity which, in the preferred embodiment is 12 inches per second. If the distance is less than the first preselected distance, the High Speed Mode of operation requires Transducing apparatus 140 to move toward the desired position at a velocity which is determined according to the distance remaining to travel. This distance-velocity relationship is according to the well known fractional power relationship, the precise fractional power being empirically determined from the mechanical and electrical characteristics of a particular design, as is well known to one of ordinary skill in the art. In the High Speed Mode of operation, position of Transducing apparatus 140 is monitored with respect to every other track crossing on Disk 142, i.e., with respect to every other zero crossing of the sine signal.

Broadly stated, the Medium Speed Mode of operation relates to the management of the positioning of Transducing apparatus 140 when it is less than the first preselected distance from the desired destination (108 tracks in the preferred embodiment), but greater than a second preselected distance (8 tracks in the preferred embodiment), and when the velocity of Transducing apparatus is less than the preselected velocity (7 inches per second in the preferred embodiment). In the Medium Speed Mode of operation, the desired velocity of Transducing apparatus 140 is again determined by the remaining distance from the desired position from a distance-velocity table as previously discussed with respect to the High Speed Mode of operation. However, in the Medium Speed Mode of operation, position of Transducing apparatus 140 is monitored with respect to every track crossing on Disk 142, i.e., with respect to every zero crossing of the sine signal.

Broadly stated, the Transition Mode of operation relates to the management of the positioning of Transducing apparatus 140 when it is less than the second preselected distance (8 tracks in the preferred embodiment), but greater than a third preselected distance (256 microinches in the preferred embodiment). In the Transition Mode of operation, the desired velocity of Transducing apparatus 140 is again determined by the remaining distance from the desired position from a distance-velocity table as previously discussed with respect to the High and Medium Speed Modes of operation. However, in the Transition Mode of operation, position information from Encoder 160 is more frequently monitored than was the case with the High and Medium Speed mode. In addition, both the sine and cosine signal from Encoder 160 are monitored. Monitoring of both the sine and cosine signals is necessary as both signals have non-linear regions therein, e.g., each signal is approximately linear within 45 degrees of each zero crossing, and becomes increasingly non-linear thereafter. Consequently, when one signal is in the non-linear region, position determination is accomplished by monitoring the alternate signal from Encoder 160, in a manner well known to those skilled in the art. As position information is known to a higher degree than was the case in the High and Medium Speed Modes, the velocity table used in the Transition Mode correspondingly provides desired velocity information in accordance with the higher degree of position accuracy.

Broadly stated, the Detent Mode of operation relates to the final positioning of Transducing apparatus 140 when Transducing apparatus 140 is less than the third preselected distance from the desired position (256 microinches in the preferred embodiment). The Detent Mode is a position control servo loop using a Position Integral Differentiation technique, well known to those skilled in the art, as more fully discussed in *Control and Dynamic Systems* by Takahasi, Rabins and Asulander, published by Addisson Wesley, November 1972, which is hereby incorporated by reference. As was the case with the Transition Mode, position information is again determined by the monitoring of both the sine and cosine signals from Encoder 160.

In accordance with the present invention, in the High Speed and Medium Speed Modes of operation, high resolution of the instantaneous position of Transducing apparatus 140 with respect to Disk 142 is not maintained. Rather, position information of Transducer apparatus 140 is only maintained with respect to the number of tracks which have been crossed, by updating Commutation Counter and Tracks To Go Counter in response to detected zero crossings of the sine signal from terminal 162 of Encoder 160. Velocity information of Transducer apparatus 140 is thereafter determined by measuring the time which elapse between successive track crossings.

In the preferred embodiment, external commands calling for a move to a desired new track are received on terminal 48 of Micrioprocessor 30, and consist of a first signal indicating the desired direction of motion, and a second signal comprising a series of pulses, the number of which indicating the number of tracks Transducing apparatus 140 is to be moved, in accordance with the Seagate ST506/ST412 Interface Standard. The number of pulses received are accumulated in the Tracks To Go Counter within Microprocessor 30.

When the contents of Tracks To Go Counter is not zero, a seek routine is initiated. FIGS. 6A-6E illustrate the seek routine. Referring now to FIG. 6A, pulses indicating a desired amount of motion, as previously discussed, received on terminal 48 of Microprocessor 30 are first accumulated, as indicated in block 350. Thereafter, motion is initiated as indicated in block 352. Microprocessor 30 thereafter in block 354 makes a comparison of the count in the Tracks To Go Counter with the second preselected distance. If the count is less than the preselected number of tracks, the Transition Mode of operation is therefter entered, as will be more fully discussed hereinafter with respect to FIG. 6D. However, if the count is not less than the preselected number of tracks, the operational mode will remain in the High Speed or Medium Speed mode, as more fully discussed hereinafter. In the preferred embodiment, the preselected number of tracks is eight.

Microprocessor 30 next determines in block 360 (FIG. 7B) if the velocity of Transducing apparatus 140 is above a preselected velocity. If the velocity is above the preselected velocity, the High Speed Mode of operation is entered, and the operations indicated generally by blocks 362 and following will next be performed, as more fully discussed hereinafter. If the velocity is less than the preselected velocity, the Medium Speed Mode of operation is entered, and the operations indicated generally by blocks 364 and following will thereafter be performed, as more fully discussed hereinafter. In the preferred embodiment, the preselected velocity is 7 inches per second.

Figure 7A:
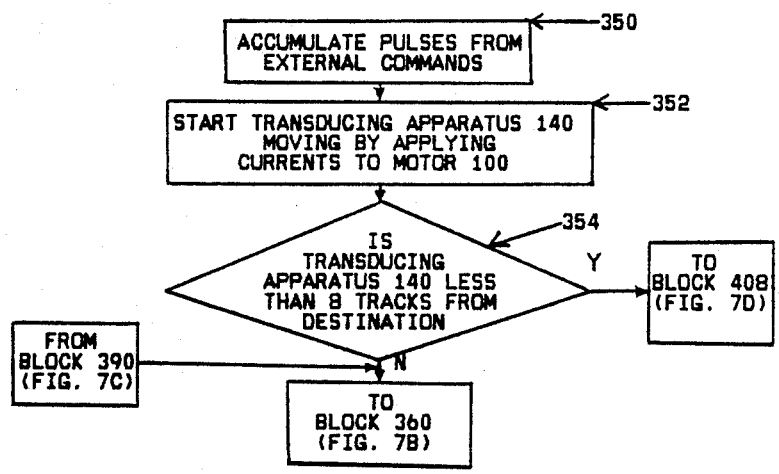
FIGS. 7A thru 7E illustrates functional operations associated with the High Speed Mode, the Medium Speed Mode, the Transition Mode and Detent Mode of operation.
Figure 7B:
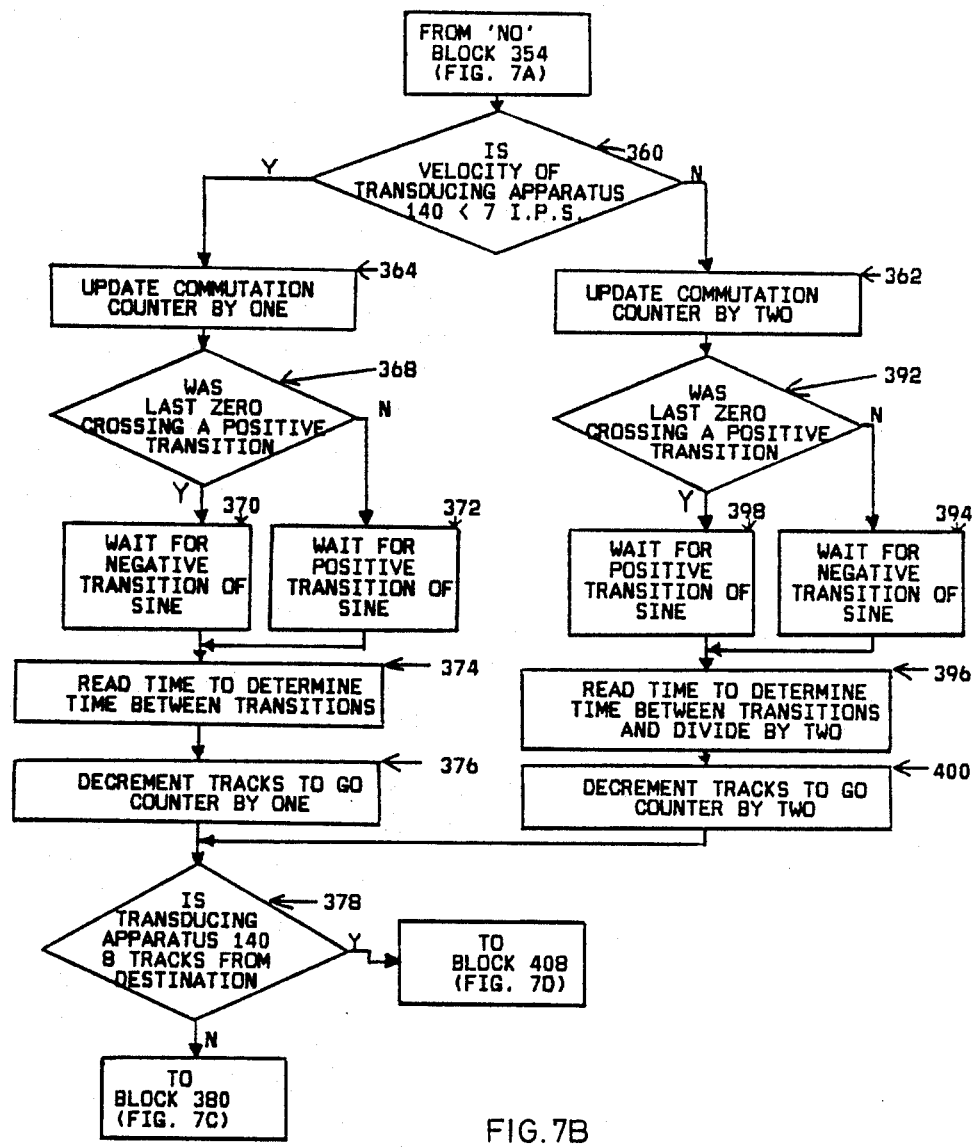

At this time, as motion has just been initiated, it is known that the velocity of Transducing apparatus 140 cannot be above the preselected velocity. Initial positioning operations are therefore performed in the Medium Speed Mode. Microprocessor 30 will consequently next enter the Medium Speed Mode of operation by performing the operation broadly indicated in block 364 of FIG. 7B. Referring now to FIG. 7B, Microprocessor 30 updates Commutation Counter by one in block 364, with the update being either an increment or decrement depending upon the direction of motion of Transducer apparatus 140. In the Medium Speed Mode, position information of Transducing apparatus 140 is determined with respect to each zero crossing of the sine signal from terminal 162 of Encoder 160. Consequently, blocks 368, 370 and 372 relate to the monitoring of each crossing of the sine signal. Microprocessor 30 next determines whether the zero crossing of the sine signal was a change from a positive to a negative value, or a change from a negative value to a positive value, and on that basis continues to monitor the output from terminal 162 of Encoder 160 as previously discussed until the reverse transition at the next zero crossing. In particular, in block 368 Microprocessor 30 determines if the last zero crossing of the sine signal was a transition from a negative value to a positive value; and if so, next performs the operations indicated generally by block 372; otherwise performs the operations indicated in block 370. In block 372 Microprocessor 30 waits for the next transition of the sine signal from a negative value to a positive value, and thereafter performs the operation indicated generally in block 374. In block 370, Microprocessor 30 waits for the next transition of the sine signal from a positive value to a negative value, and thereafter performs the operation indicated generally in block 374. In block 374, Microprocessor 30 determines the time between the prior sine signal zero crossing and the time at which the immediately preceeding sine signal zero crossing occurred. This time difference is a direct indication of the velocity at which Transducing apparatus 140 is moving. Thereafter Microprocessor 30 decrements the Tracks To Go Counter by one in block 376. Microprocessor 30 next checks the value of the Tracks To Go Counter in block 378 to determine if Transducing apparatus 140 is at the second preselected distance (3 tracks in the preferred embodiment) from the desired destination. If Transducing apparatus 140 is the selected number of tracks from the desired destination, the Transition Mode of operation is entered, as will be more fully discussed hereinafter; otherwise, Microprocessor 30 next performs the operations indicated in block 380 (FIG. 7C).

Figure 7C:
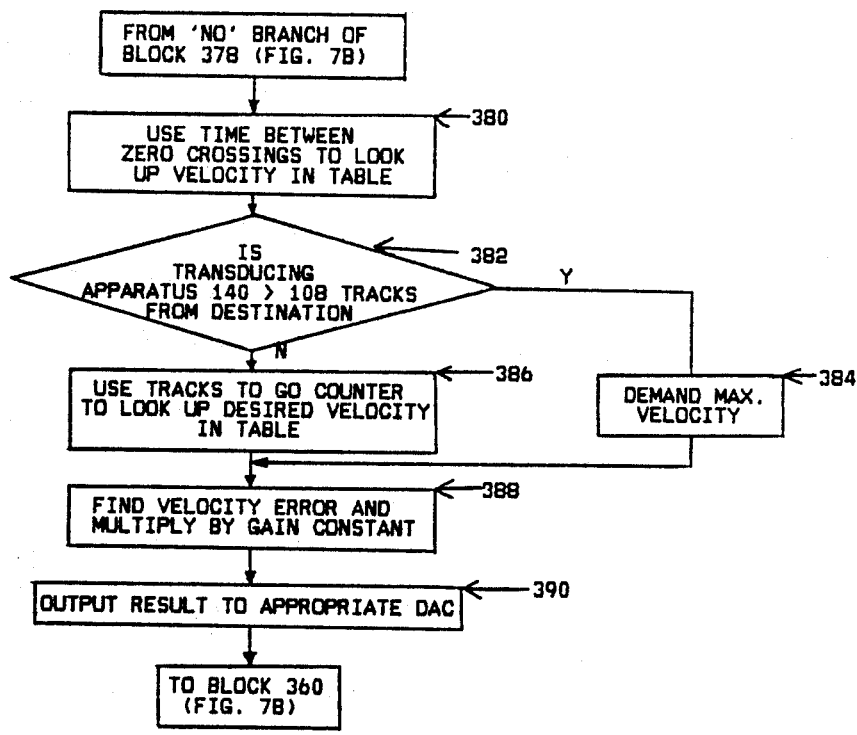

Referring now to FIG. 7C, Microprocessor 30 next in block 380 uses the foregoing determined measured time between zero crossings of the sine wave to access a first look up table from which a corresponding velocity of Transducing apparatus 140 may be determined. From the velocity so determined from the first look up table, Microprocessor 30 next determines in block 382 if Transducing apparatus 140 is greater than the first preselected distance (108 tracks in the preferred embodiment) from the desired location. If Transducing apparatus 140 is greater than the first preselected distance, a preselected maximum velocity (12 inches per second in the preferred embodiment) is desired for Transducing apparatus 140 in block 384; if Transducing apparatus 140 is less than or equal to the first preselected distance, Microprocessor 30 thereafter performs the operations indicated generally by block 386.

In block 386, Microprocessor 30 checks the current value in the Tracks To Go Counter to determine the remaining distance to the desired destination track. The remaining distance is thereafter used with a second look up table to determine a corresponding desired velocity for Transducing apparatus 140 based upon the remaining distance. In this regard, the values in the second look up table follow the well known fractional power law for desired velocities of motion based upon remaining distance as previously discussed. Microprocessor 10 thereafter in block 388 determines the difference between the velocity previously determined in block 374 with the desired velocity determined from the second look up table in block 386 to determine a velocity error and thereafter multiplied by a gain constant. The velocity of Transducing apparatus 140 is thereafter adjusted in block 390 in accordance with the determined velocity error by a signal applied to motor windings 102 and 104 through associated Digital-to-Analog Converters 60 and 70 and the corresponding Motor Drive Amplifiers 80 and 90.

Referring now to FIG. 7B, Microprocessor 30 next returns to block 360, and again determines if the velocity of Transducing apparatus 140 is greater than the preselected velocity (7 inches per second in the preferred embodiment). If the velocity is greater than the preselected velocity, operation in the High Speed mode is indicated.

In the High Speed Mode, the total computations to be done require more time in Microprocessor 30 to perform than is available between successive zero crossings of the sine wave. The control loop is therefore changed to measure every second zero crossing of the sine signal. Each such transition indicates that two tracks have been traversed since the last update of the several system counters. Therefore, in the High Speed Mode, the first step is to update the Commutation Counter by two tracks, which Microprocessor 30 performs in block 362 (FIG. 7B), and thereafter determines in block 392 if the last zero crossing of the sine signal was a transition from a negative value to a positive value, hereinafter referred to as a positive transition, or a transition from a positive value to a negative value, hereinafter referred to as a negative transition. If the previous transition was not a positive transition, Microprocessor 30 next in block 394 monitors the sine signal from terminal 162 of Encoder 160 and waits for a negative transition to occur, thereafter performing the operations indicated generally by block 396. If the previous transition was a positive transition, Microprocessor 30 waits for the next positive transition to occur in block 38. Microprocessor 30 determines the time at which the transition occurs in block 396, and determines therefrom the time from the preceeding transition. The value so determined is thereafter divided by two in block 396. Microprocessor 30 thereafter in block 400 decrements the Tracks To Go Counter by two, and thereafter performs the operations previously discussed with respect to block 378.

The maximum velocity in the High Speed Mode continues until the Tracks To Go Counter indicates that Transducer apparatus 140 is less than the preselected number of tracks from the desired destination (108 tracks in the preferred embodiment). When this occurs, the look up table provides the previously described reduced velocity, and subsequent velocity values progressively decrease as the Tracks To Go Counter decreases below the preselected number of tracks.

As the foregoing operation continues to control the velocity of Transducing apparatus 140, the Commutation Counter continues to control the necessary commutations of Motor 100 as previously discussed.

The Medium Speed Mode continues to reduce the velocity of Transducing apparatus 140 until Microprocessor 30 determines that Transducing apparatus 140 is within 8 tracks from the desired destination, at which time the Transition Mode is entered.

When the Transition Mode is entered, the velocity of Transducing apparatus 140 has dropped to such a value that a measurement of velocity based on the time between zero crossings would not provide sufficient resolution to properly control Transducing apparatus 140 in a desired manner. In this mode therefore, Microprocessor 30 begins to read both the sine and cosine signals of Encoder 160, i.e., the signals present on terminals 162 and 164 of Encoder 160, to read not only zero crossings, but instantaneous values. The instantaneous values of the sine and cosine provide continuous relative position information.

In the Transition Mode, Microprocessor 30 determines velocity of Transducing apparatus 140 on a regular basis by measuring the displacement difference at regular intervals. In the preferred embodiment, the time interval at which displacement is measured at 135 microsecond intervals. The velocity so determined is utilized in the same manner as previously described in the High Speed and Medium Speed mode of operation, and compared with the desired velocity determined from the second look up table, in order to determine the velocity error, and thus control Motor 100 to achieve the desired velocity.

Microprocessor 30 determines the present distance from the desired destination using the Tracks To Go Counter and position information from the sine and cosine signals from Encoder 160. The position error thus derived is used in a third look up table to determine the desired velocity which is thereafter used to control excitation of Motor 100.

Figure 7D:
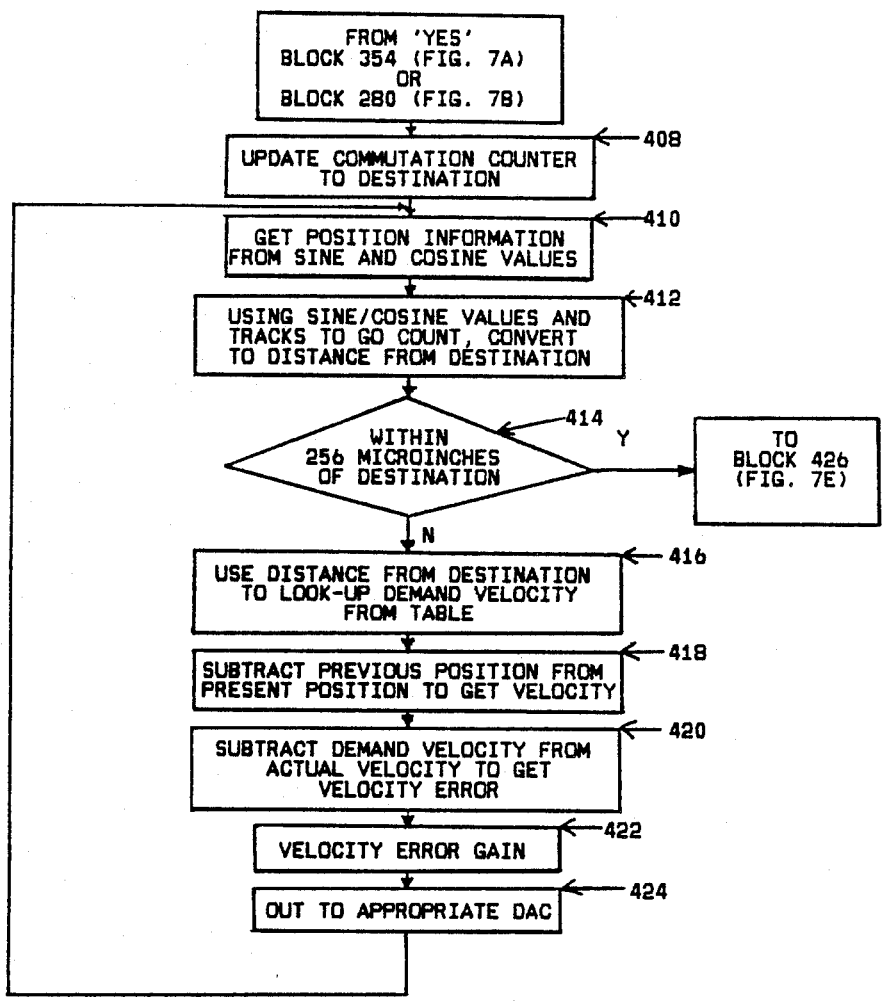

The sequence of steps associated with the Transition Mode begin with a positive determination in either block 354 (FIG. 7A) or block 378 (FIG. 7B), and are indicated in FIG. 7D. Referring now to FIG. 7D, Microprocessor 30 in block 408 up-dates the Commutation Counter by the number of tracks to go to the destination tracks (1 to 8 in the preferred embodiment). This is performed to ensure that if the Commutation Counter happens to be close to performing a commutation (within 8 tracks in the preferred embodiment), the commutation will be forced to take place at this time, rather at a later point. If the commutation were allowed to take place at a later point, undesirable transients could be introduced into the positioning of Transducing apparatus 140.

Microprocessor 30 next in block 410 gets current position information of Transducer apparatus 140 from the sine and cosine signals from Encoder 160. In block 412, Microprocessor 30 next determines the distance Transducer apparatus 140 is from the desired destination using the sine and cosine values and the information in Tracks To Go Counter. In block 414, Microprocessor 30 next determines if the distance to go is less than the third preselected distance (256 microinches in the preferred embodiment). If the distance is less than the third preselected distance, the Detent Mode of operation is entered at block 426 in FIG. 7E, otherwise block 416 is next performed. In block 416, Microprocessor 30 determines the desired velocity for Transducing apparatus 140 from the previously discussed look up table, and in block 48 determines the current velocity of Transducing apparatus 140. In block 420 Microprocessor 30 next determines the difference between the desired velocity and the measured velocity of Transducing apparatus 140, and in block 422 adjusts the value so obtained by a velocity gain error. The velocity gain error is a constant which is empirically determined by parameters associated with a particular design. In block 424, Microprocessor 30 outputs the value so determined to the appropriate digital-to-analog converter to drive the motor winding. Thereafter, Microprocessor 30 next repeats the foregoing described procedure starting with the operations previously discussed with respect to block 410.

When the position error decreases to a value less than a preselected distance, the Detent Mode of operation is entered, i.e., with a positive determination in block 414 (FIG. 7D). In the preferred embodiment, the preselected distance is 256 microinches.

In the Detent Mode of operation, velocity is determined in a similar manner as in the Transition Mode, except that instead of making a comprison every 135 microseconds, the comparison of position is made every 70 microseconds. Position error is determined in the same way as in the Transition Mode previously discussed. Microprocessor 30 must, however, determine whether the desired track center location is defined by the positive going or negative going slope of the sine signal, which is done by reference to the Track Crossing Counter. In the Detent Mode, control of position is accomplished by employing the Position Integral Differentiation approach, as previously referenced. Using the Position Integral Differentiation approach, a sum is determined of velocity error, position error and the integral of the position signal. Velocity and position error have been previously described. The position integral is developed by Microprocessor 30 by adding the position error determined to a register which builds up the integral of the position error by successive additions of the position error. The previously described servo burst correction offset is further added to the position signal, as discussed hereinafter.

Figure 7E:
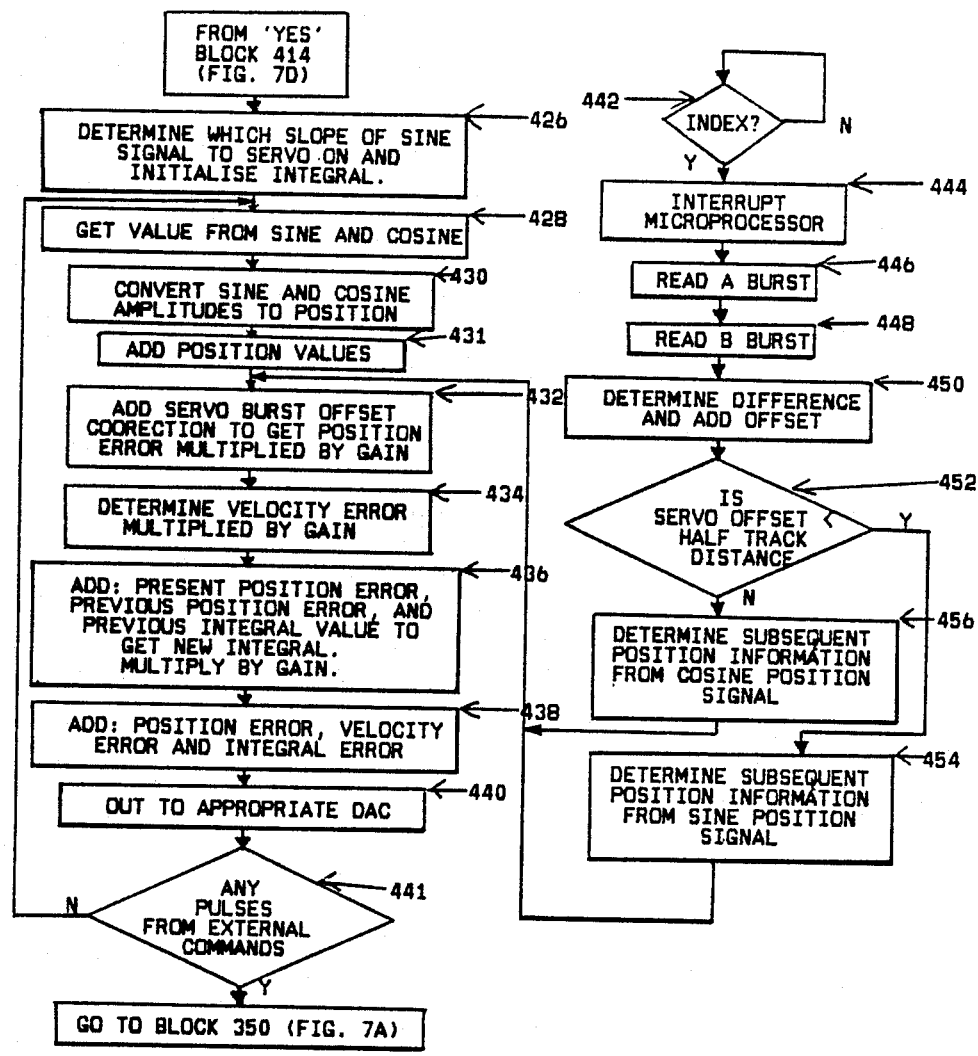

The operations performed in the Detent Mode are illustrated in FIG. 7E. As the final positioning of transducer apparatus 146 over a selected track on a surface of disk 142 occurs in the Detent Mode, position information may be determined from either the sine or cosine signal, as more fully discussed hereinafter. The particular signal chosen for positioning operations will be referred to as the position information signal, as more fully discussed hereinafter. Referring now to FIG. 7E, Microprocessor 30 determines which slope of the sine wave Transducing apparatus 140 is positioned with respect to, and thereafter initiates the integrator in block 426. Thereafter in block 428 position information is determined from both the sine and cosine signals, and thereafter converted to actual position information in block 430. In block 431, the two values for position are added together to determine a distance between the respective zero crossings of the sine and cosine position signals, as previously discussed. The sum of the two distances will hereinafter be referred to as a Half-Track Distance. As was previously discussed, in the Detent Mode of operation, servo burst information is also used with respect to positioning of Transducer apparatus 140. This is necessary to provide position compensation for thermal expansion which may occur with respect to disk 142 (FIG. 2), as previously discussed. Consequently, in block 432 position correction information determined from servo burst detection and processing, as more fully discussed hereinafter, is added to the position error determined. The position so determined is thereafter multiplied by a gain factor which is empirically determined by parameters associated with a particular design. Thereafter in block 434 the velocity error is determined, and again multiplied by a gain factor as previously discussed. Thereafter in block 436, the present position error, previous position error, and previous integrator value are added to get a new integral value, which is likewise multiplied by a gain factor as previously discussed. Thereafter in block 438, the position error, velocity error and integral error are added, and thereafter coupled to the appropriate digital-to-analog converter in block 440. Thereafter, Microprocessor 30 next determines in block 441 if there are any more pulses received from external commands (terminal 48, FIG. 2). If there are, then Microrocessor 30 next performs the operations previously discussed with respect to block 350 (FIG. 7A); otherwise, the preceeding operations are again repeated beginning with block 428.

While in the Detent Mode, servo burst information is monitored. Once each revolution of Disk 142, as indicated by the presence of the Index pulse from Transducer 146, Microprocessor 30 controls Gated Integrator 150 to measure the values of servo bursts 222 and 224 (FIG. 4) on the track over which Transducing apparatus 140 is positioned. The magnitudes of the respective servo bursts are compared and used with previously determined servo burst information to determine servo burst correction. The operations performed by Microprocessor 30 with respect to the processing of the servo bursts information are illustrated in FIG. 7E beginning with block 442. In block 442, responsive to the occurrence of an index pulse occurring on terminal 46 of Microprocessor 30 (FIG. 2), Microprocessor 30 is interrupted from its current operation in block 444. Thereafter in block 446 the amplitude of the first servo burst is read by Microprocessor 30, i.e. servo burst 222 (FIG. 4). Thereafter in block 448, the amplitude of the following servo burst is read by Microprocessor 30, i.e., servo burst 224. Microprocessor 30 next determines if a difference exists between the amplitudes of each of the servo bursts in block 450. If a difference exists, then a selected amount of correction is introduced to the servo offset correction value. In the preferred embodiment, this offset correction is a constant in an amount corresponding to 4 microinches. Thereafter, the amount of offset correction is compared to one-half of the value previously determined for the Half-Track Distance in block 452. If the amount of the servo offset correction is less than one-half of the amount of the Half-Track Distance, then subsequent position information is determined from the sine position signal, as indicated in block 454. If, however, the amount of the servo offset correction is greater than one-half of the amount of the Half-Track Distance, then subsequent position information is determined from the cosine position signal, as indicated in block 456. Thereafter, Microprocessor 30 next performs the sequence of steps previously discussed, starting with block 432.

While the foregoing has provided a detailed description of the operation of the transducer positioning apparatus in accordance with the present invention, yet further detailed information regarding the foregoing described operation is included with the commented assembly language listing of the previously discussed program of Microprocessor 30 in the attached appendix.

It is consequently observed from the foregoing that an improved method and apparatus has been described which provides a number of significant advances in the art. In particular, increased range of motion of a magnetic transducer apparatus is achieved through the commutation of a prime mover associated with the transducing apparatus. In addition thereto, an improved method of control has been disclosed employing digital techniques. While the foregoing has been described in terms of a particular preferred embodiment, it should be understood that such description is not to be interpreted in a limiting manner. To the contrary, the present invention is only to be limited by the scope of the following claims.

*Appendix*

—Copyright© 1986 by Data Recording Instrument Company Limited, Hawthorne Road, Staines, Middx., United Kingdom.—

```
* Conditional Assembly Directives

OPT UNA   ;List UNAssembled conditional statements

OFFPOT  SET 1 ;Normally set to 1.  Set to 0 for Offset Pot
              ;exp't.
NGA     SET 1 ;Normally set to 1.  Set to 0 for NEW GATE
              ; ARRAY.

TTL SKI  Vn.25.5  20-1-86

* A  program  which controls the PENNY  disc   drive.   It
* includes routines for writing servo bursts and also some
* Engineering Test routines.
* All timings in this program assume a crystal  frequency
* of  7.8174 MHz.,   giving Eclk = 1.95435 MHz &  an  MPU
* cycle time of 0.51168 us.
* must use EPROMs with access time < 300 ns, e.g. 2764-3
* Beware Intel 2764A which needs 12.5V programming voltage
  PT2DIR  EQU 01H
  PORT2   EQU 03H
  TCSR1   EQU 08H  ;The Timer control/status register #1
  FRC     EQU 09H  ;Double precision Free Running Counter
  TCSR2   EQU 0FH  ;Timer ctrl/status Reg #2
  PT5CTL  EQU 14H
  PORT5   EQU 15H  ;no direction register, all inputs
  PT6DIR  EQU 16H
  PORT6   EQU 17H
  TCSR3   EQU 18H  ;Time cor'rol/status reg 3
  TCONR   EQU 1CH  ;Time constant Register
  T2CNT   EQU 1DH  ;Timer 2, 8-bit Up counter
  ADC     EQU 20H
```

```
DAC0     EQU 28H
DAC1     EQU 29H
DAC2     EQU 30H  ;External DAC, Actual Vel
DAC3     EQU 31H  ;", Demanded Vel
DAC4     EQU 32H  ;", TOFF
DAC5     EQU 33H  ;", INTGRL
STAT1    EQU 38H  ;Primary Status
STAT2    EQU 39H  ;Secondary Status
CR0      EQU 38H  ;G.A. Control Reg. 0
CR1      EQU 39H  ;G.A. Control Reg. 1
PRESCA   EQU 3AH  ;Pre-scaler
SPCONR   EQU 3BH  ;12-bit speed control reg'r
TSTREG   EQU 3CH  ;NGA test reg'r
IDR      EQU 3DH  ;Index Delay Reg'r
EVENT    EQU 3DH  ;16-bit Event Counter
CONFIG   EQU 3EH  ;Configuration Reg'r

* Define program constants

OCUS     EQU 2       ;Odd Cyl Upper Surface. For servo
                    ; bursts.
OCLS     EQU 3       ;Odd Cyl Lower Surface
ECUS     EQU 4       ;Even Cyl Upper Surface
ECLS     EQU 5       ;Even Cyl Lower Surface
MAXTRK   EQU 614     ;Maximum user track address.
GUARDO   EQU 30      ;# of trks in Outer Guardband between
                    ; end-stop & trk 00.
LOTRK1   EQU -14     ;Lo/Hi limits for Fiduciary search
                    ; w.r.t. GUARDO
HITRK1   EQU 30
NOMINL   EQU 99H     ;Nominal Transducer mean,prior to
                    ; calibr'n = 3.0V
T2RST    EQU 013H    ;Mask to enable Timer2
SINE     EQU 0F8H    ;Mask for PORT6 to read the SIN
                    ; transducer
NTRKS    EQU 5       ;Tracks-to-go when we quit MAINLP &
                    ; enter FINAL
```

```
PAGE
ORG 40H ;base of user RAM
*==========================================
*  ALLOCATE RAM SPACE FOR PROGRAM VARIABLES  =
*==========================================
CR0I    RMB 1   ;Image of CR0
CR1I    RMB 1   ;Image of CR1
* The above pair must come first !! See initialisation.
RAWSIN  RMB 1   ;The natural mean of the SIN transducer
SSCALE  RMB 1   ;The binary fraction scalar for SIN
SINREF  RMB 1   ;The normalised mean for the SINE transducer
RAWCOS  RMB 1   ;The natural mean of the COSine transducer
CSCALE  RMB 1   ;The binary fraction scalar for COS
COSREF  RMB 1   ;The normalised mean for the COSINE
                ; transducer
DSCALE  RMB 1   ;The scalar used in DETENT
DREF    RMB 1   ;The mean     "      "      "
SINES   EQU SSCALE ;Alternative names used when
COSINS  EQU CSCALE ;loading & storing pairs of values.
DETENS  EQU DSCALE
LINE    RMB 2   ;The line count from reference for the
                ; position servo
DESTN   RMB 2   ;the servo loop destination (16 bit, 2's C)
TRKNUM  RMB 2   ;Current or target track address
STPCTR  RMB 2   ;16-bit Step Counter
PTRACK  RMB 2   ;Present track # in SEEK routine
LINOFF  RMB 2   ;Line Offset. DESTN = TRKNUM + LINOFF
COMCNT  RMB 2   ;Commutation counter, circular, 0-299
CPOINT  RMB 2   ;Pointer into the commutation table
REFNUL  RMB 2   ;Value of CPOINT @ Reference Null
REFLIN  RMB 2   ;Value of LINE @ Reference Null
FIDMIN  RMB 1   ;Fiduciary - minimum reading
FIDMAX  RMB 1   ;Fiduciary - maximum reading
FIDREF  RMB 1   ;(FIDMAX+FIDMIN)/2
INTGRL  RMB 2   ;The detent loop running integral
FLAGS   RMB 1   ;A byte of bitwise flags
*       7     6     5     4     3     2     1     0
* Spare Spare OUT  Spare COS   SIN   QU4   QU1
```

```
FLAG    RMB 1 ;Interrupt flag. Bit 7 = Interrupt occurred
ULFLAG  RMB 1 ;Upper/Lower flag.  0 = servo on Upper surface, 1 =
ZM0     RMB 2 ;Today's position
ZM1     RMB 2 ;Yesterday's position
MUXMSK  RMB 1 ;MUX mask to select SIN or COS in DETENT
SLOPE   RMB 1 ;Position slope in DETENT.  0 = +ve,
              ; FF = -ve.
TOFF    RMB 2 ;Total Offset. +ve = INwards.
              ; Range +/- 192
DOFF    RMB 2 ;DETENT Offset. Restricted to the range
              ; +/-64 approx.
TOFFU   RMB 2 ;TOFF for upper surfaces
TOFFL   RMB 2 ;TOFF for lower surfaces
HTRKI   RMB 2 ;Half Track pitch INwards, 16 bit +ve
              ; Integer, 4 uin/bit
HTRKO   RMB 2 ;Ditto OUTwards
QTRKI   RMB 2 ;Quarter Track pitch INwards
              ; (HTRKI/2 + Hysteresis)
QTRKO   RMB 2 ;Quarter Track pitch OUTwards -
              ; (HTRKO/2 + Hysteresis)
Q1W     RMB 1 ;Quadrant 1 width. +ve integer, 4uin/bit.
Q2W     RMB 1 ;         2
Q3W     RMB 1 ;         3
Q4W     RMB 1 ;         4
ZERO0   RMB 1 ;DAC #0 Offset current
ZERO1   RMB 1 ;DAC #1 Offset current
OUTPUT  RMB 2 ;Pointer to DAC output routine for
              ; FINAL & DETENT
SPEED   RMB 1 ;0 = High speed.  -1 = Slow speed.
TEMP1   RMB 1  ;Temporary registers
TEMP2   RMB 1
TEMP3   RMB 1
TEMP4   RMB 1
TEMP5   RMB 1
TEMP6   RMB 1
TEMP7   RMB 1
TEMP8   RMB 1
TEMP9   RMB 1
```

```
TEMP10   RMB 1
TEMP11   RMB 1
TEMP12   RMB 1
TEMP13   RMB 1
TEMP14   RMB 1
TEMP15   RMB 1

DIVISR   RMB 2  ;Used in CONVRT
FRACTN   RMB 1  ;Used in CONVRT
STIME0   RMB 2  ;SPINDLE SPEED TIME
STIME1   RMB 2  ;SPINDLE SPEED TIME
IRQ2     RMB 1  ;JUMP instruction for Wedge Interrupts.
VECTOR   RMB 2  ;ADDRESS to jump to.
COLD     RMB 1  ;0 if this is a cold start, 1 if it's
                ; a re-zero.
TRKOFF   RMB 2  ;Track Offset for servo writing
HITRK    RMB 2  ;High Track # for DERASE routine
DELTA    RMB 2  ;Fine adjustment to S.T.W. Offset
OPTION   RMB 1  ;Program switch register
MAXBST   RMB 1  ;Max level from burst integrator
ABST     RMB 1  ;A burst amplitude
BBST     RMB 1  ;B burst amplitude
RETRYS   RMB 1  ;Re-try counter
POINTR   RMB 2  ;Storage pointer for emulator use only ORG 00C0H
    ZONE1  RMB 4  ;SSCALE,SINREF,CSCALE,COSREF for
                  ; trks 000-152
    ZONE2  RMB 4  ;.... for trks 153-305
    ZONE3  RMB 4  ;.... for trks 306-458
    ZONE4  RMB 4  ;.... for trks 459-611
                  ; (Calibration tables)
    BUFFER RMB 32 ;Buffer for emulator results
    STACK  RMB 16 ;Just a reminder to leave space
                  ; for the stack !
   PAGE
   ORG 0E000H
 * ================= INITIALIZATION =====================
```

```
START   SEI         ;Disable Interrupts

IFNE NGA
LDAA    #0FFH
LDAB    #0FBH
        ENDC
        IFEQ NGA
CLRA
LDAB    #78H
        ENDC
STAB    CR1I        ;Maintain an image so we can recall what
                    ; we've done
STAB    CR1         ;Clear FORCE WRITE, DCERASE, LATCH.
STAA    CR0I
STAA    CR0         ;Clear TRK0,READY & SK COMPL over the
                    ; Interface
LDAA    #0FFH
STAA    PT6DIR      ;Configure PORT6 all outputs
STAA    PT2DIR      ;Make P20 an output pin
LDAA    #80H
STAA    PORT6       ;Both LEDs off, Motor off
STAA    DAC1        ;Set DACs to zero motor current
STAA    DAC0
LDAA    #47H
STAA    PT5CTL      ;Enable RAM,WAIT & INTERRUPTS :
                    ; Prohibit HALT
CLRA
STAA    TCSR1       ;Disable Timer Interrupts
STAA    TCSR2       ;Disable Timer Interrupts
STAA    TCSR3       ;Disable Step Counter
        IFEQ NGA
LDAB    #0C0H
STAB    CONFIG
LDAB    #64
STAB    PRESCA
LDAB    #8
STAB    SPCONR+1
LDAB    #0FH
```

```
     STAB  SPCONR
     LDAB  #0
     STAB  SPCONR
     LDAB  #256-130
     STAB  IDR
     LDAB  #0C1H
     STAB  CONFIG  ;Start the spindle motor
           ENDC CLR   PORT6   ;Start the spindle motor
     LDX   #0042H  ;Mustn't clear the Image registers !!
CLRRAM  CLR  0,X   ;Clear RAM from 0042H...
     INX
     CPX   #0100H  ;... to 00FFH
     BLT   CLRRAM LDAA  #80H
     STAA  ZERO0   ;80H to DAC gives nominal zero current
     STAA  ZERO1
     LDAA  #NOMINL
     STAA  RAWSIN  ;Set initial values for transducer means
     STAA  RAWCOS LDD   #68     ;1/4 track + hysteresis
     STD   QTRKI
     LDD   #-68
     STD   QTRKO
     LDD   #128    ;1/2 a track
     STD   HTRKI
     STD   HTRKO
     STAB  Q1W
     STAB  Q2W
     STAB  Q3W
     STAB  Q4W LDS   #00FFH  ;Place 16-byte stack @ top of user RAM
     LDAA  #7EH
     STAA  IRQ2    ;Put a JMP instruction @ IRQ2
```

```
* ======== NOW WAIT FOR SPINDLE UP TO SPEED ===========

LDAB #128    ;Wait for 4 seconds
  JSR  DELAY
  LDX  #SPNCK  ;Set up Interrupt for Spindle speed check
  STX VECTOR
  CLRA
  CLRB
  STD TEMP1    ;Double precision Rev counter
  JSR  ENABLE  ;Clear FLAG & enable SPNCK interrupts
  LDAB #64     ;Wait 2 seconds for a spindle pulse
  JSR  DELAY
  TST FLAG     ;Was there an interrupt from spindle pulse ?
  BNE  START1  ;Y-Branch
FAULT2 LDAA #2 ;N-Abort the run-up

JMP  FLASH

START1 LDX  TEMP1  ;Get Rev count
  CPX  #500   ;Have 500 more revs elapsed ?
  BGT  FAULT2 ;Y- abort
  TIM  #1,FLAG ;Above 3246 RPM ? (91% running speed)
  BEQ  START1 ;N-Loop back again
  SEI         ;Y-Disable Interrupts
  LDAA CR1I
  ORAA #4
  STAA CR1 ;Release actuator latch
  LDAB #1
  JSR  DELAY ;Wait 32ms
  ANDA #0FBH
  STAA CR1 ;Cancel Release Pulse

* Now do coarse calibration of transducer, ending up
* 300 trks IN from ref null
  JSR  COARSE
  LDX  #GUARDO
  STX  LINOFF ;Use nominal LINE OFFset until
              ; FOUND get's the true value
```

\* Re-enter here on a Re-Zero command

```
REZERO  SEI      ;Disable Interrupts
  LDX   REFNUL
  STX   CPOINT  ;Prepare to rotate to the ref null
  LDAB  #32
  JSR   OUTDAC  ;Give it 240 mA...
  LDAB  #6
  JSR   DELAY   ;...for 200 ms...
  LDAB  #64
  JSR   OUTDAC  ;...& then 480 mA...
  LDAB  #3
  JSR   DELAY   ;...for 100 ms
  LDD   REFLIN
  STD   LINE    ;Restore Line count
```

\* Now we must get set up for our very first seek.

```
GETSET  LDD   #150
  STD   COMCNT  ;Initialise Commutation counter

CLR   FLAGS   ;Clear OUT,SIN,COS,Q4 & Q1 flags
  LDX   CPOINT
  DEX
  STX   CPOINT  ;Select active coil for Servo ops
                ; coming soon
  JSR   ENCODE  ;Returns with SIN in A, COS in B
  LDX   TOFF    ;Will be non-zero if this is a
                ; Re-Zero sequence
  STX   TEMP12  ;Retain TOFF for later
  LDX   #0
  STX   TOFF
  TSTB          ;COS +ve ?
  BPL   GETSE1  ;Y-
  LDX   #1      ;Make TRKNUM odd
  BRA   GETSE2
GETSE1 LDX #0   ;Make TRKNUM even
GETSE2 STX TRKNUM
```

```
        JSR     PREDET  ;Prepare DETENT output routine
        JSR     SETUP   ;Set up DETENT parameters & servo on
                        ; track for 3ms
        JSR     CALIB   ;Do transducer calibration in 4 zones
        TST     COLD    ;Is this a ReZero ?
        BNE     GETSE3  ;Y-

ERA     DACOF4  ;Skip DAC calibration - it gives no benefits
        LDD     TRKNUM  ;N- Cold start, so we calibrate DAC offsets
        SUBD    COMCNT  ;TRKNUM < COMCNT ?
        BPL     DACOF1  ;N-
        ADDD    #300
DACOF1  JSR     CALDAC  ;Calibrate 1st DAC
        LDX     TRKNUM
        CPX     #300
        XGDX
        BGT     DACOF2
        ADDD    #300
        BRA     DACOF3
DACOF2  SUBD    #300
DACOF3  JSR     CALDAC  ;Calibrate 2nd DAC
DACOF4  NOP LDX     #0
        STX     TRKNUM
        JSR     SEEK
        JSR     DOQUAD  ;Initialise Q1W, Q2W, Q3W, Q4W
        JSR     CALIB   ;Repeat the calibration on a cold start GETSE3  LDAB    PORT5   ;Read the option links
        LSRB
        LSRB
        LSRB
        LSRB
        LSRB            ;Discard trash
        STAB    OPTION
        ASLB
        LDX     #JTABLE
```

```
  ABX
  LDX  0,X    ;Get address of required routine
  JMP  0,X    ;& go to it JTABLE FDB ISOLA,FIDUCY,NSB,FIDUCY
   FDB ISOLA,FIDUCY,NSB,FIDUCY
* Find Track Zero using the Fiduciary.
FIDUCY CLRA
  STAA FIDMAX
  COMA
  STAA FIDMIN ;255
  LDX  #BUFFER ;Temporary expt.
  PSHX
  LDX  #HITRK1 ;Start of search zone
FIDUC1 STX   TRKNUM
  JSR  SEEK
  JSR  GETFID ;Read the Fiduciary
  PULX
  STAB 0,X
  INX
  PSHX
  CMPB FIDMIN ; <FIDMIN ?
  BCC  FIDUC2 ;N- branch
  STAB FIDMIN
FIDUC2 CMPB FIDMAX ; >FIDMAX ?
  BLS  FIDUC3 ;N- branch
  STAB FIDMAX
FIDUC3 LDX   TRKNUM ;Step OUT 2 tracks
  DEX
  DEX
  CPX  #LOTRK1 ;End of search zone ?
  BGE  FIDUC1 ;N- loop again
  LDAB FIDMAX
  SUBB FIDMIN
  CMPB #100    ;Fiduc pulse > 2V ?
  BHI  FIDUC4 ;Y- branch
```

```
FLT11   LDAA #11  ;Fiduciary not found
        JMP  FLASH
FIDUC4  PULX      ;Clean up the stack
        LSRB
        ADDB FIDMIN
        STAB FIDREF ; = (FIDMIN + FIDMAX)/2
        JSR  SIT12   ;Refresh the DETENT loop
FIDUC5  JSR  GETFID ;Read the Fiduciary
        CMPB FIDREF ; >Reference ?
        BHI  FIDUC6 ;Y- branch
        LDX  TRKNUM
        INX
        INX
        STX  TRKNUM ;Even tracks only
        CPX  #HITRK1 ;End of zone ?
        BGT  FLT11  ;Y- bomb
        JSR  SEEK
        BRA  FIDUC5
FIDUC6  LDAA PORT5 ;Read option links
        BITA #40H  ;Sync-up required ?
        BNE  JTRK0  ;N- branch
        LDX  TRKNUM
        DEX
        DEX
        STX  TRKNUM
        JSR  SEEK   ;Seek OUT 2 tracks
        LDAA #3
        STAA RETRYS ;Allow 3 attempts to sync
        LDD  TEMP12 ;Retrieve TOFF
        BEQ  FIDUC9 ;Branch if TOFF = 0
        JSR  SLIDE  ;else slide to the offset position
        JSR  VERIFY ;Isolated A found on -2 AND -1 ?
        BNE  FOUND  ;Y- exit from the FIDUCY loop
FIDUC8  JSR  SLCL  ;BACK TO CENTRELINE
FIDUC9  JSR  VERIFY
        BNE  FOUND
        LDD  #-80
```

```
     JSR   SLIDE   ;OUT 1/3 TRACK
     JSR   VERIFY
     BNE   FOUND
     JSR   SLCL
     LDD   #80
     JSR   SLIDE   ;IN 1/3 TRACK
     JSR   VERIFY
     BNE   FOUND
     DEC   RETRYS  ;Was that 3rd try ?
     BNE   FIDUC8  ;N-
     BRA   FAULT5  ;Y-

* A "Find Track Zero" routine for drives with no servo
*  bursts or Fiduciary
NSB  LDX   #0
     STX   TRKNUM
     JSR   SEEK    ;Seek to track 00
JTRK0 BRA   TRACK0

*  Search for the isolated A bursts on tracks -2 & -1.

ISOLA  LDAA #3
     STAA  RETRYS
     LDD   TEMP12  ;Retrieve TOFF
     JSR   SLIDE   ;Slide to the offset position
ISOLA1 LDD  #(-GUARD0/2) ;Start of search zone
     ANDB  #0FEH   ;Ensure we start on an even track
     STD   TRKNUM
ISOLA2 JSR  SEEK ;Move to the next track
     JSR   VERIFY  ;Check if burst present
     BNE   FOUND   ;Branch if burst found on -2 AND -1
     LDX   TRKNUM  ;If no burst found, move IN 2 tracks
     INX
     INX
     STX   TRKNUM
     CPX   #GUARD0 ;End of search zone ?
     BLT   ISOLA2  ;N- loop again
```

```
  DEC   RETRYS  ;Was that 3rd try ?
  BNE   ISOLA1  ;N- Try again

FAULT5  LDAA #5  ;Y- Abort & Flash 5 times
  JMP   FLASH

*===    WE HAVE FOUND TRACK -1 ====

FOUND   JSR   STEPIN  ;Move to track zero
TRACK0  JSR   TCSURF  ;Nominate Temp Comp Surface
                     ; depending on ULFLAG LDD   LINOFF
  ADDD  TRKNUM
  STD   LINOFF  ;Save offset between TRK00 and LINE 00
  LDD   #0
  STD   TRKNUM  ;Reset Track Address
  STAA  FLAG    ;Clear Spindle Speed Error flag

OIM   #10H,PORT6  ;TURN ON THE GREEN LED

LDAB  OPTION  ;Get links image
  CMPB  #6      ;Servo Write ?
  BLT   NORMAL  ;N- branch
  JMP   SVOWRT
NORMAL CMPB #3  ;Random Seek Test ?
  BNE   NORM1   ;N- branch
  JMP   TESTR

* >>>>> SKI PATCH <<<<<

NORM1  LDX   #INDEX
  STX   VECTOR
  TST   COLD    ;Is this a cold start ?
  BNE   WARM    ;N-
  INC   COLD
  LDAA  #1
  STAA  ULFLAG
  JSR   TCSURF  ;Nominate lower TC surface
  JSR   ENABLE  ;Enable T/C system
```

```
       LDD   #31200
       JSR   SIT    ;Wait 130 revs for Temp correction
       LDX   TOFF
       STX   TOFFL
       CLR   ULFLAG
       JSR   TCSURF ;Nominate upper
       LDD   #6000
       JSR   SIT    ;Wait another 25 revs
       SEI          ;Disable interrupts
       LDX   TOFF
       STX   TOFFU WARM   LDAB  #03H
       STAB  TCSR3  ;Inhibit Step pulse counter
       LDAA  #0FFH
       STAA  TCONR  ;Load T2 Time Constant Register
       CLRA
       STAA  T2CNT  ;Clear the Step pulse counter
       STAA  TEMP8  ;...& its image
       LDAA  #T2RST
       STAA  TCSR3  ;Enable the Step pulse counter
       JSR   RDYTK0 ;Declare READY & TRACK 0 over interface
       PAGE
MONITR LDX   #QUICKY
       STX   VECTOR
       CLI          ;Any queued interrupt is now
                    ; serviced by QUICKY
             IFEQ NGA
       LDAB  CR1I
       ANDB  #0E7H
       STAB  CR1    ;CLREVENT, CLROVF
       ORAB  #18H
       STAB  CR1    ;/CLREV,/CLROVF
             ENDC

CLR   FLAG
       LDX   #INDEX
       STX   VECTOR
```

```
    JSR   SIT12   ;This is necessary to avoid occasional
                  ; read errors
    JSR   SKDONE  ;Declare SEEK DONE to the GA

*  ====   Main Monitor Loop Starts Here   ====

MONIT1  JSR  SIT12  ;Sit in DETENT for 12 loops
  LDAB  STAT1  ;Fetch status byte from gate array
  BITB  #10H    ;Is Drive Selected ?
  BNE   MONIT2 ;Y- branch
  AIM   #0F7H,PORT6  ;N- Turn RED LED off
  BRA   MONIT3
MONIT2  OIM  #08H,PORT6  ;Turn RED LED on
MONIT3  TSTB  ;Have any Step pulses arrived ?

IFNE SKI
  BMI   MONIT1  ;N-
        ENDC

IFEQ SKI
  BPL   MON     ;Y- then exit monitor loop
  BITB  #20H    ;Head change ?
  BEQ   MONIT1  ;N-
  JSR   CHANGE
  LDAA  T2CNT
  LDAB  TEMP8
  CBA           ;Any more STEP pulses ?
  BEQ   MONIT1  ;N-
        ENDC

*  ====   End of Main Monitor Loop   ====

* We must disable interrupts before we change TRKNUM
*  because INDEX refers to it
MON     SEI
  JSR   NOTZSD  ;Clear TRK0 & SK DONE to the GA
MON1    LDD  #0  ;Clear software STEP counter
  STD   STPCTR
```

```
MON2  TIM  #80H,TCSR3  ;Has Step pulse
                      ; counter overflowed ?
      BEQ  MON3    ;N- branch
      INC  STPCTR  ;Y- add 256 to software Step count by
                   ; INC of Hi byte
      LDAA #T2RST
      STAA TCSR3   ;Clear the CMF in TCSR3 by writing to it
MON3  TIM  #8,STAT1  ;Is the last Step pulse in ?
      BNE  MON5    ;Y- branch
MON4  LDD  #6  ;N-
      JSR  SIT    ;Do track following for 420us ...
      BRA  MON2   ;...& loop again MON5  LDD  #1
      JSR  SIT    ;Wait another 70 us
      TIM  #8,STAT1  ;Still "STEP COMPLETE" ?
      BEQ  MON4   ;N- go back
      CLRA
      LDAB T2CNT  ;Get # of Step pulses in counter
      PSHB        ;Save a copy awhile
      SUBB TEMP8  ;B = change in counter
      BCC  MON6
      COMA        ;Need -256 if there's a carry
MON6  ADDD STPCTR ;Add n*256 for overflows
      STD  STPCTR ;STPCTR = # of steps to seek
      PULB
      STAB TEMP8  ;Save image of T2CNT
      TIM  #4,STAT1 ;Were we instructed to do an INWARD seek ?
      BEQ  MON7   ;N- branch
      LDD  STPCTR ;Y- go inwards to higher track nos.
      ADDD TRKNUM
      XGDX
      CPX  #MAXTRK ;Target cylinder > MAXTRK ?
      BLE  MON8   ;N- go do it
      JMP  REZERO ;Y- Re-Zero MON7  LDD  TRKNUM ;OUTward seek coming.
      SUBD STPCTR
      XGDX
```

```
        CPX  #0        ;Target cylinder <0 ?
        BPL  MON8      ;N- branch
        JMP  REZERO    ;Y- do a re-zero sequence MON8    STX  TRKNUM
        JSR  SEEK
        LDAA T2CNT
        LDAB TEMP8
        CBA            ;Has T2CNT changed ?
        BNE  MON1      ;Y- loop back
        JSR  SKEND     ;Do Seek-End stuff
        JMP  MONITR    ;Return to Monitor loop
        PAGE
* ====  WRITE SERVO BURSTS  ====

* First, we'll write 8 tracks on all 4 surfaces &
*  measure the offsets needed to get a balance between
*  A-B bursts. This gives good initial DELTA values &
*  a quick confidence check on all 4 servo heads and the
*  burst integrator.

SVOWRT  LDAB #0EFH
        JSR  ANDB0     ;Declare READY
        LDAB CR1I
        ANDB #0F7H
        STAB CR1I
        STAB CR1       ;Reset SKI cct during SVOWRT
        LDX  #0
        STX  TEMP8     ;DELTA for ECUS
        STX  TEMP10    ; " ECLS
        STX  TEMP12    ; " OCUS
        STX  TEMP14    ; " OCLS
        LDX  #16
        STX  HITRK
        JSR  DERASE    ;Erase out to track +16, all 4 surfaces
        LDX  #70
        STX  TRKOFF    ;Use fixed offsets of +/- 280 uin
        LDX  #0        ;We'll write tracks 0 to 15 inclusive
```

```
SVOWR1 JSR   DOSEEK ;Do Seek with TOFF = 0
       LDAB  CROI
       ANDB  #0F8H
       TIM   #1,TRKNUM+1
       BEQ   SVOWR2
       ORAB  #OCUS
       BRA   SVOWR3

SVOWR2 ORAB  #ECUS
SVOWR3 STAB  CROI
       STAB  CR0    ;Nominate upper
       JSR   TRKA   ;Move to "A" burst offset
       JSR   WRTA   ;Write "A" burst on US
       JSR   FLIPUL ;Nominate lower
       JSR   WRTA   ;Write "A" burst on LS
       JSR   TRKCL  ;Back to centreline
       JSR   TRKB   ;Move to "B" burst offset
       JSR   WRTB   ;Write "B" burst on LS
       JSR   FLIPUL ;Flip to upper
       JSR   WRTB   ;Write "B"burst on US
       JSR   TRKCL  ;Back to centreline
       JSR   CHEKRD
       TIM   #1,TRKNUM+1 ;Even cyl ?
       BEQ   SVOWR4 ;Y- branch
       ADDD  TEMP12
       STD   TEMP12 ;Sum Delta for OCUS
       BRA   SVOWR5
SVOWR4 ADDD  TEMP8
       STD   TEMP8  ;Sum for ECUS
SVOWR5 JSR   FLIPUL ;Flip to lower
       JSR   SLCL
       JSR   CHEKRD
       TIM   #1,TRKNUM+1
       BEQ   SVOWR6
       ADDD  TEMP14
       STD   TEMP14 ;Sum for OCLS
       BRA   SVOWR7
```

```
SVOWR6 ADDD TEMP10
  STD  TEMP10 ;Sum for ECLS

SVOWR7 JSR SLCL ;Back to centreline before next seek
  LDX  TRKNUM
  INX
  CPX  #16    ;16 tracks done ?
  BLT  SVOWR1 ;N- loop back
  LDD  TEMP8  ;Divide by 8 (for 8 samples) & ...
  JSR  BLINK  ;... verify mean DELTA
              ; value < 7, else FAULT 10.
  STX  TEMP8
  JSR  SIT12
  LDD  TEMP10
  JSR  BLINK  ;/8 & verify
  STX  TEMP10
  JSR  SIT12
  LDD  TEMP12
  JSR  BLINK
  STX  TEMP12
  JSR  SIT12
  LDD  TEMP14
  JSR  BLINK
  STX  TEMP14
  LDD  #15000
  JSR  SIT    ;Wait 1 sec
  OIM  #10H,PORT6 ;& put the Green LED on again

* Next, we completely erase all 4 surfaces

LDX  #MAXTRK+2
  STX  HITRK
  JSR  DERASE ;Erase all tracks on all 4 surfaces

* Next, we write 2 special tracks with Isolated A
*  burst & zero offset

LDX  #-2
  JSR  DOSEEK ;Seek to track -2
```

```
        JSR   SIT75    ;Give it another 5ms to settle
        JSR   WRTA     ;Write "A" burst with no offset
        JSR   FLIPUL
        JSR   WRTA
        LDX   #-1
        JSR   DOSEEK   ;Seek to track -1
        JSR   SIT75
        JSR   WRTA     ;Write "A" burst with no offset
                       ; on OC surfaces
        JSR   FLIPUL
        JSR   WRTA
        PAGE
* Now we write 615(+2) data tracks with
*  offset A & B bursts LDX   #0
WRITE   JSR   DOSEEK
        LDAB  CR0I
        ANDB  #0F8H
        TIM   #1,TRKNUM+1 ;Even track ?
        BEQ   WRITE1   ;Y- branch
        ORAB  #OCUS
        LDX   TEMP12
        BRA   WRITE4

WRITE1  ORAB  #ECUS
        LDX   TEMP8
        BRA   WRITE4

WRITE2  LDAB  CR0I
        ANDB  #0F8H
        TIM   #1,TRKNUM+1
        BEQ   WRITE3
        ORAB  #OCLS
        LDX   TEMP14
        BRA   WRITE4

WRITE3  ORAB  #ECLS
        LDX   TEMP10
WRITE4  STAB  CR0I
        STAB  CR0
```

```
     STX   DELTA  ;DELTA is a small correction
                  ; in the range +/- 10
   LDAB #8
   STAB RETRYS WRITE5 LDD DELTA
  ADDD #70
  STD  TRKOFF  ;Track offset = 70 + DELTA
  JSR  TRKA    ;Move to the A offset position
  JSR  WRTA    ;Write A burst
  JSR  TRKCL   ;Back to centreline
  LDD  #70
  SUBD DELTA
  STD  TRKOFF  ; Track Offset = 70 - DELTA
  JSR  TRKB    ;Move to the B offset position
  JSR  WRTB    ;Write B burst
  JSR  TRKCL   ;Back to centre-line
  JSR  CHEKRD  ;Check bursts on current surface
  BCS  BAD
  LDX  DELTA
  LDAB CR0I
  ANDB #7    ;Get current surface #
  CMPB #OCUS
  BNE WRITE6
  STX TEMP12
  BRA WRITE2
  PAGE
WRITE6 CMPB #OCLS
  BNE WRITE7
  STX TEMP14
  BRA WRITE9

WRITE7 CMPB #ECUS
  BNE  WRITE8
  STX TEMP8
  BRA WRITE2

WRITE8 STX TEMP10
```

```
WRITE9 LDX  TRKNUM
   INX
   CPX  #MAXTRK+2
   BGT  DONE
   JMP  WRITE

BAD   DEC RETRYS
   BNE   BAD1
   JMP   FAULT5 ;Y- failed to verify servo bursts BAD1  LDD  TOFF
   ASRA
   RORB         ;Use 1/2 the error as a correction
   ADDD  DELTA
   JSR   LIMIT ;Limit it to +/- 10
   STX   DELTA ;DELTA = DELTA + TOFF
   JSR   TRKCL
   JSR   ERASE  ;Erase bursts on this surface only.
   JMP   WRITE5

DONE  LDX  #0
   JSR   DOSEEK ;Go to track zero
   OIM   #8,PORT6 ;Turn red LED on
   JSR   RDBRST ;Activate the TC system
   DONE1 JSR SIT12
   BRA   DONE1
   PAGE
* Routine to flash fault codes on the RED LED.
   FAULT4 LDAA #4   ;Power fail
   BRA   FLASH
   FL13  LDAA #13 ;Program error
   FLASH   SEI     ;Disable interrupts
   STAA  TEMP1 ;# of times to flash
   LDAA  #80H
   STAA  DAC1  ;Put zero demand into both DACs
   STAA  DAC0
```

```
      AIM   #0E7H,PORT6  ;Turn off both LEDs
      JSR   NOTRDY ;Clear SK COMPLETE,TRACK 00,READY
FL1   LDAB  #40
      JSR   DELAY  ;Wait 1.25 secs
      LDAA  TEMP1  ;TEMP1 = Number of times to flash
FL2   OIM   #08H,PORT6  ;Turn on red LED
      LDAB  #7
      JSR   DELAY  ;Wait 224 ms
      AIM   #0F7H,PORT6  ;Turn off red LED
      LDAB  #7
      JSR   DELAY  ;Wait 224 ms
      DECA         ;Flashes done ?
      BNE   FL2    ;N- loop again
      LDAA  TEMP1  ;Y- get Fault code
      CMPA  #4     ;Is this a POWER FAIL ?
      BNE   FL1    ;N-continue flashing
      TIM   #1,PORT5  ;Y- Is POWER FAIL still true ?
      BEQ   FL1    ;Y-continue flashing
      JMP   START  ;N-Wind her up again
      PAGE
* ========  EMULATOR TEST ROUTINES  =========

* Check transducer NULLS.
TESTN  LDAA  #08H
       STAA  PORT6     ;GREEN OFF, RED ON
       LDX   #BUFFER
       PSHX
       LDX   #COMTBL-1 ;Alternatively, LDX #COMTBL+12
       STX   CPOINT
TESTN1 LDX   #0
       STX   LINE
       EIM   #10H,PORT6  ;Toggle the GREEN
       JSR   COMIN   ;Alternatively, JSR COMOUT
       PULX
       LDD   LINE
       STD   0,X     ;Save LINE values in the buffer
       INX
```

```
  INX
  PSHX
  CPX  #BUFFER+24  ;12 values saved ?
  BNE  TESTN1    ;N- loop again
HALTN FCB  00 ;Trap halt @ end of test

* Save values of TOFF in Emulator buffer area F800-F89D
TESTO LDX  #0F800H
  STX  TEMP8 ;Pointer into the buffer
  LDX  #0

TESTO1 JSR TESTO3 ;Seek, measure TOFF & store it
  LDX  TRKNUM
  INX
  JSR  TESTO3 ;Ditto for odd track
  LDD  TRKNUM
  ADDD #15    ;We'll do trks 0/1,16/17,32/33, etc
  XGDX
  CPX  #MAXTRK
  BLT  TESTO1

LDAB #80H  ;"Marker byte"
  LDX  TEMP8
  STAB 0,X
  INX
  STAB 0,X   ;Store 2 markers in the buffer
  INX
  STX  TEMP8
  LDX  TRKNUM
TESTO2 JSR TESTO3 ;Now repeat, this time seeking OUTwards
  LDX  TRKNUM
  DEX
  JSR  TESTO3
  LDD  TRKNUM
  SUBD #15
  XGDX
  CPX  #0
  BGT  TESTO2
```

```
HALTO  FCB  00

TEST03 JSR  DOSEEK
  JSR  RDBRST  ;Enable burst correction
  LDD  #8000   ;Allow 32 revs to make A=B
  JSR  SIT
  JSR  AVERAG  ;Measure ave value of TOFF over 8 revs
  LDX  TEMP8
  STAB 0,X     ;Save TOFF value
  INX
  STX  TEMP8
  RTS

* Measure quadrant widths.  On entry, we're @ Track 00.
TESTQ  LDX  #0F800H
  PSHX
TESTQ1 JSR  DOQUAD  ;During this, it steps IN 1 trk
  PULX
  LDAB Q1W
  STAB 0,X
  INX
  LDAB Q2W
  STAB 0,X
  INX
  LDAB Q3W
  STAB 0,X
  INX
  LDAB Q4W
  STAB 0,X
  INX
  PSHX
  LDX  TRKNUM
  CPX  #MAXTRK
  BGE  HALTQ
  JSR  STEPIN
  BRA  TESTQ1
HALTQ  FCB  00
```

* Measure the RANDOM average access time.
```
TESTR   CLRA
  STAA  PORT6    ;Both LEDs off
  LDX   #0
  STX   TOFF     ;Can vary this on emulator runs
  JSR   SETUP    ;Set up DETENT for the offset (if any)
  LDAA  #6
  STAA  TEMP4    ;To flash 3 times TESTR1 LDD  #7000
  JSR   SIT      ;Detent for 500ms
  EIM   #18H,PORT6 ;Toggle both LEDs
  DEC   TEMP4    ;3 flashes done ?
  BNE   TESTR1   ;N- loop again LDX   #1
TESTR2 PSHX
  LDX   #1000
TESTR3 PSHX
  LDD   FRC      ;Use Free Running Counter as Random number
TESTR4 SUBD #MAXTRK+1
  CMPA  #02H     ;TRK > 3*256 ?
  BHI   TESTR4   ;Y- loop again
  XGDX
  CPX   #MAXTRK  ;TRK > 614 ?
  BLE   TESTR5   ;N- proceed with seek
  XGDX
  BRA   TESTR4   ;Y- go round again TESTR5 JSR  DOSEEK
  PULX
  DEX            ;Inner loop done ?
  BNE   TESTR3   ;N- loop again
  PULX
  DEX            ;Outer loop done ?
  BNE   TESTR2   ;N-
  LDAA  #08H
  STAA  PORT6    ;Solitary RED means end of Test
```

```
HALTR   JSR SIT12
  BRA   HALTR
  PAGE
* ================ LOOK-UP TABLES ======================
* This table is no longer used.
* The SHORT table is used only on short seeks
* ( <8 tracks ).  It holds the Demanded Velocities for
* 0 to 6 tracks to go, 64 uin per entry, 0.339 ips/bit SHORT FCB 00,00,02,04,06,08,10,12,14,15,16,17,18,19,20,21
  FCB 21,22,23,24,24,25,26,27,27,28,29,29,30,31,31,32
  FCB 33,33,34,35,35,36,36,37,38,38,39,39,40,41,41,42
  FCB 42,43,43,44,45,45,46,46,47,47,48,48,49,49,50,51
  FCB 51,52,52,53,53,54,55,55,56,56,57,57,58,58,59,59
  FCB 60,60,61,61,62,62,63,63,64,64,65,65,66,66,67,67
  FCB 68,68,68,68,68,68,68,68,68,68,68,68,68,68,68,68
  FCB 68,68,68,68,68,68,68,68,68,68,68,68,68,68,68,68

* Demanded Velocity Table for 0 to 6 tracks from target
* 64uin per entry.  0.0339 ips/bit   (73 = 2.48ips)

LOWVEL FCB 00,00,00,02,04,06,08,10,11,12,13,13,14,15,16,16
  FCB 17,18,19,19,20,21,21,22,22,23,24,24,25,25,26,27
  FCB 27,28,28,29,29,30,30,31,31,32,33,33,34,34,35,35
  FCB 36,36,37,37,38,38,39,39,40,40,40,41,41,42,42,43
  FCB 43,44,44,45,46,46,47,47,48,48,49,49,50,50,51,51
  FCB 52,52,53,53,54,54,55,55,56,56,57,57,58,58,59,59
  FCB 60,60,60,60,60,60,60,60,60,60,60,60,60,60,60,60
  FCB 60,60,60,60,60,60,60,60,60,60,60,60,60,60,60,60
VMAX1 EQU 60       ;Plateau speed for 8 to 6 tracks to go
* Demanded velocity table for 5 to 39 tracks from target
* 1 track per entry.  0.085 ips/bit
*   (22 = 1.83ips, 81 = 6.91 ips)

MIDVEL  FCB 00,00,00,00,00,21,24,26,29,31
  FCB 33,35,37,39,41,43,45,47,49,51
  FCB 52,54,56,57,59,60,62,63,64,66
  FCB 67,69,70,71,72,74,75,76,77,79
```

```
* Demanded Velocity table for 40 to 106
*   tracks from target.
* 2 tracks per entry.   0.085 ips/bit   (142 = 12.07ips)

HIVEL FCB 080,082,084,086,089,091,093,095,097,099
  FCB 101,102,104,106,108,110,111,113,115,116
  FCB 118,120,121,123,124,126,127,129,130,132
  FCB 133,135,136,138
  VMAX2 EQU 143 ; Plateau speed for > 107 tracks to go
  PAGE
* INVERSION TABLE. A table relating track crossing
* period to Actual Speed.
* 1 track = 1.02 thou. Period (X) is in ECLKs/8,
* ie units of 4.094us.
* Actual Speed = 1.02 E3 /X*4.094 ips. But we work
* in bits @ 0.085ips/bit.
* So in this table, Actual Speed = 2932.7/(N+0.5) where
* N is the entry #.
* The first 10 values are omitted since they
* are never used.

INVTAB  FCB 255,255,234,217,202,189,177,167,158,150
  FCB 143,136,130,124,119,115,110,106,102,99
  FCB 96,93,90,87,85,82,80,78,76,74
  FCB 72,70,69,67,65,64,63,61,60,59
  FCB 58,56,55,54,53,52,51,51,50,49
  FCB 48,47,46,46,45

* The SHAPE table assumes a triangular shape for
* SIN/COS signals, i.e.  Y = 0.5 * X  where Y is the
* normalised transducer value and X is the distance from
* crossover @ 4 uin/bit.  e.g. if Y = 32
* then X = 64 (45 degs).  So basically, the Nth value
* in this table = 2N.  However, to allow for the rounded
* peaks, the higher entries in the table are modified
* & by the time Y = 50, we get X = 127 (90 degs).
* We allow some extra values just in case
* Y ever exceeds 50.
```

```
SHAPE  FCB  00,02,04,06,08,10,12,14,16,18
       FCB  20,22,24,26,28,30,32,34,36,38
       FCB  40,42,44,46,48,50,52,54,56,58
       FCB  60,62,64,66,68,70,72,75,78,80
       FCB  82,85,88,92,95,98,102,105,109,114
       FCB  127,127,127,127,127,127,127,127,127,127
       FCB  127,127,127,127,127,127,127,127,127,127
       FCB  127,127,127,127
       PAGE
```

```
*==============================================================
*   SUB-ROUTINES  *  First SEEK & DETENT, then the rest. =
*==============================================================

*   ======================= SEEK SUBROUTINE ==============

* Seek to the Track address held in TRKNUM.  After doing
*   the seek, the routine drops into the DETENT loop
* for 5ms before returning to the calling program.
* TEMP storage registers are used as follows :-
*      TEMP1,TEMP2  hold the Timer value last time
*             round the loop
*      TEMP3,TEMP4  hold the DISTANCE-TO-GO
*             TEMP5  holds the signum of the last half-SINE
*      TEMP6,TEMP7  hold ACTUAL SPEED @ .085 Ips/bit SEEK   SEI        ;Disable Wedge interrupts
   JSR   FRESH    ;Pick up fresh calibration values to
                  ;suit target track
   LDD   TRKNUM
   ADDD  LINOFF
   STD   DESTN    ;DESTN is destroyed but TRKNUM stays intact
   LDX   #0F800H
   STX   POINTR   ;For emulator work only.

* First,find the present track # from LINE
*   count & various flags

LDX   #1
```

```
     JSR   CNTTRK  ;Update quadrant flags & LINE count
     LDD   LINE
     ASLD
     XGDX          ;X = 2 * LINE
     LDAA  MUXMSK  ;Servoing on SIN ?
     BEQ   SEEK2   ;Y-
     LDAA  TOFF    ;INward offset ?
     BPL   SEEK1   ;Y- skip
     INX
SEEK1 LDAA  SLOPE
     BMI   SEEK4   ;Branch if -ve slope
     BRA   SEEK3

SEEK2 LDAA  SLOPE
     BMI   SEEK3   ;Branch if -ve slope
     TIM   #2,FLAGS ;In quadrant 4 ?
     BEQ   SEEK4   ;N- branch
     INX
SEEK3 INX SEEK4 STX PTRACK ;Save present "track number" awhile CPX   DESTN
     BNE   SEEK5
     JMP   SKEXIT  ;Exit if zero seek length
SEEK5 BGT   SEEK6   ;Branch if OUTward
     LDAB  #-112
     BRA   GOGOGO
SEEK6 LDAB  #112
GOGOGO JSR  OUTDAC  ;START THE ACTUATOR WITH 840 mA LDD   DESTN   ;DESTN = Target "track number"
     SUBD  PTRACK  ;D = # of tracks to go.
     BITB  #1      ;Seek length = even # of trks ?
     BEQ   SEEK7   ;Y- skip
```

```
        COM   SLOPE    ;N- use opposite SLOPE when we hit DETENT
  SEEK7 TSTA           ;Seek length +ve ?
        BPL   SEEK9    ;Y- go INwards
        OIM   #20H,FLAGS ;Set OUTward bit
        COMA
        COMB
        ADDD  #1       ;Make seek length +ve
        BRA   SEEK10

SEEK9  AIM  #0DFH,FLAGS ;Clear OUTward bit
  SEEK10 STD  TEMP3   ;TEMP3 = Tracks-To-Go
        XGDX
        CPX   #8       ;>8 TTG ?
        BGT   MAIN     ;Y- branch
        XGDX
        LDX   #LOWVEL
        STX   TEMP5    ;Save pointer to Low Vel table
        JMP   FINAL    ;Jump with D = Trks-to-go

* ===== MAIN SEEK MODE  (DISTANCE-TO-GO >8 TRACKS) ====
* We now work out what value LINE count will be when we
*   transfer to FINAL mode & update LINE now - we don't
*   have time to do it while seeking.

MAIN  LDD DESTN
        TIM   #20H,FLAGS ;Direction = Out ?
        BNE   MAIN2    ;Y-
        SUBD  #NTRKS
        LSRD           ;LINE = (DESTN - NTRKS)/2
        BRA   MAIN4

MAIN2 ADDD  #NTRKS-1
        LSRD           ;LINE = (DESTN + NTRKS - 1)/2
  MAIN4 STD   LINE    ;= LINE count @ entry to FINAL mode
        AIM   #SINE,PORT6 ;Initialise MUX to look at SIN

* We must now initialise TEMP5 for the SLOW
*   routine to work.
```

```
        CLR    TEMP5    ;Assume we started on a +ve slope
        LDAA   FLAGS
        BITA   #20H     ;Going INwards ?
        BEQ    MAIN12   ;Y- branch
        TIM    #1,PTRACK+1 ;Starting on odd track ?
        BNE    MAIN14   ;Y- branch
        BRA    MAIN16

MAIN12  TIM    #1,PTRACK+1 ;Odd track ?
        BNE    MAIN16   ;Y- branch
MAIN14  LDAB   RAWSIN
MAIN15  LDAA   ADC      ;Read SIN
        SBA             ;Still -ve ?
        BMI    MAIN15   ;Y- loop again
        BRA    MAIN18

MAIN16  COM    TEMP5    ;Use -ve signum
        LDAB   RAWSIN
MAIN17  LDAA   ADC      ;Read SIN
        SBA             ;Still +ve ?
        BPL    MAIN17   ;Y- loop again MAIN18  AIM    #0F0H,FLAGS ;Clear quadrant flags
        LDD    FRC
        STD    TEMP1    ;Save Timer so we can get the
                        ; interval later

*  ========   THE MAIN SEEK LOOP   ========
* We travel round this loop so long as there are more
* than 5 tracks to go.  If our speed is less than 7 ips,
* we measure the period of every track crossing
* and the loop time is 125 us.

SLOW    LDX    TEMP3
        CPX    #NTRKS   ;Were there >5 tracks to go @ the last
                        ; Xover ?
        BGT    SLOW1    ;Y- carry on
        XGDX
```

```
        LDX     TEMP6   ;Get Actual Speed @ 0.085 ips/bit
        CPX     #41     ;Speed < 3.5 ips ?
        BLT     SLEXIT  ;Y-
        JMP     FAULT8  ;Bomb cos we're out of control
SLEXIT  LDX     #LOWVEL
        STX     TEMP5   ;Save pointer for Low Vels
        JMP     FINAL   ;Jump with D = Trks-to-go SLOW1   DEX
        STX     TEMP3   ;Decrement Tracks-To-Go
        TIM     #2,PORT5 ;IRQ2 ?
        BNE     SLOW1A  ;N-
        LDD     CR0I    ;Get CR0I in A, CR1I in B
        ANDA    #0F7H   ;INDEX
        ANDB    #0BFH   ;ACKN
        STD     CR0     ;A -> CR0, B -> CR1
        ORAA    #8      ;/INDEX
        ORAB    #40H    ;/ACKN
        STD     CR0

SLOW1A  EIM     #1,PORT6 ;Change MUX to select the
                         ; quadrature signal
        LDX     COMCNT
        TIM     #20H,FLAGS ;Going OUT ?
        BNE     SLOW5   ;Y-
        INX
        CPX     #300    ;COMCNT still below 300 ?
        BLT     SLOW2   ;Y-
        XGDX
        SUBD    #300
        LDX     CPOINT
        INX
        STX     CPOINT
        XGDX
SLOW2   STX COMCNT LDAA    TEMP5   ;Was last Xover -ve ?
        BMI     SLOW12  ;Y-
```

```
SLOW3    LDAA ADC
  SUBA RAWCOS
  BPL    SLOW3    ;Wait until COS is -ve
  BRA    SLOW9

SLOW5    DEX
  CPX   #0
  BPL    SLOW6    ;Branch if COMCNT still +ve
  XGDX
  ADDD #300
  LDX   CPOINT
  DEX
  STX   CPOINT
  XGDX
SLOW6   STX COMCNT
  LDAA TEMP5    ;Was last Xover -ve ?
  BMI   SLOW11
SLOW8   LDAA ADC
  SUBA RAWCOS
  BMI   SLOW8    ;Wait until COS is +ve SLOW9    EIM #1,PORT6 ;Set MUX for SIN
  LDAB RAWSIN
SLOW10  LDAA ADC
  SBA
  BPL    SLOW10   ;Wait until SIN goes -ve
  BRA    SLOW15

SLOW11   LDAA ADC
  SUBA RAWCOS
  BPL    SLOW11   ;Wait until COS is -ve
  BRA    SLOW13

SLOW12  LDAA ADC
  SUBA RAWCOS
  BMI    SLOW12   ;Wait until COS is +ve

SLOW13  EIM #1,PORT6  ;Set MUX for Phase signal
```

```
  LDAB RAWSIN
SLOW14 LDAA ADC
  SBA
  BMI   SLOW14 ;Wait for SIN to go +ve

SLOW15 STAA TEMP5 ;Save signum for next time
  LDD   FRC
  LDX   FRC
  SUBD  TEMP1  ;D = Track Crossing Period
  STX   TEMP1
  JMP   MAIN21

* ================================================================
* If our speed is greater than 7 ips, we measure the
* time taken to traverse 2 tracks & divide it by 2.
* The loop time is 128 us.

FAST   LDX TEMP3
  DEX
  DEX
  STX   TEMP3  ;Update Tracks-To-Go
  TIM   #20H,FLAGS ;Going OUT ?
  BNE   FAST1  ;Y-

LDX   COMCNT
  INX
  INX
  CPX   #300   ;COMCNT still < 300 ?
  XGDX
  BLT   FAST3  ;Y-
  SUBD  #300
  LDX   CPOINT
  INX
  BRA   FAST2

FAST1  LDD COMCNT
```

```
        SUBD #2
        BPL   FAST3    ;Branch if COMCNT still +ve
        ADDD #300
        LDX   CPOINT
        DEX
FAST2   STX CPOINT
FAST3   STD COMCNT LDAB RAWSIN
        LDAA TEMP5    ;Get last signum & branch accordingly
        BMI  FAST8

FAST5   LDAA ADC     ;Read SIN again
        SBA
        BPL  FAST5    ;Wait until SIN is +ve
        JSR  POLLIT  ;20us hysteresis delay
        LDAB RAWSIN FAST7   LDAA ADC
        SBA
        BMI  FAST7    ;Wait for SIN to go +ve
        BRA  FAST11

FAST8   LDAA ADC
        SBA
        BMI  FAST8    ;Wait until SIN is +ve
        JSR  POLLIT  ;20us hysteresis delay
        LDAB RAWSIN FAST10  LDAA ADC
        SBA
        BPL  FAST10  ;Wait for SIN to go -ve FAST11  LDD FRC
        LDX  FRC
        SUBD TEMP1   ;- value last time
        STX  TEMP1   ;Save timer value
        LSRD         ; /2 to give D = Track Crossing Period
```

PAGE

```
* At 15.6 ips the Track Crossing Period is 128 ECLKs.
* At 0.5 ips it's 4096. For TCP < 512, we divide it
* by 8, get the inverse & use that as Speed. For 512
* < TCP <2048, we divide by 32, get the inverse,
* & divide that by 4. For TCP > 2048, we divide by
* 128, get the inverse, & divide that by 16.

MAIN21 XGDX
 CLRA
 CPX  #284   ;> 7 ips ? (1 track per 146 us)
 BLS  MAIN22 ;Y- skip
 COMA         ;N- set Low Speed flag
MAIN22 STAA SPEED
 XGDX
 LDX  #INVTAB-10 ;point to the inversion table,
                 ; allowing for 10 missing values
 LSRD         ;/2
 TSTA         ;TCP < 512 ? (Speed > 3.9 ips ?)
 BEQ  MAIN26 ;Y-
 LSRD ;/4
 LSRD ;/8
 TSTA ;TCP < 2048 ? (Speed > 0.97 ips ?)
 BEQ  MAIN24 ;Y-
 LSRD ;/16
 LSRD ;/32
 TSTA ;TCP < 8192 ? (Speed > 0.24 ips ?)
 BEQ  MAIN23 ;Y-

FAULT8 LDAA #8  ;Abort the seek.
                ; There's not enough torque.
 JMP  FLASH MAIN23 LSRD ;/64
 LSRD ;/128
 ABX
 LDAB 0,X  ;Get Speed * 16
 LSRB ;Now divide by 16
```

```
  LSRB
  BRA   MAIN25

MAIN24  LSRD  ;/16
  LSRD  ;/32
  ABX
  LDAB 0,X   ;Get Speed * 4
MAIN25  LSRB  ;Now divide by 4
  LSRB
  BRA   MAIN28

MAIN26  LSRD  ;/4
  LSRD  ;/8
  ABX
  LDAB 0,X  ;Get Actual Speed
MAIN28  CLRA  ;save it in double precision
  STD   TEMP6  ;save the current speed awhile
  STAB  DAC2   ;To Alec's DAC LDX   TEMP3
  CPX   #108  ; < 108 tracks to go ?
  XGDX
  BCS   MAIN30  ;Y- branch
  LDAB  #VMAX2  ;N- Use Max speed (12.2 ips)
  BRA   MAIN34

MAIN30  CMPB #40 ; <40 tracks-to-go ?
  BCS   MAIN32   ;Y- branch
  LSRB  ;divide it by 2 (get lookup index)
  LDX  #HIVEL-20  ;Use High Velocity Table
  BRA   MAIN33

MAIN32  LDX #MIDVEL  ;Use the Mid Velocity Table
MAIN33  ABX
  LDAB 0,X  ;Get the demanded speed
MAIN34  STAB DAC3  ;To Alec's DAC
  CLRA
```

```
    SUBD TEMP6 ;Speed Error = Demand Speed - Actual Speed
    ASLD       ;(Assuming we're going in the
               ;  right direction !!)
    ASLD
    ASLD ;Required Acceleration = Speed Error * 8
    NOP  ;Change to ASLD if you want Speed Error * 16

* To convert Accn to Demand current we must see
*  what direction we are going.

TIM  #20H,FLAGS ;DIR'N=OUT ?
    BNE  MAIN38 ;Y- branch
    COMA       ;N- going Inwards, so ...
    COMB       ;... Demand Current = - Acceleration
    ADDD #1
MAIN38 TSTA ;Demand current +ve ?
    XGDX
    BPL  MAIN40  ;Y- branch
    CPX  #-112   ;Current < -840 mA ?
    XGDX
    BHI  MAIN46  ;N- branch
    LDAB #-112   ;Y- clamp -ve value @ -840 mA
    BRA  MAIN46

MAIN40  CPX #112 ;Current > +840 mA ?
    XGDX
    BCS  MAIN46 ;N- skip
    LDAB #112   ;Clamp pos. value @ +840 mA
MAIN46  LDX CPOINT
    TBA
    TIM  #1,0,X ;Invert DAC0 ?
    BEQ MAIN47  ;N- skip
    NEGA
MAIN47 ADDA ZERO0
    TIM  #2,0,X ;Invert DAC1 ?
    BEQ  MAIN49 ;N- skip
    NEGB
```

```
MAIN49 ADDB ZERO1
   STD  DAC0   ;Load both DACs
   LDAA SPEED  ;Vel < 7 ips ?
   BNE  MAIN50 ;Y-
   JMP  FAST
MAIN50 JMP  SLOW ;loop until 3 tracks to go
   PAGE
* FINAL APPROACH. We are within 5 tracks of target
* (within 8 for short seeks)
* We calculate Distance-to-go with a resolution
* of 4 uin/bit. First we work out our position within
* the present LINE using SIN/COS values.  Then
* we add the # of whole tracks (DESTN - 2*LINE).
* The resultant Distance-to-go is a number in the
* range 0 to 1280 at 4uin/bit. We then divide by 16
* to get Distance-to-go in the range 0 to 80
* at 64uin/bit. We use this latter value
* as an entry into a table of Demanded Speeds
* (see LOWVEL & SHORT tables).  N.B.  MUST ENTER
* FINAL WITH D = TRACKS-TO-GO.

JTABL1 FDB FLOUT0,FLOUT1,FLOUT2,FLOUT3

FINAL  JSR  GETCOM ;Update commutation pointer
                   ; to target trk
   LDX  CPOINT
   LDAB 0,X    ;Get current direction flags
   ASLB
   LDX  #JTABL1
   ABX
   LDX  0,X    ;Get address of required output routine
   STX  OUTPUT ;& save it
   LDAA DESTN+1 ; * 256 (LS byte into MS byte)
   CLRB
   ADDD TOFF   ;Aim for the offset position
   STD  DESTN  ;Increase Destination resolution to 4uin/bit
   OIM  #0CH,FLAGS ;Set SIN & COS flags to force DUMPIT
                   ; 1st time thru
```

```
*    ====  FINAL APPROACH LOOP   ====
* LOOP TIME = 118us   (so scale = 4/118 = 0.0339 ips/bit)
* Measured values confirm 118 (122 us if
*   LINE count changes)

FINALP  LDX #SHAPE
    LDAB PORT6
    ANDB #SINE
    STAB PORT6
    INCB
    LDAA ADC     ;Read SIN
    STAB PORT6
    STAA TEMP1   ;Save SIN awhile
    LDAB ADC     ;Read COS
    LDAA CSCALE
    MUL
    SUBA COSREF
    STAA TEMP2   ;Save normalised COS
    LDAB TEMP1
    LDAA SSCALE
    MUL
    LDAB TEMP2   ;B = normalised COS
    SUBA SINREF  ;A = normalised SIN. Is it -ve ?
    BMI  QUAD34  ;Y- branch
* Unroll SINE/COSINE values to position (4uin/bit)
    TSTB   ;COS -ve ?
    BMI  QUAD2 ;Y- branch
QUAD1   CBA  ;SIN < COS ?
    BCC  QUAD1C ;N- branch & servo on COS
    TAB         ;Y- use SIN
    ABX
    LDAB 0,X  ;D = x
    LDAA FLAGS
    ORAA #5   ;Set flags for Q1 & SIN
    BRA  QUAD1X
```

```
QUAD1C NOP
 ABX
 LDAB 0,X
 NEGB
 ADDB #128 ;D = 128 - x

LDAA FLAGS
 ORAA #9   ;Set COS & Q1 flags
QUAD1X BITA #2 ;Coming from Q4 ?
 BEQ  QUAD1Z ;N- branch
 ANDA #0FDH ;Y- clear Quadrant 4 flag
 LDX  LINE
 INX
 STX  LINE
 STAA FLAGS
 CLRA
 JMP  FINAL2

QUAD1Z STAA FLAGS
 CLRA
 BRA  PAD12

QUAD2  AIM   #0FCH,FLAGS ;Clear Q1 & Q4 flags
 NEGB
 CBA    ;SIN < COS ?
 BCS  SIN2 ;Y- branch
 OIM #8,FLAGS ;N-SET COSINE FLAG
 ABX
 LDAB 0,X
 ADDB #128
 CLRA        ;D = 128 + x
 BRA  PAD14

SIN2  OIM #4,FLAGS ;Set SINE flag
 TAB
 ABX
 LDAB 0,X
 CLRA
```

```
  COMB
  ADDD #1     ;D = 256 - x
  BRA  PAD11
QUAD34 TSTB  ;COS +ve ?
  BPL  QUAD4  ;Y- branch
QUAD3  AIM #0FCH,FLAGS ;Clear Quadrant flags
  NEGA
  NEGB
  CBA    ;SIN < COS ?
  BCS  SIN3 ;Y- branch
  OIM  #8,FLAGS ;N- Set COSINE flag
  ABX
  LDD  #384   ;Note: 384 = 256 + 128
  SUBB 0,X    ;D = 384 - x
  BRA  PAD13

SIN3  OIM #4,FLAGS ;SET SINE FLAG
  TAB
  ABX
  LDAB 0,X
  LDAA #1     ;D = 256 + x
  BRA  PAD13

QUAD4  NEGA
  CBA         ;SIN < COS ?
  BCS  QUAD4S ;Y- branch
  ABX
  LDAB 0,X
  ADDB #128 ;D = 384 + x
  LDAA FLAGS
  ORAA #0AH ;Set COS & Q4 flags
  BRA  QUAD4X QUAD4S TAB
  ABX
  LDAB 0,X
  NEGB        ;D = 512 - x
```

```
    LDAA FLAGS
    ORAA #6     ;Set flags for Q4 & SIN
QUAD4X BITA #1  ;Coming from Q1 ?
    BEQ  QUAD4Z ;N- branch
    ANDA #0FEH  ;Y- clear Q1 flag
    LDX  LINE
    DEX
    STX  LINE
    STAA FLAGS
    LDAA #1
    BRA  FINAL2

QUAD4Z STAA FLAGS
    LDAA #1
    BRA  PAD11

PAD14 NOP       ;The purpose of these NOPs is to ensure
                ; that all program paths
PAD13 NOP       ;take the same time to reach
                ; FINAL2 (constant sample rate)
PAD12 NOP
PAD11 BRA PAD8
PAD8  BRA PAD5
PAD5  BRA PAD2
PAD2  NOP
      NOP FINAL2  ADDA LINE+1
    ADDA LINE+1  ;Add 2 * 256 * LINE
    SUBD DESTN
    STD  ZM0    ;Distance from Destination
    BPL  FINAL3
    COMA        ;MAKE DISPLACEMENT POSITIVE
    COMB
    ADDD #1
FINAL3  LSRD    ;Divide Position Error by 16.
                ; Res'n is now 64uin/bit
```

```
       LSRD
       LSRD
       LSRD
       XGDX
       CPX  #4      ;Within 256 uin of target ?
       BCS  SKEXIT  ;Y- exit from Seek routine
       LDAA FLAGS
       COMA
       ANDA #0CH    ;Both SIN & COSINE flags set ?
       BEQ  DUMPIT  ;Y- ditch
       CPX  #96     ;<6 tracks to go ?
       BLT  FINAL4  ;Y- branch
       LDAB #VMAX1  ;N- use plateau speed
       BRA  FINAL5

FINAL4 XGDX
       LDX  TEMP5   ;Get pointer to whichever table
       ABX
       LDAB 0,X     ;Get Demanded Speed
FINAL5 CLRA
       TIM  #20H,FLAGS ;DIR'N = OUT ?
       BNE  FINAL6  ;Y- branch
       NEGB
       COMA
FINAL6 ADDD ZM0    ;Before this add, D
                    ; contains -(Demanded Velocity)
       SUBD ZM1    ;D = (Today's position - Yesterday's
                    ; Position) - Demanded Velocity
* D now contains Velocity Error
       BPL  FINAL8 ;Limit vel err to +/-28 to
                    ; prevent 8-bit overflow
       CMPB #-28   ;CLAMP NEGATIVE VALUE
       BHI  FINAL9
       LDAB #-28
       BRA  FINAL9
FINAL8 CMPB #28    ;CLAMP POSITIVE VALUE
       BCS  FINAL9
       LDAB #28
```

```
FINAL9 ASLB
  ASLB           ;Demand current = 4 * Velocity Error
  TBA
  LDX  OUTPUT
  JMP  0,X       ;Jump to the correct output routine
FLOUT1 NEGA
FLOUT0 BRA  FINL11
FLOUT3 NEGA
FLOUT2 NEGB
FINL11 ADDA ZERO0
  ADDB ZERO1
  STD  DAC0
FINL12 LDX  ZM0
  STX  ZM1       ;Save position error
  JMP  FINALP DUMPIT AIM #0F3H,FLAGS ;Clear SIN & COS flags
  JSR  POLLIT ;To preserve the sampling rate, the time...
  LDAB #4     ;...from DUMPIT to FINL12 must be 65 cycles.
DUMP1  DECB
  BNE  DUMP1
  BRA  FINL12
  PAGE
* =======   EXIT FROM THE SEEK ROUTINE   ==========

SKEXIT LDD ZM0
  STD  ZM1    ;Save previous position
  JSR  PREDET ;Prepare DETENT output routine
  JSR  PULLIN ;DETENT for 3 ms & update Q1,Q4 & LINE count
  LDD  ZERO0  ;Get ZERO0 AND ZERO1
  STD  DAC0   ;Turn off BOTH DACs LDX  TOFF
  BPL  SKEX3
  CPX  #-25   ;TOFF < -100 uin ?
  BGT  SKEX5  ;N-
  CPX  #-103  ;TOFF < -412 uin ?
  BLT  SKEX5  ;Y-
```

```
       JSR   WIDTH
       TIM   #1,TRKNUM+1 ;Even track ?
       BEQ   SKEX2 ;Y-
       STAA  Q2W
       BRA   SKEX5
SKEX2  STAA  Q4W
       BRA   SKEX5

SKEX3  CPX   #25  ;TOFF > 100 uin ?
       BLT   SKEX5 ;N-
       CPX   #103   ;TOFF > 412 uin ?
       BGT   SKEX5 ;Y-
       JSR   WIDTH
       TIM   #1,TRKNUM+1 ;Even track ?
       BEQ   SKEX4 .;Y-
       STAA  Q3W
       BRA   SKEX5
SKEX4  STAA  Q1W SKEX5  TIM #1,TRKNUM+1 ;Even ?
       BEQ   SKEX6 ;Y-
       CLRA
       LDAB  Q3W
       STD   HTRKI
       LDAB  Q2W
       STD   HTRKO
       BRA   SKEX7
SKEX6  CLRA
       LDAB  Q1W
       STD   HTRKI
       LDAB  Q4W
       STD   HTRKO SKEX7 LDD HTRKI
      ASRA
      RORB
      ADDD #3 ;12 uin hysteresis
      STD  QTRKI
```

```
        LDD   HTRKO
        ASRA
        RORB
        ADDD  #3
        COMA
        COMB
        ADDD  #1
        STD   QTRKO

TST   MUXMSK  ;Servoing on SIN ?
        BEQ   SKEX10  ;Y- use present DOFF
        LDD   TOFF
        BPL   SKEX8
        ADDD  HTRKO   ;DOFF = TOFF + HTRKO
        BRA   SKEX9

SKEX8   SUBD  HTRKI   ;DOFF = TOFF - HTRKI
SKEX9   STD   DOFF

SKEX10  LDX   #8080H
        STX   INTGRL  ;Re-initialise the Integral
        BRA   SIT30   ;Drop into DETENT for 30 more loops, 2ms
        PAGE
SIT250  LDD   #250    ;Sit in DETENT for 250 loops, 17.5ms
        BRA   SIT
SIT75   LDD   #75     ;75 loops, 5.25ms
        BRA   SIT
SIT45   LDD   #45     ;45 loops, 3ms
        BRA   SIT
SIT30   LDD   #30     ;30 loops, 2ms
        BRA   SIT
SIT12   LDD   #12     ;12 loops, 840us SIT     STD   TEMP1   ;Sit in DETENT for (D) loops

* MAIN DETENT POSITIONING LOOP - Loop time = 71us
* Damping = 2.1 A/ips, Integral gain = 200mA/uin.sec,
*  Stiffness = 1.875 A/thou
```

```
DETENT  LDX  #SHAPE
        LDAB ADC      ;Read the transducer
        LDAA DSCALE   ;Scale it to +/- 64
        MUL
        SUBA DREF     ;Is the signal -ve ?
        BMI  DETEN2   ;Y- branch
        TAB           ;Convert ampl. to pos'n(0-127) 4uin/bit
        ABX
        LDAB 0,X
        LDAA SLOPE    ;Use +ve slope ?
        BPL  DETEN3   ;Y- branch
        NEGB
        BRA  DETEN3

DETEN2  NEGA          ;Convert ampl. to pos'n (0-127) 4uin/bit
        TAB
        ABX
        LDAB 0,X
        LDAA SLOPE    ;Use -ve slope ?
        BMI  DETEN3   ;Y- branch
        NEGB DETEN3  CLRA
        TSTB          ;Is x +ve ?
        BPL  DETEN4   ;Y- skip
        COMA          ;N- do sign extension
DETEN4  SUBD DOFF     ;Include the Thermal correction
        STD  ZM0      ;Save Today's Position Error
        ADDD ZM1
        ADDD INTGRL
        STD  INTGRL   ;Update the Integral LDD  ZM0
        SUBD ZM1      ;Velocity = Today's position - Yesterday's
                      ; position
        ASLD
        ASLD
        ASLD
```

```
ASLD      ;Velocity * 16
ADDD ZM0
ADDB INTGRL ;D = Pos'n + 16 * Velocity + Integral / 256
ADCA #0     ;Add in the carry
SUBD #0080H ;& adjust for Integral's mid-range zero
NOP         ;Change to ASRA (47H)
NOP         ;Change to RORB (56H) for half gain
XGDX
BPL  DETEN5 ;Branch if +ve demand CPX  #-112. ;Too much to ask ?
XGDX
BGE  DETEN6 ;N-
LDAB #-112  ;Y- limit it to 840 mA
BRA  DETEN6
DETEN5  CPX #112 ;Too much ?
 XGDX
 BLE  DETEN6 ;N-
 LDAB #112   ;Y- apply the legal limit DETEN6  TBA  ;Get demand in both A & B registers

* OUTPUT A NEW VALUE TO THE DAC'S

LDX OUTPUT  ;Get pointer to output routine
 JMP 0,X     ;...& jump to it.

DTOUT1 NEGA
 BRA   DTOUT0
DTOUT3 NEGA
DTOUT2 NEGB
DTOUT0 ADDA ZERO0
 ADDB ZERO1
 STD  DAC0   ;Load BOTH DACs LDX  ZM0
 STX  ZM1    ;Save Position error for next time
 LDX  TEMP1  ;Loop count
```

```
    DEX
    STX   TEMP1
    BNE   DETENT
    RTS

* PREDET : Prepare a pointer to the DETENT
*          output routine.

JTABL2 FDB  DTOUT0,DTOUT1,DTOUT2,DTOUT3

PREDET LDX  CPOINT
   LDAB 0,X
   ASLB
   LDX  #JTABL2
   ABX
   LDX  0,X    ;Get the address of the correct
               ; output routine
   STX  OUTPUT ;& save it for use by DETENT
   RTS
   PAGE
* CHANGE : Change over to the other offset in
*   response to a head switch. This routine services
*   the Head Change request & resets the Head
*   Change cct. If a move is needed, SETUP is called
*   which uses QUICKY for Interrupts.

CHANGE LDAA STAT1  ;WEDGE must be false
                  ; when STAT1 is fetched
   BITA #10H  ;Selected ?
   BNE  CHANG1 ;Y-
   BITA #20H  ;Head Change Flag ?
   BNE  CHANG2 ;Y-
   BRA  CHANG5 ;N- no change CHANG1 ANDA #1
   CMPA ULFLAG ;HSbit0 = ULFLAG ?
   BNE  CHANG2 ;N-
   BRA  CHANG5 ;Y- no change
```

```
CHANG2 TST  ULFLAG ;Currently on upper ?
  BEQ  CHANG3 ;Y-
  CLR  ULFLAG ;Switch to upper
  AIM  #0FEH,CR0I
  LDX  TOFF
  STX  TOFFL
  LDX  TOFFU
  BRA  CHANG4
CHANG3 INC ULFLAG ;Switch to lower
  OIM  #1,CR0I
  LDX  TOFF
  STX  TOFFU
  LDX  TOFFL
CHANG4 LDAB CR0I
  STAB CR0 ;Select the new TC surface
  STX  TOFF
  JSR  SETUP ;Set up for DETENT & servo for 3 ms
  LDAA STAT1 ;WEDGE must be false here
  BITA #10H  ;Selected ?
  BNE  CHANG1 ;Y- Branch back & ensure we're
             ; still on right surface
CHANG5 LDAB CR1I
  ANDB #0F7H
  STAB CR1 ;Reset SKI cct
  ORAB #08H  ;Gives SK COMPL IFF no
             ; more STEPs have arrived
  STAB CR1
  STAB CR1I
  RTS
* PULLIN : DETENT for 3 ms then update Q1,
*  Q4 & LINE count
PULLIN CLR FLAG ;Clear spindle speed error count
  LDD  #8080H
  STD  INTGRL ;Mid-range
  LDAB PORT6
  ANDB #SINE
  ORAB MUXMSK
  STAB PORT6  ;Set up MUX for SIN or COS
```

```
        JSR   SIT45
        LDX   #1
        JMP   CNTTRK

* POLLIT : Poll for Interrupt
*          Request. For use during seeks.

POLLIT  TIM  #2,PORT5  ;IRQ2 ?
        BEQ  POLL2     ;Y-
        LDAB #4        ;N- wait 21 c
POLL1   DECB
        BNE  POLL1
        BRA  POLL3

POLL2   LDD  CR0I      ;Get CR0I in A, CR1I in B
        ANDA #0F7H     ;INDEX
        ANDB #0BFH     ;ACKN
        STD  CR0       ;A -> CR0, B -> CR1
        ORAA #8        ;/INDEX
        ORAB #40H      ;/ACKN
        STD  CR0
        NOP
POLL3   RTS

* DOQUAD : Measure & save the widths of all 4 quadrants.
* On entry TOFF = DOFF = 0 & we're on an even track.

DOQUAD  JSR  BALOUT    ;Slide OUT 1/4 trk to the
                      ; SIN/COS balance point
        JSR  WIDTH
        STAA Q4W       ;Save width of quadrant 4
        JSR  SLCL
        JSR  BALIN     ;Slide IN 1/4 track
        JSR  WIDTH
        STAA Q1W
        JSR  SLCL
        JSR  STEPIN    ;Seek IN 1 trk
        JSR  BALOUT
```

```
      JSR   WIDTH
      STAA  Q2W
      JSR   SLCL
      JSR   BALIN
      JSR   WIDTH
      STAA  Q3W
      JSR   SLCL
      CLRA
      LDAB  Q1W
      SUBB  Q2W
      SBCA  #0    ;16-bit subtract
      ADDB  Q3W
      ADCA  #0
      SUBB  Q4W
      SBCA  #0    ;Now D = Q1W - Q2W + Q3W - Q4W = PHASE ERROR
      XGDX
      BMI   DOQUA1 ;Branch if Phase error -ve
      CPX   #60
      BGT   FAULT6
      RTS

DOQUA1 CPX   #-60
      BLT   FAULT6
      RTS

FAULT6 LDAA  #6
      JMP   FLASH  ;Phase error > 60 uin (10.5 degs)

* BALIN/BALOUT ;Slide IN/OUT until SIN just exceeds COS.
* Enter with DOFF = TOFF = 0.
   BALIN LDAB  #4
      BRA   BAL1

BALOUT LDAB #-4
   BAL1  PSHB

BAL2  CLRA
```

```
    PULB
    PSHB
    TSTB    ;+ve increment ?
    BPL   BAL3 ;Y-
    COMA    ;N- Sign extend
BAL3   ADDD TOFF
    STD  TOFF
    STD  DOFF
    JSR  SIT12
    JSR  ENCODE ;Get normalised SIN in A, COS in B
    TSTA    ;Make them both +ve
    BPL   BAL4
    NEGA
BAL4   TSTB
    BPL BAL5
    NEGB
BAL5   SBA  ;Now A = !SIN! - !COS!
    BMI BAL2 ;Loop until !SIN! > !COS!
    PULB ;Clean up the stack
    JMP  SIT12

* WIDTH : Measure the Half-Track width of the
*  current quadrant.

WIDTH  JSR ENCODE
    TAB    ;Get SIN in B.  Is it +ve ?
    BPL  WIDTH1 ;Y-
    NEGB
WIDTH1 LDX #SHAPE
    ABX
    LDAA 0,X  ;Get Xsin
    LDAB TEMP2 ;Get COS.  Is it +ve ?
    BPL  WIDTH2
    NEGB
WIDTH2 LDX #SHAPE
    ABX
    LDAB 0,X ;Get Xcos
    ABA    ;A = Xsin + Xcos = WIDTH
    RTS
```

* CALIB : A subroutine to calibrate the transducer
* in 4 zones.  On entry, we must be servoing on
* centreline with TOFF = 0.

```
CALIB   LDX  #76    ;Middle of zone 1
  JSR   TRANS ;Calibrate Zone 1
  LDX   #228
  JSR   TRANS ;Zone 2
  LDX   #382
  JSR   TRANS ;Zone 3
  LDX   #534
  JSR   TRANS ;Zone 4
  RTS
```

* TRANS : Measure transducer values @ given track.
* On entry, TOFF must be zero, Interrupts disabled,
* & X must contain an even track address.

```
TRANS   STX TRKNUM
  JSR  SEEK
  JSR  COS16   ;Get average of 16 COS readings
  STAB TEMP11  ;Save COSMAX
  JSR  STEPIN  ;IN 1 track
  JSR  COS16
  STAB TEMP10  ;Save COSMIN
  LDD  #-128
  JSR  SLIDE   ;Slide OUT half a track
  JSR  SIN16   ;Get average of 16 SIN readings
  STAB TEMP9   ;Save SINMAX
  JSR  SLCL
  LDD  #128
  JSR  SLIDE   ;Slide IN half a track
  JSR  SIN16
  STAB TEMP8   ;Save SINMIN
  JSR  SLCL
  JSR  DERIVE  ;Derive amplitudes & means
  JSR  SIT75   ;Refresh the DETENT control
```

* Now stash transducer results into the right table
* On entry, TEMP4,5,6 & 7  = SSCALE,SINREF,CSCALE,COSREF

```
  LDX   TRKNUM
  CPX   #458
  BGT   TRANS4
  CPX   #305
  BGT   TRANS3
  CPX   #152
  BGT   TRANS2

LDX   #ZONE1
  BRA   TRANS5
TRANS2 LDX #ZONE2
  BRA   TRANS5
TRANS3 LDX #ZONE3
  BRA   TRANS5
TRANS4 LDX #ZONE4

TRANS5 LDAB TEMP4
  STAB  0,X   ;Save SSCALE
  LDAB  TEMP5
  STAB  1,X   ;Save SINREF
  LDAB  TEMP6
  STAB  2,X   ;Save CSCALE
  LDAB  TEMP7
  STAB  3,X   ;Save COSREF
  RTS
```

* SIN16, COS16 : Measure the average of 16 readings
*   whilst in DETENT
* TEMP4 = Mux mask, TEMP5 = loop count,
*   TEMP6,7 = Accumulator

```
SIN16  CLRA
  BRA   SINCO1
COS16  LDAA #1
```

```
SINCO1 STAA TEMP4  ;OR mask for mux
  LDAA #16
  STAA TEMP5
  CLRA
  CLRB
  STD  TEMP6

SINCO2 JSR SIT12
  LDAB PORT6
  PSHB       ;Save state of PORT6
  ANDB #0F8H
  ORAB TEMP4
  STAB PORT6  ;Select SIN or COS
  CLRA
  LDAB ADC    ;Read the transducer
  ADDD TEMP6
  STD  TEMP6  ;Update running total
  PULB
  STAB PORT6  ;Restore port6
  DEC  TEMP5  ;16 readings taken ?
  BNE  SINCO2 ;N-
  LDD  TEMP6

DBY16  ASRA ;Return with D = Total / 16
  RORB
DBY8   ASRA
  RORB
  ASRA
  RORB
  ASRA
  RORB
  RTS

* DERIVE  : A subroutine which derives mean levels &
* scale factors. We don't have a signed multiply so
* the transducer readings have to be normalised.
* We can then subtract after the multiply.
* i.e instead of (V - MEAN) * SCALE  we use
```

```
* (V * SCALE) - (MEAN * SCALE). The transducer
* amplitudes MUST BE > 2.0 Vpp else Fault Code 3
* On entry,  TEMP8,9,10,11 = SINMIN,SINMAX,
*   COSMIN,COSMAX
* On return, TEMP4,5,6,7  = SSCALE,SINREF,
*   CSCALE,COSREF    +new RAWSIN,RAWCOS DERIVE LDAA TEMP9  ;SINMAX
 LDAB TEMP8  ;SINMIN
 SBA
 LSRA        ;SINAMP = (SINMAX - SINMIN)/2
 ADCA #0     ;Round off
 TAB
 ADDA TEMP8
 STAA RAWSIN
 JSR  CONVRT ;Returns with A = 256 * (50/SINAMP)
 BEQ  FAULT3 ;Abort if volts too low
 STAA TEMP4  ;Save SSCALE
 LDAB RAWSIN
 MUL
 ADCA #0     ;Round off
 STAA TEMP5  ;Save SINREF LDAA TEMP11 ;COSMAX
 LDAB TEMP10 ;COSMIN
 SBA
 LSRA
 ADCA #0     ;Round off
 TAB         ;B = COSAMP = (COSMAX - COSMIN)/2
 ADDA TEMP10
 STAA RAWCOS
 JSR  CONVRT
 BEQ  FAULT3
 STAA TEMP6 ;Save CSCALE = 256 * (50/COSAMP)
 LDAB RAWCOS
 MUL
 ADCA #0  .  ;Round off
 STAA TEMP7 ;Save COSREF
 RTS
```

```
FAULT3  LDAA #3  ;SIN/COS amplitude < 2.0 Vpp
   JMP  FLASH
* SLIDE : Slide in or out to an offset position.
* On entry, we are on track centreline with DOFF =
*  TOFF = 0.  The required offset is in D.
* N.B. This routine must work for slides up
* to 3/4 track - see FIDUC6.
   SLIDE  STD TRKOFF
     BPL  SLIN  ;Slide IN if TRKOFF +ve
     JMP  SLOUT ;else slide OUT
   SLIN   LDD DOFF
     ADDD #4
     STD  DOFF
     JSR  SIT12
     LDX  DOFF
     CPX  TRKOFF ;All done ?
     BGT  SLIDE1 ;Y-
     CPX  QTRKI  ;Sin to Cos switch?
     BLE  SLIN   ;N-
     STX  TOFF
     JSR  SETUP  ;Switch to Cos
   SLIN1 LDD  TOFF
     ADDD #4
     STD  TOFF
     XGDX
     CPX  TRKOFF
     BGT  SLIN2
     LDD  DOFF
     ADDD #4
     STD  DOFF
     JSR  SIT12
     BRA  SLIN1
   SLIN2 LDD  TRKOFF
     STD  TOFF
     SUBD HTRKI
     BRA  SLIDE2
   SLOUT LDD DOFF
     SUBD #4
     STD  DOFF
```

```
     JSR   SIT12
     LDX   DOFF
     CPX   TRKOFF
     BLT   SLIDE1
     CPX   QTRKO  ;Sin to Cos switch ?
     BGE   SLOUT  ;N-
     STX   TOFF
     JSR   SETUP  ;Switch to Cos
SLOUT1 LDD  TOFF
     SUBD  #4
     STD   TOFF
     XGDX
     CPX   TRKOFF
     BLT   SLOUT2
     LDD   DOFF
     SUBD  #4
     STD   DOFF
     JSR   SIT12
     BRA   SLOUT1

SLOUT2 LDD TRKOFF
     STD   TOFF
     ADDD  HTRKO
     BRA   SLIDE2

SLIDE1 LDD  TRKOFF
     STD   TOFF
SLIDE2 STD  DOFF
     JMP   SIT12

* SLCL : Slide to the centreline
*        from any offset position.

SLCL LDX  TOFF
     BPL  SLCL2
SLCL1 LDD  DOFF
     ADDD #4
```

```
        STD   DOFF
        JSR   SIT12
        LDD   TOFF
        ADDD  #4
        STD   TOFF
        XGDX
        CPX   QTRK0 ;Cos to Sin switch ?
        BLT   SLCL1 ;N-
        BRA   SLCL3

SLCL2   LDD   DOFF
        SUBD  #4
        STD   DOFF
        JSR   SIT12
        LDD   TOFF
        SUBD  #4
        STD   TOFF
        XGDX
        CPX   QTRK1 ;Cos to Sin switch ?
        BGT   SLCL2 ;N-
SLCL3   LDX   #0
        STX   TOFF  ;Y- Zero TOFF, SETUP & DETENT for 3 ms

* SETUP - Sets up the parameters for
*          DETENTing on a track

SETUP   LDX VECTOR ;Save Old Vector
        PSHX
        LDX   #QUICKY
        STX   VECTOR ;If a service is required during
                    ;  SETUP, use QUICKY.
        CLRA
        CLRB
        STD   ZM1   ;Initialise position error
        STAA  SLOPE ;Assume +ve slope to start with
        INCA
        STAA  MUXMSK
        LDD   COSINS
```

```
      STD   DETENS  ;Assume we're working on the COS transducer
      LDX   TOFF    ;+ve offset ?
      BPL   SETUP3  ;Y- branch
      CPX   QTRKO   ;TOFF > 1/4 trk out ?
      BGE   SETUP2  ;N- branch
      XGDX
      ADDD  HTRKO
      STD   DOFF    ;DOFF = TOFF + 1/2 trk
      BRA   SETUP4

SETUP2 STX DOFF    ;DOFF = TOFF
      LDAB  MUXMSK
      ANDB  #SINE
      STAB  MUXMSK  ;Set up for SIN
      LDD   SINES
      STD   DETENS
      BRA   SETUP4

SETUP3 CPX QTRKI   ;TOFF > 1/4 trk in ?
      BLE   SETUP2  ;N- branch
      COM   SLOPE   ;Y- use -ve slope of cosine
      XGDX
      SUBD  HTRKI
      STD   DOFF    ;DOFF = TOFF - 1/2 trk SETUP4 TIM #1,TRKNUM+1 ;Even track ?
      BEQ   SETUP5  ;Y- skip
      COM   SLOPE   ;Use opposite slope for odd tracks
SETUP5 JSR PULLIN
      PULX
      STX   VECTOR  ;Restore Old Vector
      RTS

* FRESH : Pick fresh values from zone table & place in
* SSCALE,SINREF,CSCALE,COSREF,DSCALE,DREF

FRESH  LDX TRKNUM
```

```
        CPX  #306
        BGT  FRESH2
        CPX  #153
        BGT  FRESH1
        LDX  #ZONE1
        BRA  FRESH4
FRESH1  LDX  #ZONE2
        BRA  FRESH4
FRESH2  CPX  #459
        BGT  FRESH3
        LDX  #ZONE3
        BRA  FRESH4
FRESH3  LDX  #ZONE4

FRESH4  LDAB 0,X
        STAB SSCALE
        LDAB 1,X
        STAB SINREF
        LDAB 2,X
        STAB CSCALE
        LDAB 3,X
        STAB COSREF

TST  MUXMSK
        BEQ  FRESH5
        LDD  COSINS
        BRA  FRESH6
FRESH5  LDD  SINES
FRESH6  STD  DETENS
        RTS

* ENCODE
*A subroutine to measure and normalize SIN/COS
* to real SIN/COS
*Takes 43.5 usec including JSR/RTS
ENCODE  LDAB PORT6 (3) Get state of port 6
        PSHB       (4) Save it
        ANDB #SINE  (2) Mask to see the SINE sensor first
```

```
    STAB PORT6    (3)
    INCB          (1)
    LDAA #0       (2) Wait 2 more cycles for MUX to settle
    LDAA ADC      (7) Read the SIN
    STAB PORT6    (3)
    STAA TEMP1    (3) Store SIN awhile
    LDAB ADC      (7) Read the COS
    LDAA CSCALE   (3)
    MUL           (7)
    SUBA COSREF   (3)
    STAA TEMP2    (3) Save normalised COS
    LDAB TEMP1    (3)
    LDAA SSCALE   (3)
    MUL           (7)
    SUBA SINREF   (3) Return with normalised SIN in A ...
    PULB          (3)
    STAB PORT6    (3)
    LDAB TEMP2    (3) & COS in B
    RTS           (5+6)

* COARSE : Crude calibration of the position transducer
* carried out only @ power-on.  It gives adequate
* initial values until the proper CALIBration
* takes place later.  First we find the Reference Null.

COARSE   LDX  #COMTBL+7
  STX    CPOINT
  JSR    COMIN    ;Rotate to arbitrary initial position
HIT1     CLRA
  CLRB
  STD    LINE
  JSR    COMOUT
  LDD    LINE     ;LINE count +ve ?
  BPL    HIT2     ;Y- branch
  COMA
  COMB
  ADDD   #1       ;Make LINE count +ve
HIT2     XGDX
```

```
        CPX   #120   ;Did it move <120 lines ?
        BMI   HIT1   ;Y- COMOUT again
        CPX   #180   ;Did it move > 180 lines ?
        BPL   HIT1   ;Y- COMOUT again
        CLRA
        CLRB
        STD   LINE
        JSR   COMIN  ;Now go INWARD 90 degrees
        LDX   LINE
        BPL   HIT3

FAULT9  LDAA  #9     ;Antiphase Position Motor !!
        JMP   FLASH

HIT3    CPX   #80    ;Did it move <80 lines ?
        BMI   HIT1   ;Y- loop back
        CPX   #180   ;Did it move > 180 lines ?
        BPL   HIT1   ;Y- loop back HIT4    LDD   #100
        STD   LINE
        JSR   COMOUT ;Go OUTWARD 90 degrees
        LDD   LINE   ;Did it move outward >100 lines ?
        BMI   HIT4   ;Y- COMOUT again
        LDD   #0
        STD   LINE
HIT5    JSR COMIN    ;Rotate to next null INwards
        LDX   LINE
        CPX   #10    ;Did it move more than 10 lines ?
        BLT   HIT5   ;N-
        LDAB  #64    ;Y- We're @ the ref null, so...
        JSR   OUTDAC ;...increase current to 480 mA
        LDX   #2000
        JSR   CNTTRK ;& continue counting for 45 ms
        LDX   CPOINT
        STX   REFNUL ;Save value of CPOINT ...
        LDX   LINE
        STX   REFLIN ;...& LINE count @ ref null.
```

* Now measure min/max values of SIN & COS during
* a 90 degree rotation.

```
  CLRA            ;Initialise minima & maxima
  STAA TEMP9   ;SINMAX
  STAA TEMP11  ;COSMAX
  COMA
  STAA TEMP8   ;SINMIN
  STAA TEMP10  ;COSMIN FNDMM  JSR  COMIN2 ;Switch on motor current
  LDAB PORT6
  ANDB #SINE
  STAB PORT6   ;Set MUX for SINE
  LDX  #10000 ;Take 10,000 readings of SIN & COS
FNDMM1 LDAA ADC ;Read SIN    Loop Time = 30 us
  INC  PORT6   ;Set MUX for COSINE
  CMPA TEMP9   ;SIN>SINMAX ?
  BLS  FNDMM2  ;N- branch
  STAA TEMP9
FNDMM2  CMPA TEMP8 ;SIN<SINMIN ?
  BHI  FNDMM3  ;N- branch
  STAA TEMP8
FNDMM3 LDAB ADC ;Read COS
  DEC  PORT6   ;Put MUX back to SIN
  CMPB TEMP11  ;COS>COSMAX ?
  BLS  FNDMM4  ;N- branch
  STAB TEMP11
FNDMM4  CMPB TEMP10 ;COS<COSMIN ?
  BHI  FNDMM5  ;N- branch
  STAB TEMP10
FNDMM5  DEX  ;All samples taken ?
  BNE  FNDMM1  ;N- loop again JSR  DERIVE ;Compute the means & scale factors & ...
```

* COPY : Copy TEMP4,5,6,7 into SSCALE,
* SINREF,CSCALE,COSREF & also into

* all 4 zone tables.

```
COPY    LDAB    TEMP4
        STAB    SSCALE
        STAB    ZONE1
        STAB    ZONE2
        STAB    ZONE3
        STAB    ZONE4
        LDAB    TEMP5
        STAB    SINREF
        STAB    ZONE1+1
        STAB    ZONE2+1
        STAB    ZONE3+1
        STAB    ZONE4+1
        LDAB    TEMP6
        STAB    CSCALE
        STAB    ZONE1+2
        STAB    ZONE2+2
        STAB    ZONE3+2
        STAB    ZONE4+2
        LDAB    TEMP7
        STAB    COSREF
        STAB    ZONE1+3
        STAB    ZONE2+3
        STAB    ZONE3+3
        STAB    ZONE4+3
        RTS
```

* CALDAC : Calibrate the DAC offset.
*         Enter with D = Cyl # where COMCNT = 0

```
CALDAC  STD     TRKNUM
        JSR     SEEK    ;Seek to track where COMCNT = 0
        JSR     SIT250  ;Let INTGRL stabilise
        LDX     CPOINT
        LDAB    0,X     ;Fetch comm'n code
        LDAA    INTGRL  ;Get INTGRL / 256
        BITB    #1      ;Code = 0 or 2 ?
```

```
       BEQ   CALD1  ;Y-
       NEGA
CALD1  DECB
       CMPB  #1    ;Was the code 1 or 2 ?
       BLS   CALD2  ;Y-
       STAA  ZERO1
       RTS

CALD2  STAA  ZERO0
       RTS

* COMIN2 merely switches coil currents.
*  It doesn't update LINE counter.

COMIN2 LDX  CPOINT   ;ADJUST COMMUTATION POINTER
       INX
       CPX  #COMTBL+9 ;Too near the top ?
       BHI  FAULT7   ;Y- abort
       STX  CPOINT
       LDAB #32       ;Demand 240mA OUTDAC TBA
       LDX   CPOINT
       TIM   #1,0,X  ;Invert DAC0 ?
       BEQ   OUT1    ;N- skip
       NEGA
OUT1   TIM   #2,0,X  ;Invert DAC1 ?
       BEQ   OUT2    ;N- skip
       NEGB
OUT2   ADDA  ZERO0
       ADDB  ZERO1
       STD   DAC0 ;A --> DAC0, B --> DAC1
       RTS FAULT7 LDAA #7  ;Motor disconnected ? ADC problem ?
       JMP  FLASH

*  ====   THE COMMUTATION TABLE   ====
```

```
COMTBL FCB 1,0,2,3    ;Bit 0 : 0 = DAC0 +ve, 1 = DAC0 -ve.
  FCB 1,0,2,3    ;Bit 1 : 0 = DAC1 +ve, 1 = DAC1 -ve.
  FCB 1,0,2,3

*  ====  COMMUTATION SUB-ROUTINES  ====
* These sub-routines commutate the position motor
*  thru 90 degrees(300 tracks).
* The LINE counter is updated as the positioner moves.

COMOUT  LDX CPOINT    ;Adjust commutation Pointer
  DEX
  CPX  #COMTBL+1 ;Too near the bottom ?
  BLS  FAULT7  ;Y- abort
  BRA  COM1

COMIN   LDX CPOINT
  INX
  CPX  #COMTBL+9 ;Too near the top ?
  BHI  FAULT7  ;Y- abort
COM1  STX CPOINT
  LDAB #32      ;Demand 240mA
  JSR  OUTDAC   ;Out to the DAC
  LDX  #14000

* CNTTRK   Count the # of LINEs moved during a 90 degree
* rotation. May be more or less than 150 due to
* end-stop. N.B.ENTER WITH LOOP COUNT IN X
* Loop times : Q2 or Q3 = 29 cycles.
* Q1 or Q4 = 53 or 66 cycles.
* Average Loop Time = 44 cycles,
* 22.5us. (1 line/90us = 22 ips)

CNTTRK   LDAB PORT6
  PSHB   ;Save state of Port 6
  ANDB #SINE
  INCB
  STAB TEMP1 ;Save mask for reading COS
```

```
CNTTK1  LDAB TEMP1
        STAB PORT6
        LDAA ADC      ;Get COS
        SUBA RAWCOS   ;If it's +ve...
        BPL  Q1OR4    ;...we're in quadrants 1 or 4
        AIM  #0FCH,FLAGS ;Clear Q1 & Q4 flags
        DEX           ;All done ?
        BNE  CNTTK1   ;N- loop again
        BRA  CNEXIT Q1OR4   DECB          ;Make mask for SIN
        STAB PORT6
        LDAB ADC      ;Get SIN
        LDAA FLAGS
        SUBB RAWSIN   ;If it's -ve we're in quadrant 4
        BMI  QUD4
        ORAA #1       ;Set Q1 flag
        BITA #2       ;Coming from quadrant 4 ?
        BEQ  NOLINE   ;N- branch
        ANDA #0FDH    ;Clear Q4 flag
        STAA FLAGS
        LDD  LINE
        ADDD #1
        STD  LINE
        DEX
        BNE  CNTTK1
        BRA  CNEXIT QUD4    ORAA #2       ;Set Q4 flag
        BITA #1       ;Coming from quadrant 1 ?
        BEQ  NOLINE   ;N- branch
        ANDA #0FEH    ;Clear Q1 flag
        STAA FLAGS
        LDD  LINE
        SUBD #1
        STD  LINE
        DEX
        BNE  CNTTK1
```

```
     BRA  CNEXIT

NOLINE  STAA FLAGS
  DEX
  BNE  CNTTK1
CNEXIT PULB
  STAB PORT6 ;Restore Port 6
  RTS

* ROUTINE TO UPDATE MOTOR COMMUTATION
* Update the commutation track counter. If the counter
* passes through 0 or 300 (commutation points) the
* pointer is decremented or incremented respectively
* The commutation pointer points into the comm'n
* table which shows the current direction needed
* for each coil.
* Enter with D = # of tracks to adjust.

GETCOM TIM  #20H,FLAGS ;Inward movement ?
  BEQ  GETCO2  ;Y- branch

COMA
  COMB
  ADDD #1
  ADDD COMCNT ;Reduce commutation track count
  BPL  GETCO1 ;Branch if it's still positive
  ADDD #300
  LDX  CPOINT ;DECrement comm'n pointer
  DEX
  STX  CPOINT
GETCO1 STD  COMCNT
  RTS GETCO2  ADDD COMCNT ;Increase comm'n trk count
  XGDX
  CPX  #300    ;Are we at a commutation point ?
  XGDX
  BCS  GETCO3 ;N- exit
```

```
       SUBD #300     ;Y- adjust comm'n trk count
       LDX  CPOINT   ;INCrement comm'n pointer
       INX
       STX  CPOINT
GETCO3 STD  COMCNT   ;Save comm'n trk count
       RTS

* CONVRT : Produces the scale factor for normalising
* readings of SIN & COS.  Divides 50 by SINAMP or
* COSAMP in B.  Yields SCALE = 256 * 50 / SINAMP.
* If SINAMP or COSAMP =< 50, FRACTN = 00 and the
* routine returns with the 'Z' bit set in the cc
* register.  Uses 3 bytes of RAM, 2 @ DIVISR
* & 1 @ FRACTN.

CONVRT LDX  #8
       CLRA
       STAA FRACTN
       STD  DIVISR
       LDAB #50      ;The Dividend CONV1  ASLD
       ASL  FRACTN
       SUBD DIVISR
       BMI  CONV2
       INC  FRACTN
       BRA  CONV3

CONV2  ADDD DIVISR
CONV3  DEX
       BNE  CONV1
       ASLD
       SUBD DIVISR   ;2*Remainder > DIVISR
       BMI  CONV4    ;N- branch
       INC  FRACTN   ;Y- round it off
CONV4  LDAA FRACTN   ;This sets the 'Z' flag on low signals
       RTS
```

*DELAY sub-routine. 32ms delay for each count of ACC B

```
DELAY   LDX   #15635
DEL1    DEX
        BNE   DEL1
        DECB
        BNE   DELAY
        RTS
```

* VERIFY : Look for the Isolated A burst on the current
* track using ECUS. Resync if necessary.  Return with
* 'Z' bit set if no burst found.  If burst
* found, Seek In 1 trk & confirm sync using OCLS.
* If not confirmed, step  back out 1 track & return
* with Z bit set. If A.O.K., clear Z bit & return.

```
VERIFY  JSR   CHKBPE  ;Check if BURst Present using ECUS
        BNE   VERIF1  ;Branch if burst found
        LDX   #RESYNC
        STX   VECTOR
        JSR   WFORIT  ;Re-sync the spindle divide-by-2 in the G.A.
        JSR   CHKBPE  ;Burst present ?
        BEQ   VERIF2  ;Exit if burst not found on trk -2
VERIF1  JSR   STEPIN  ;IN to -1
        JSR   CHKBPO  ;CHecK Burst Present using OTS,
                      ; no resync allowed
        BNE   VERIF2  ;Branch if burst found on -1
        LDX   TRKNUM
        DEX
        STX   TRKNUM
        JSR   SEEK    ;Back OUT 1 track
        CLRA          ;To set the Z bit
VERIF2  RTS
```

* CHKBPO, CHKBPE : CHecK for Burst Present
* using OCLS or ECUS

```
CHKBPO  LDAA  CR0I
```

```
      ANDA #0F8H
      ORAA #0CLS
      BRA  CHKBP1

CHKBPE LDAA CR0I
      ANDA #0F8H
      ORAA #ECUS
CHKBP1 STAA CR0I
      STAA CR0   ;Nominate the right surface
      LDX  #BRSTCK
      STX  VECTOR

* A sub-routine which calls DETENT until
*  Interrupt has been serviced.
* Return with 'Z' bit set if burst not found.

WFORIT JSR  ENABLE ;Clear FLAG & enable Interrupts
WFOR1  JSR  SIT12
      LDAA FLAG    ;Has there been an interrupt ?
      BEQ  WFOR1   ;N- go back into DETENT for 1 ms
      SEI          ;Y- Disable Interrupts
      ANDA #1      ;Was burst present ?
      RTS          ;Return with condition codes set

* GETFID reads the Fiduciary Voltage
GETFID PSHA ;Save A
      LDAB PORT6
      PSHB     ;Save port6 state
      ANDB #SINE
      ORAB #5
      STAB PORT6
      LDAB ADC
      PULA
      STAA PORT6 ;Restore port 6 to original state
      PULA       ;Restore A
      RTS

* DOSEEK calls the Seek routine & does all the
```

* necessary Seek-End stuff.

```
DOSEEK   CPX   TRKNUM
  BNE   DOSEE1
  RTS      ;Don't seek if already there DOSEE1 SEI   ;Disable interrupts before changing TRKNUM
  STX   TRKNUM
  JSR   NOTZSD  ;NOT TRK00, NOT SK DONE
  JSR   SEEK     ;Do the Seek
  JSR   SKEND    ;Do Seek End stuff
  JSR   SKDONE   ;Declare SEEK DONE
  RTS
```

* SKEND : Set Write Current, Track 00 & TC
* surface to suit TRKNUM but
* DON'T DECLARE SEEK COMPLETE !!

```
SKEND   LDX  TRKNUM
  CPX   #307    ;Inner cylinders ?
  BGT   SKEND1  ;Y-
  OIM   #40H,PORT6 ;N- use High write current
  BRA   SKEND2

SKEND1 AIM #0BFH,PORT6 ;Use Low write current

SKEND2 LDAA CROI
  TIM   #20H,PORT5 ;Using Fiduc ?
  BNE   SKEND3 ;Y- branch
  LDX   TRKNUM ;On track 00 ?
  BEQ   SKEND4 ;Y- branch
  BRA   SKEND5

SKEND3 JSR   GETFID
  CMPB  FIDREF ;Are we @ the Fiduciary ?
  BLS   SKEND5 ;N- branch
  TIM   #1,TRKNUM+1 ;Even cyl ?
  BNE   SKEND5 ;N-
```

```
        IFNE NGA
SKEND4 AIM #0DFH,CR0I  ;Set TRK 00
                       ; bit (Change to NOPs
                       ; for "NO TRACK ZERO")
        ENDC IFEQ NGA
SKEND4 OIM #20H,CR0I  ;Set TRK 00 bit
        ENDC IFEQ SKI
SKEND5 JSR TCSURF  ;Nominate the TC surface
 RTS
        ENDC IFNE SKI
SKEND5 LDAB CR0I
 ANDB #0F8H
 TIM  #1,TRKNUM+1  ;Even ?
 BEQ  SKEND6  ;Y-
 ORAB #OCLS
 BRA  SKEND7
SKEND6 ORAB #ECUS
SKEND7 STAB CR0I
 STAB CR0
 RTS
        ENDC

* STEPIN : Private 1 track seek INward

STEPIN LDX TRKNUM
 INX
 STX  TRKNUM
 JMP  SEEK

* TCSURF : Nominate the Temp Comp
```

* Surface dictated by ULFLAG & TRKNUM

```
TCSURF LDAB CR0I
  ANDB #0F8H
  TIM  #1,TRKNUM+1 ;Even cyl ?
  BEQ  TCSUR2 ;Y-

TST  ULFLAG ;Using US ?
  BEQ  TCSUR1 ;Y-
  ORAB #OCLS
  BRA  TCSUR4

TCSUR1 ORAB #OCUS
  BRA  TCSUR4
TCSUR2 TST ULFLAG ;Using US ?
  BEQ  TCSUR3 ;Y-
  ORAB #ECLS
  BRA  TCSUR4

TCSUR3 ORAB #ECUS
TCSUR4 STAB CR0I
  STAB CR0
  RTS
```

* Interface signal generators
* RDYTK0 reports READY & TRACK 00
* NOTRDY reports NOT READY, NOT SK DONE & NOT TRACK 00
* SKDONE reports SEEK DONE
* NOTZSD reports NOT TRACK ZERO, NOT SK DONE

```
       IFNE NGA
RDYTK0 LDAB #0CFH
  JMP  ANDB0
NOTRDY LDAB #70H
  JMP  ORB0
SKDONE LDAB #0BFH
  JMP  ANDB0
NOTZSD LDAB #60H
```

```
        JMP   ORB0
              ENDC

IFEQ  NGA
RDYTK0  LDAB  #30H
        JMP   ORB0
NOTRDY  LDAB  #8FH
        JMP   ANDB0
SKDONE  LDAB  #40H
        JMP   ORB0
NOTZSD  LDAB  #9FH
        JMP   ANDB0
              ENDC

* ANDB0 (ORB0) ;AND B with CR0 (OR B with CR0)

ANDB0   ANDB  CR0I
        BRA   ANDOR0

ORB0    ORAB  CR0I
ANDOR0  STAB  CR0I
        STAB  CR0
        RTS
        PAGE
*========================================
*   START OF SERVO-WRITE SUBROUTINES    =
*========================================

* Erase, Wedge period only, current cyl & surface only.

ERASE   LDX   #IERASE
        STX   VECTOR
        LDD   #70
        ADDD  DELTA
        STD   TRKOFF ;TRKOFF = 70 + DELTA
        JSR   TRKA
        JSR   SIT75
        JSR   WFORIT ;Enable IRQ2 & wait till done
```

```
        JSR    TRKCL
        LDD    #70
        SUBD   DELTA
        STD    TRKOFF ;TRKOFF = 70 - DELTA
        JSR    TRKB
        JSR    SIT75
        JSR    WFORIT ;Enable IRQ2 & wait till done
* Move back to track centre-line from an offset position TRKCL   LDD    DOFF
        BMI    TRKCL1
        LDD    #40
        BRA    TRKCL2
TRKCL1  LDD    #-40
TRKCL2  STD    DOFF
        JSR    SIT45  ;DETENT 3 ms @ 1/2-way mark
        LDD    #0
        STD    DOFF
        JSR    SIT75  ;DETENT 5 ms
        RTS

* Move to an OUTward offset, using the SIN transducer

TRKA    LDD    #-16
        STD    DOFF
TRKA1   JSR    SIT12
        LDD    DOFF
        SUBD   #4
        STD    DOFF
        ADDD   TRKOFF
        BPL    TRKA1
        LDD    #0
        SUBD   TRKOFF
        BRA    TRKAB

* Move to an INward offset, using the SIN transducer

TRKB    LDD    #16
```

```
       STD    DOFF
TRKB1  JSR    SIT12
       LDD    DOFF
       ADDD   #4
       STD    DOFF
       SUBD   TRKOFF
       BMI    TRKB1
       LDD    TRKOFF
TRKAB  STD    DOFF
       LDD    #150
       JSR    SIT    ;DETENT for 10ms
       RTS

* FLIPUL : Toggle the Upper/Lower bit of nominated head

FLIPUL LDAB   CROI
       EORB   #1
       STAB   CROI
       STAB   CRO
       RTS

* Activate the Wedge Interrupt & nominate INDEX

RDBRST LDX    #INDEX
       STX    VECTOR

* ENABLE prepares for an Interrupt by resetting
* the Interrupt latch and then enabling Interrupts.

ENABLE LDAA   CR1I
       ANDA   #0BFH
       STAA   CR1    ;Make ACKnowledge line Low (true)
       CLR    FLAG   ;Clear INT bit & spindle error count
       ORAA   #040H
       STAA   CR1    ;... and High again
       CLI           ;Clear Interrupt Mask, i.e. Enable Interrupts
       RTS
```

* Write a Servo Burst @ the wedge interrupt

```
WRTA   LDX  #BURSTA ;WRITE THE A BURST
  BRA  ABWRT
WRTB   LDX  #BURSTB ;WRITE THE B BURST
ABWRT  STX  VECTOR
  JMP  WFORIT
```

* CHEKRD : Check bursts on this surface.  Return with
* ave TOFF in D and with carry set if I TOFF I > 3

```
CHEKRD JSR RDBRST
  LDD  #2000
  JSR  SIT     ;Wait 8 revs
  JSR  AVERAG  ;Measure ave TOFF over next 8 revs
  CMPB #2
  BGT  BADRD
  CMPB #-2
  BLT  BADRD
  CLC
  RTS

BADRD  SEC
  RTS
```

* DC ERASE all tracks from (-1-GUARD0/2) to
*  HITRK on all 4 surfaces

```
DERASE LDD #8    ;Start erasing 8 tracks
                 ; from the outer end-stop
  SUBD LINOFF
  XGDX
DERAS1 JSR  DOSEEK ;Seek to the track
  LDD  #75
  STD  TRKOFF
  JSR  TRKA    ;Move offtrack by -300uin
  JSR  ERATRK  ;Erase for 1 rev on all 4 heads
```

```
        JSR   TRKCL    ;Back to centre
        JSR   TRKB     ;Move offtrack by +300uin
        JSR   ERATRK
        JSR   TRKCL
        LDX   TRKNUM
        INX
        CPX   HITRK    ;All done ?
        BLE   DERAS1   ;N- loop again
        JMP   SIT12

* Erase entire track on all 4 surfaces @ current
* Detent position.

ERATRK  LDAA  CR0I
        ANDA  #0F8H
        STAA  CR0I
        ORAA  #ECUS
        STAA  CR0
        LDAA  CR1I

IFNE  NGA
        ANDA  #7CH     ;DCERASE,FORCE WRITE,FORCE HEAD
        ENDC
        IFEQ  NGA
        ORAA  #83H
        ENDC

STAA  CR1I
        STAA  CR1
        JSR   SIT250   ;Call DETENT for 17.5ms
        LDAA  CR0I
        ORAA  #ECLS
        STAA  CR0      ;Switch heads whilst still erasing
        JSR   SIT250   ;Call DETENT for 17.5ms
        LDAA  CR0I
        ORAA  #OCUS
        STAA  CR0
        JSR   SIT250
```

```
   LDAA CR0I
   ORAA #OCLS
   STAA CR0
   STAA CR0I  ;Ensure image matches port 8 on return
   JSR  SIT250
   LDAA CR1I IFNE NGA
   ORAA #83H   ;Clear DCERASE,FORCE WRITE,FORCE HEAD
       ENDC
       IFEQ NGA
   ANDA #7CH
       ENDC

STAA CR1I
   STAA CR1
   RTS

* Divide by 8 & check that the mean offset is
*  in the range +6 to -6
CHECK  JSR  DBY8  ;Divide by 8
  XGDX
  CPX  #6
  BGT  FLT10
  CPX  #-6
  BLT  FLT10
  RTS

FLT10  LDAA #10
  JMP  FLASH

* BLINK : An alternative to CHECK - for
*         diagnostic work only.

BLINK JSR DBY8
 PSHB
 PSHA
 PSHB
```

```
     PSHA    ;Save 2 copies of (TOFF)ave
     AIM   #0EFH,PORT6 ;Green LED off
     LDD   #15000
     JSR   SIT  ;Wait 1 sec
     PULA
     PULB
     TSTA    ;TOFF +ve ?
     BPL   BLINK1 ;Y-
     NEGB
BLINK1 PSHB   ;# of times to blink
     OIM   #10H,PORT6 ;Green On
     LDD   #4000
     JSR   SIT      ;Wait 1/4 sec
     AIM   #0EFH,PORT6 ;Green off
     LDD   #4000
     JSR   SIT
     PULB
     DECB    ;All blinking done ?
     BGT   BLINK1 ;N-
     PULX  ;Retrieve (TOFF)ave
     RTS

* Limit the DELTA value so that it's
*  in the range +10 to -10
LIMIT  XGDX
     CPX   #10     ;DELTA > 10 ?
     BLE   LIMIT1 ;N- branch
     LDX   #10
     RTS LIMIT1  CPX  #-10 ;DELTA < -10 ?
     BGE   LIMIT2 ;N- branch
     LDX   #-10
LIMIT2  RTS

* Measure the average value of TOFF over 8 revolutions.

AVERAG LDAA #8
```

```
     STAA TEMP4    ;Loop count
     CLRA
     CLRB
     STD  TEMP5    ;TEMP5,6 accumulate total of 8 readings AVERA1 AIM #7FH,FLAG ;Clear the interrupt bit
AVERA2 JSR SIT12
     LDAA FLAG     ;Has there been an Interrupt ?
     BPL  AVERA2   ;N-
     LDD  TEMP5
     ADDD TOFF
     STD  TEMP5
     DEC  TEMP4    ;8 revs completed ?
     BNE  AVERA1   ;N-
     SEI           ;Y- disable interrupts
     JMP  DBY8     ;Return with D = Total / 8
     PAGE
*==========================================
*            INTERRUPT ROUTINES           =
*==========================================

* The INDEX Interrupt routine is entered once per rev.
* (except during seeks) at the start of the WEDGE
* period.  It reads the A and B bursts and adjusts
* TOFF, DOFF, SLOPE & the MUX select. It checks
* spindle speed and aborts if outside limits.  And
* finally, it generates the Index pulse for
* transmission over the interface. The program
* structure looks peculiar because dummy
* instructions are included to get hardware
* pulse timings exactly right.
* Numbers in parentheses are MPU cycles.
* Frank Hammond    January 1985.
INDEX  LDAB PORT6 (3) Get state of PORT 6...
     PSHB         (4) ...& save for later
     LDAB #1AH    (2)
     STAB PORT6   (3) Reset integrator and set up MUX
     LDD  FRC     (4) Read timer for spindle speed check
```

```
    STD   STIME1   (4) Today's value
    SUBD  STIME0   (4) Find spindle rotational period
    LDX   STIME1   (4)
    STX   STIME0   (4) Save for next rev.
    XGDX           (2) Store period in "X"
    LDD   ZERO0    (4) Get BOTH zero values
    STD   DAC0     (4) & turn off both DACs
    LDAA  #3AH     (2)
    STAA  PORT6    (3) Start the Integrator, cycle 47

* The following Speed Check Module must take
*   EXACTLY 30 cycles by any path.
    OIM   #80H,FLAG (6) Set Interrupt flag
    CPX   #34405   (3) Speed < 3408 rpm ?
    BHI   INDX02   (3) Y- branch
    CPX   #31128   (3) Speed > 3767 rpm ?
    BLS   INDX04   (3) Y- branch
    LDAB  #80H     (2) Burn 4c
    LDAB  #80H     (2)
    LDAB  #80H     (2)
    STAB  FLAG     (3) Speed O.K. so clear speed error count
    BRA   INDX06   (3)

INDX02 LDAB FLAG   (3) Wait 6c
    LDAB  FLAG     (3)
INDX04 LDAB FLAG   (3)
    INCB           (1)
    STAB  FLAG     (3) Increment speed error count
    CMPB  #83H     (2) 3 consecutive revs in error ?
    BMI   INDX06   (3) N- then continue
    JMP   FAULT2   (3) Y- bomb out INDX06 LDAA ADC    (3+4) Read A burst from cycle 81 to 84
    LDAB  #1AH     (2)
    STAB  PORT6    (3) Reset Integrator @ cycle 89

* Precisely 60 cycles available for the next module
    STAA  ABST     (3)
```

```
    CLRB          (1)
    STAB SLOPE    (3) Assume It's +ve
    INCB          (1)
    STAB MUXMSK   (3) Assume COS, so set to 001
    LDX  TOFF     (4) TOFF +ve ?
    BPL  INDX12   (3) Y- branch
    CPX  QTRKO    (4) TOFF < -(Quarter Track) ?
    BGE  INDX11   (3) N- branch
    XGDX          (2)
    ADDD HTRKO    (4)
    STD  DOFF     (4) DOFF=TOFF + Half a Track
    BRA  INDX10   (3) Wait 3c
INDX10 BRA INDX14 (3)

INDX11 STX DOFF  (4) DOFF = TOFF
    LDAB MUXMSK   (3)
    ANDB #SINE    (2)
    STAB MUXMSK   (3) Set it for SIN
    NOP           (1)
    BRA  INDX14   (3)

INDX12 CPX QTRKI (4) TOFF > Quarter Track ?
    BLE  INDX11   (3) N- branch
    COM  SLOPE    (6) Y-use opposite slope
    XGDX          (2)
    SUBD HTRKI    (4)
    STD  DOFF     (4) DOFF = TOFF - Half a Track INDX14 TIM #1,TRKNUM+1 (4) Odd track ?
    BNE  INDX17   (3) Y- branch
    BRA  INDX16   (3) Wait 3c
INDX16 BRA INDX18 (3)
INDX17 COM SLOPE (6) Opposite slope for odd tracks
INDX18 LDAB SLOPE (3) Wait 6c
    LDAB SLOPE    (3)

LDAB #3AH     (2)
    STAB PORT6    (3) Start the Integrator, cycle 154
```

```
* The following module must take EXACTLY 30
*  cycles via any path.
  LDAA MUXMSK (3) Using COS ?
  BNE  INDX20 (3) Y- branch
  LDD  SINES  (4) N- fetch SSCALE & SINREF
  BRA  INDX22 (3)
INDX20 LDD COSINS (4) Fetch CSCALE & COSREF
  BRA  INDX22 (3)
INDX22 STD DETENS (4) Store DSCALE & DREF
  LDAB CR1I  (3)
  ANDB #0BFH (2)
  STAB CR1   (3) Clear the Gate Array Interrupt Latch
  ORAB #40H  (2)
  STAB CR1   (3)

LDAB ADC    (3+4) Read the B burst from cycle 188 to 191
* N.B. The bigger the burst, the smaller the reading !!
  PAGE
  IFEQ OFFPOT
  LDAA #1EH
  STAA PORT6  ;Reset Integrator & select Offset Pot
  CLRA
  LDAB ADC    ;Read the pot
  SUBB #128   ;Normalise
  BPL  OPOT1
  COMA        ;Sign extend if -ve
OPOT1 STD TOFF
  PULB
  ANDB #0F8H
  ORAB MUXMSK
  STAB PORT6  ;Restore PORT6 to proper state
  ENDC
  IFNE OFFPOT
  PULA       (3)
  ANDA #0F8H (2)
  ORAA MUXMSK (3)
  STAA PORT6 (3) Restore PORT 6 to proper state, cycle 202
```

```
    LDX  TOFF      (4)
    TIM  #80H,PORT5 (4) Port 5 bit 7 = Ground ?
    BEQ  INDX26    (3) Y- Don't do servo burst correction
    LDAA ABST      (3)
    SBA            (1) Acc A = (B burst ampl)-(A burst ampl)
    BEQ  INDX28    (3) Branch if equal
    BCS  INDX24    (3) Branch if A burst > B burst
    CPX  #-192     (3) Max correction 3/4 track
    BLE  INDX30    (3)
    DEX            (1)
    BRA  INDX32    (3)

INDX24 CPX #192   (3) Max correction 3/4 track
    BGE  INDX30    (3)
    INX            (1)
    BRA  INDX32    (3)
    ENDC
INDX26 LDAA STAT1 (3) Waste 4c
    NOP            (1)
INDX28  MUL       (7) Waste 9c
    NOP            (1)
    NOP            (1)
INDX30 LDAA STAT1 (3) Waste 7c
    NOP            (1)
    BRA  INDX34    (3)

INDX32 STX TOFF   (4)
INDX34 LDD TOFF   (4)
    LSRD
    ADDB #128
    STAB DAC4

LDAA CR0I     (3)
    ANDA #0F7H    (2)
    STAA CR0      (3) Assert INDEX @ cycle 254
    NOP           (1) .. for 3 us...
    ORAA #08H     (2) ..&..
    STAA CR0      (3) ..clear INDEX @ cycle 260
```

```
    RTI           (10)
    PAGE
* Re-sync Wedge Flip-flop in G.A.

RESYNC LDAA CR1I
    ANDA #09FH
    STAA CR1  ;Re-sync Index & Acknowledge Interrupt
    ORAA #40H
    STAA CR1  ;Clear Acknowledge
    ORAA #20H
    STAA CR1  ;Clear Index Sync
    LDAA #80H
    STAA FLAG  ;Set interrupt flag
    RTI

*      USE THE INDEX ROUTINE ?
BRSTCK  LDAB PORT6
    PSHB
    LDAB #02H
    STAB PORT6 ;RESET BURST INTEGRATOR
    LDAB #4
BRST1  DECB     ;Wait 9us
    BNE BRST1
    LDAA ADC   ;Read Integrator max level
    STAA MAXBST
    LDAA #022H
    STAA PORT6 ;Start the burst integrator
    LDAB #07
BRST2  DECB     ;Wait 15us
    BNE BRST2
    LDAB ADC   ;Read the A burst
    LDAA #02H
    STAA PORT6 ;Reset the integrator
    LDAA MAXBST
    SBA
    STAA ABST  ;Amplitude of A burst
    LDAB #13
BRST3  DECB     ;Wait 29us
```

```
  BNE   BRST3
  LDAB  #022H
  STAB  PORT6  ;Start the integrator
  LDAB  #7
BRST4 DECB    ;Wait 15us
  BNE   BRST4
  LDAB  ADC    ;Read the B burst
* N.B. The bigger the burst, the smaller the reading !!
  PULA
  STAA  PORT6  ;Restore Port 6 to original state
  LDAA  MAXBST
  SBA
  STAA  BBST   ;Store B burst amplitude
  CMPA  #47    ;B burst > 0.92V
  BHI   BRST5  ;Y- branch
  NEGA
  ADDA  ABST
  CMPA  #19    ;(A-B) > 0.37V ?
  BLT   BRST5  ;N- branch
  LDAA  #81H   ;Y- Burst was present during Wedge
  BRA   BRST6
BRST5 LDAA #80H ;No burst found during Wedge
BRST6 STAA FLAG
  JMP   ENDIT  ;Reset Interrupt Latch in G.A.

SPNCK LDD FRC  ;Read the 16-bit timer
  STD   STIME1
  SUBD  STIME0
  XGDX
  LDAA  #81H
  CPX   #36125 ;Speed > 3246 rpm ? (91% running speed)
  BLS   AOK    ;Y- branch
  LDX   TEMP1  ;Double-precision rev count in TEMP1 & TEMP2
  INX
  STX   TEMP1
  LDAA  #80H
AOK STAA FLAG ;MSB = Interrupted, LSB = Up-To-Speed
  LDX   STIME1
```

```
        STX   STIME0
        JMP   ENDIT

* QUICKY : Quick Interrupt Service - Acknowledge
*          GA & issue INDEX only.

QUICKY  LDAB  CR1I
        ANDB  #0BFH
        STAB  CR1   ;ACKN
        ORAB  #40H
        STAB  CR1   ;/ACKN
        LDAA  CR0I
        ANDA  #0F7H
        STAA  CR0   ;INDEX
        ORAA  #08H
        STAA  CR0   ;/INDEX
        RTI

*######################################
*   SERVO-WRITE INTERRUPT ROUTINES   #
*######################################

* Routine to write a 60us servo burst. Enter @ BURSTA
* to write an A burst immediately after the interrupt.
* Enter @ BURSTB to write the delayed B
* burst.

BURSTB  NOP         (1) Delay 111 cycles
        LDAB  #27   (2)
WLOOP1  DECB        (108)
        BNE   WLOOP1 (-)

BURSTA  LDAA  CR1I  (3)
        IFNE  NGA
        ANDA  #0BCH (2) ACKNOWLEDGE, FORCE WRITE, FORCE HEAD
        ENDC
        IFEQ  NGA
        ORAA  #3
```

```
        ENDC
 STAA CR1   (3) Turn on A burst @ 8, B burst @ 119

LDAB #26    (2)
WLOOP2  DECB (104)
 BNE  WLOOP2 (-)
        IFNE NGA
 ORAA #43H   (2)
        ENDC
        IFEQ NGA
 ANDA #0FCH
        ENDC
 STAA CR1   (3) Turn off A burst @ 119, B burst @ 230

LDAA #80H   (2)
  STAA FLAG   (3)
  JMP  ENDIT

* ERASE SERVO BURSTS ON INTERRUPT (Erases only
*   during Wedge period)

IERASE  LDAA CR1I (3)
        IFNE NGA
 ANDA #3CH (2) DCERASE,ACKNOWLEDGE,FORCE WRITE,FORCE HEAD
        ENDC
        IFEQ NGA
 ORAA #83H
        ENDC
 STAA CR1   (3) Start erasing @ cycle 8

LDAB #58    (2)
IERALP  DECB (232)
 BNE  IERALP (-)
        IFNE NGA
 ORAA #0C3H  (2)
        ENDC
        IFEQ NGA
 ANDA #7CH
```

```
          ENDC
   STAA CR1   (3) Turn off ERASE & clear INT latch @ 247

LDAA #80H  (2)
   STAA FLAG  (3)

ENDIT LDAA CR1I
   ANDA #0BFH
   STAA CR1   ;ACKN
   ORAA #40H
   STAA CR1   ;/ACKN
   RTI

BOUNCE RTI   ;Dummy Interrupt Routine to handle
             ; unexpected interrupts

*    ========== END OF INTERRUPT ROUTINES ==============

*###########################################
*  MICROPROCESSOR INTERRUPT VECTORS   #
*###########################################

ORG   0FFEAH

FDB IRQ2    ;Wedge Interrupt has various service routines.
   FDB BOUNCE
   FDB FLT13   ;Op Code Error
   FDB BOUNCE
   FDB BOUNCE
   FDB BOUNCE
   FDB BOUNCE
   FDB FAULT4  ;Power Fail
   FDB START
   FDB START
   FDB START   ;Power-on Reset

END
   PAGE
```

We claim:

1. Apparatus, responsive to external position commands, for positioning a transducing apparatus relative to a rotating storage medium at a selected position thereon indicated by an external position command, the positioning apparatus including a position transducer generating first and second position information signals which provide position information with respect to positions of the transducing apparatus over selected ranges of positions, and the transducing apparatus generating a reference position information signal which provides reference position information at discrete positions, comprising:

motion means for producing displacement in each of a plurality of discrete ranges, each discrete range of displacement being separately excitable;

coupling means for coupling the motion means to the transducing apparatus;

determining means for determining position information from the first and second position information signals;

combining means for combining the position information determined from the first and second position information signals;

monitoring means for monitoring the reference position information signal at the discrete positions to determine an offset value with respect to the position information determined from the first and second position information signals;

selecting means for selecting the first position information signal for position determination in response to the position information derived from the first position information signal being less than one-half of the combined position information, and selecting the second position information signal for position determination in response to the position information derived from the first position information signal being greater than one-half of the combined position information; and control means, responsive to the selected position information signal and the external position commands for positioning the transducing apparatus at said selected position relative to the rotating storage medium by exciting selected ranges of displacement of said motion means, the control means including:

difference means responsive to a position determined from the selected position information signal and the selected position for determining a difference therebetween;

time means for providing continuous time information; and position control means responsive to said difference means and to said time means and coupled to said motion means for producing displacement of the transducing apparatus in a plurality of modes responsive to the difference.

2. Apparatus as recited in claim 1, further comprising: means for determining position as a function of the modes so that the frequency with which position is determined changes with the modes.

3. Apparatus as recited in claim 1, wherein the modes further comprise:

a first mode responsive to the difference being greater than a preselected distance for commanding displacement of the transducing apparatus at a constant preselected velocity.

4. Apparatus as recited in claim 1, wherein said plurality of modes is responsive to the difference being less than a preselected distance for producing displacement of the transducing apparatus at a plurality of differing velocities according to a table of preselected velocities according to the difference.

5. Apparatus as recited in claim 1, wherein the modes further comprise:

a second mode responsive to the difference being less than a preselected distance for producing continuously controlled displacement of the transducing apparatus at a selected position according to a position error, a velocity error, and an integral of position error.

6. A method, responsive to external position commands, first and second position information signals which provide position information with respect to positions of a transducer apparatus over selected ranges of positions, and a reference position information signal which provides reference position information at discrete positions, for positioning the transducing apparatus relative to a rotating storage medium at a selected position thereon, comprising the steps of:

producing displacement of the transducing apparatus toward a position indicated by a received external position command in a plurality of different, separately excitable control modes which each correspond to a different discrete range of displacement from the indicated position;

determining position information from the first and second position information signals;

determining the velocity of a positioning apparatus;

combining the position information determined from the first and second position information signals;

monitoring the reference position information signal at the discrete positions to determine an offset value with respect to position information determined from the first and second position information signals;

selecting the first position information signal for position determination in response to position information derived from the first position information signal being less than one-half of the combined position information, and selecting the second position information signal for position determination in response to the position information derived from the first position information signal being greater than one-half of the combined position information;

determining a difference in position between a position indicated by the determined position information and a position indicated by an external position command; and selecting the control mode for producing displacement of the transducer in response to a discrete range of displacement indicated by the determined difference in position and the determined velocity.

7. A method for moving a transducing apparatus from a current position to a desired position with respect to a rotating storage medium by positioning apparatus having a plurality of separately excitable ranges of motion, first and second position information signals which provide position information with respect to positions of the transducing apparatus over selected ranges of positions, and a reference position information signal which provides reference position information at discrete positions in response to reference position information stored in the rotating storage medium, the rotating storage medium having a plurality of tracks for the storage of information, and each track containing reference position information, the method comprising the steps of:

determining parameters associated with the positioning apparatus;

determining position information from the first and second position information signals;

combining the position information determined from the first and second position information signals;

monitoring the reference position information signal at the discrete positions to determine an offset value with respect to position information determined from the first and second position information signals;

selecting the first position information signal for position determination in response to position information derived from the first position information signal being less than one-half of the combined position information, and selecting the second position information signal for position determination in response to the position information derived from the first position information signal being greater than one-half of the combined position information;

determining a current position for the transducing apparatus from the selected position information signal;

determining a distance between the current position of the transducing apparatus and the desired position;

determining a velocity of the transducing apparatus;

selecting one of a plurality of modes of motion for the transducing apparatus responsive to the determined distance and velocity; and advancing the transducing apparatus toward the desired position according to the selected mode of motion, the determined distance and velocity, and the determined parameters.

8. A method as recited in claim 7, further comprising the step of:

repetitively determining the position of the transducing apparatus with respect to the rotating storage medium with a frequency which increases with decreasing distance to the desired position.

9. A method as recited in claim 7, further comprising the step of:

changing the selected mode of motion based upon distance and velocity determinations of the transducing apparatus associated with each of the modes of motion.

10. A method as recited in claim 7, wherein the step of advancing the transducing apparatus toward the desired position further comprises the step of:

sequentially exciting separate ranges of motion of the positioning apparatus.

11. Apparatus as recited in claim 7, wherein the plurality of modes of motion further comprises:

a high speed mode wherein velocity of the transducing apparatus is maintained at a preselected constant velocity for a determined distance greater than a first preselected distance, and is commanded to decrease in discrete steps for a determined distance equal to or less than the first preselected distance.

12. Apparatus as recited in claim 11, wherein the step of determining a distance further comprises the step of:

determining position of the transducing apparatus with respect to every other track.

13. Apparatus as recited in claim 7, wherein the plurality of modes of motion further comprises:

a medium speed mode wherein velocity of the transducing apparatus is commanded to decrease in discrete steps for a determined velocity less than a preselected velocity and a distance greater than a second preselected distance.

14. Apparatus as recited in claim 13, wherein the step of determining a distance further comprises the step of:

determining position of the transducing apparatus with respect to every track.

15. Apparatus as recited in claim 7, wherein the plurality of modes of motion further comprises:

a transition mode wherein velocity of the transducing apparatus is commanded to decrease in discrete steps for a determined distance less than a second preselected distance and greater than a third preselected distance.

16. Apparatus as recited in claim 15, wherein the of determining a distance further comprises the step of:

determining position of the transducing apparatus with respect to every track.

17. Apparatus as recited in claim 7, wherein the plurality of modes of motion further comprises:

a detent mode wherein the transducing apparatus is positioned with respect to the determined velocity, the desired position, and an integral of position for a determined distance less than a third preselected distance.

18. Apparatus as recited in claim 17, wherein the step of determining a distance further comprises the step of:

determining position of the transducing apparatus with respect to every track and with respect to track centerline information.

19. A method for moving a transducing apparatus from current position to a desired position with respect to a rotating storage medium by monitoring position information indicating a position of the transducing apparatus, the position information including first and second position information signals which provide position information with respect to positions of the transducing apparatus over selected ranges of positions, the storage medium having a plurality of tracks for storage of information thereon, each track containing a reference position information signal which provides reference position information at discrete positions, the method comprising the steps of:

determining position information from the first and second position information signals;

combining the position information determined from the first and second position information signals;

monitoring the reference position information signal at the discrete positions to determine an offset value with respect to position information determined from the first and second position information signals;

selecting the first position information signal for position determination in response to position information derived from the first position information signal being less than one-half of the combined position information, and selecting the second position information signal for position determination in response to the position information derived from the first position information signal being greater than one-half of the combined position information;

determining current position from the selected position information signal;

determining a distance between the current position of the transducing apparatus and the desired position;

determining a velocity of the transducing apparatus;

selecting one of a plurality of modes of motion for the transducing apparatus responsive to the determined distance and velocity, the modes of motion including a first mode wherein said transducing apparatus is first accelerated to a preselected velocity and thereafter maintained at substantially the preselected velocity for a determined distance greater than a first preselected distance, and in response to the determined distances being equal to or less than the first preselected distance, or the determined velocity being greater than the preselected velocity, decreasing the velocity in discrete steps, and wherein position of the transducing apparatus is determined with respect to every other track; a second mode wherein the velocity of said transducing apparatus is decreased in discrete steps for the determined velocity less than the preselected velocity and the determined distance greater than a second preselected distance, and wherein position of the transducing apparatus is determined with respect to every track; a third mode wherein velocity of said transducing apparatus is decreased in discrete steps for a determined distance equal to or less than the second preselected distance and greater than a third preselected distance; a fourth mode responsive to the determined distance being less than the third preselected distance wherein position of the transducing apparatus is controlled in response to an integration and differentiation of the position information, as well as the position information;

advancing the transducing apparatus toward the desired position according to the selected mode of motion; and changing the selected mode of motion based upon the distance and velocity determinations of the transducing apparatus associated with each of the modes of motion.

20. Apparatus responsive to external position commands for positioning a transducing apparatus relative to a rotating storage medium at selected positions thereon, the positioning apparatus including encoding apparatus for producing first and second position information signals which provide position information with respect to positions of the transducing apparatus over selected ranges of positions, means for generating a reference position information signal which provides reference position information at discrete positions, and externally commutated transducer positioning apparatus having commutation points associated therewith, the positioning apparatus further comprising:

a first means for determining the commutation points for the externally commutated transducer positioning apparatus;

a second means for determining position information from the first and second position information signals;

a third means for combining the position information determined from the first and second position information signals;

a fourth means for monitoring the reference position information signal at the discrete positions to determine an offset value with respect to the position information determined from the first and second position information signals;

a fifth means for selecting the first position information signal for position determination in response to the position information derived from the first position information signal being less than one-half of the combined position information, and selecting the second position information signal for position determination in response to the position information derived from the first position information signal being greater than one-half of the combined position information;

a sixth means for determining maximum and minimum values of the first and second position information signals produced by the position encoding apparatus;

a seventh means for determining position from the selected position information signal; and control means, responsive to the external position commands, and said first, second, third, fourth, fifth, sixth and seventh means for positioning the transducing apparatus at the selected positions relative to the rotating storage medium by selectively commutating the transducer positioning apparatus.

21. Apparatus as recited in claim 20, wherein said control means further comprises:

difference means responsive to said seventh means and the selected positions for determining the difference therebetween;

time means for providing continuous time information;

position control means responsive to said difference means and to said time means and coupled to said transducer apparatus for producing displacement of the transducing apparatus in a plurality of modes responsive to the difference.

22. Apparatus as recited in claim 21, further comprising:

means for determining position as a function of the mode so that frequency with which position is determined changes with the mode.

23. Apparatus as recited in claim 21, wherein the modes further comprise:

a first mode responsive to the difference being greater than a preselected distance for producing displacement of the transducing apparatus at a constant preselected velocity.

24. Apparatus as recited in claim 21 wherein said plurality of modes is responsive to the difference being less than a preselected distance for producing displacement of the transducing apparatus at a plurality of differing velocities according to a table of preselected velocities which vary with the difference.

25. Apparatus as recited in claim 21, wherein the modes further comprise:

a second mode responsive to the difference being less than a preselected distance for producing continuously controlled displacement of the transducing apparatus at the selected positions according to a position error, a velocity error, and an integral of position error.

* * * * *

UNITED STATES PATENT AND TRADEMARK OFFICE
CERTIFICATE OF CORRECTION

PATENT NO.   :   4,831,315
DATED        :   May 16, 1989
INVENTOR(S)  :   Francis P. Hammond et al.

It is certified that error appears in the above-identified patent and that said Letters Patent is hereby corrected as shown below:

```
Drawing sheet 12 of 12, FIG. 7E, box 432, "COORECTION"
should read --CORRECTION--.

Column  4, line 36, "state" should read --stated--.
Column  5, line 43, "position" should read --positions--.
Column 15, line 46, "illustrated" should read --identified--.
Column 19, line 36, "ether" should read --either--.
Column 20, line 65, "numer" should read --number--.
Column 23, line 28, "refered" should read --referred--.
Column 25, line  9, "tothe" should read --to the--.
Column 25, line 38, "Transitin" should read --Transition--.
Column 25, line 40, delete "the" (second occurrence).
Column 29, line 38, "block 38" should read --block 398--.
Column 30, line 57, "block 48" should read --block 418--.
Column 39, line  2, after "surface,",  "1" should read
--1 = L--.
Column 227, line 3, "in" should read --on--.
```

Signed and Sealed this

Twenty-seventh Day of March, 1990

Attest:

JEFFREY M. SAMUELS

Attesting Officer       Acting Commissioner of Patents and Trademarks